(12) United States Patent
Dellinger et al.

(10) Patent No.: US 12,461,638 B2
(45) Date of Patent: Nov. 4, 2025

(54) CUSTOMIZED USER INTERFACES

(71) Applicant: Apple Inc., Cupertino, CA (US)

(72) Inventors: Richard R. Dellinger, San Jose, CA (US); Conrad H. Albrecht-Buehler, Sunnyvale, CA (US); Yun Jae Kim, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 18/204,876

(22) Filed: Jun. 1, 2023

(65) Prior Publication Data

US 2023/0391194 A1    Dec. 7, 2023

Related U.S. Application Data

(60) Provisional application No. 63/349,076, filed on Jun. 4, 2022.

(51) Int. Cl.
| | |
|---|---|
| *B60N 2/02* | (2006.01) |
| *B60K 35/10* | (2024.01) |
| *B60K 35/22* | (2024.01) |
| *B60K 35/26* | (2024.01) |
| *B60R 1/00* | (2022.01) |

(Continued)

(52) U.S. Cl.
CPC ............ *G06F 3/0481* (2013.01); *B60K 35/10* (2024.01); *B60K 35/22* (2024.01); *B60K 35/26* (2024.01); *B60N 2/0248* (2013.01); *B60R 1/00* (2013.01); *G06F 3/0484* (2013.01); *B60K 35/25* (2024.01); *B60K 35/28* (2024.01); *B60K 35/29* (2024.01); *B60K 35/60* (2024.01); *B60K 35/81* (2024.01); *B60K 2360/111* (2024.01); *B60K 2360/1438* (2024.01); *B60K 2360/188* (2024.01)

(58) Field of Classification Search
CPC .... G06F 3/0481; G06F 3/0482; G06F 3/0484; G06F 3/04847; B60K 35/10; B60K 35/22; B60K 35/25; B60K 35/26; B60K 35/28; B60K 35/29; B60K 35/60; B60K 35/81; B60K 2360/111; B60K 2360/1438; B60K 2360/188; B60N 2/0248; G01S 7/497; G01S 7/894
See application file for complete search history.

(56) References Cited

U.S. PATENT DOCUMENTS

| | | |
|---|---|---|
| 5,864,337 A | 1/1999 | Marvin |
| 5,874,905 A | 2/1999 | Nanba et al. |

(Continued)

FOREIGN PATENT DOCUMENTS

| | | |
|---|---|---|
| CA | 2694543 A1 | 8/2011 |
| CN | 1782685 A | 6/2006 |

(Continued)

OTHER PUBLICATIONS

Non-Final Office Action received for U.S. Appl. No. 17/693,048, mailed on Sep. 10, 2024, 41 pages.

(Continued)

*Primary Examiner* — Logan M Kraft
*Assistant Examiner* — Johnny H Hoang
(74) *Attorney, Agent, or Firm* — DLA Piper LLP (US)

(57) ABSTRACT

The present disclosure generally relates to techniques for displaying composited user interfaces and/or customized user interfaces, such as based on contextual information and/or detecting the presence of electronic devices.

30 Claims, 32 Drawing Sheets

(51) Int. Cl.
*G06F 3/0481* (2022.01)
*G06F 3/0484* (2022.01)
*B60K 35/25* (2024.01)
*B60K 35/28* (2024.01)
*B60K 35/29* (2024.01)
*B60K 35/60* (2024.01)
*B60K 35/81* (2024.01)

(56) References Cited

U.S. PATENT DOCUMENTS

| | | |
|---|---|---|
| 6,256,577 B1 | 7/2001 | Graunke |
| 6,693,523 B1 | 2/2004 | Abel et al. |
| 6,778,074 B1 | 8/2004 | Cuozzo |
| 6,847,387 B2 | 1/2005 | Roth |
| 7,406,666 B2 | 7/2008 | Davis et al. |
| 7,683,771 B1 | 3/2010 | Loeb |
| 8,467,770 B1 | 6/2013 | Ben |
| 8,627,385 B2 | 1/2014 | Davies et al. |
| 8,819,745 B2 | 8/2014 | Sizelove et al. |
| 9,152,312 B1 | 10/2015 | Terleski et al. |
| 9,389,090 B1 | 7/2016 | Levine et al. |
| 9,508,194 B1 | 11/2016 | Worley, III |
| 9,580,073 B1 | 2/2017 | Nehmad et al. |
| 9,870,130 B2 | 1/2018 | Schubert et al. |
| 10,019,136 B1 * | 7/2018 | Ozog .................. H04L 51/48 |
| 10,251,034 B2 | 4/2019 | Langlois et al. |
| 10,282,451 B1 | 5/2019 | Ho et al. |
| 10,425,284 B2 | 9/2019 | Dellinger et al. |
| 10,684,972 B2 | 6/2020 | Renard et al. |
| 11,178,522 B2 | 11/2021 | Kim et al. |
| 11,312,207 B1 * | 4/2022 | Sanders ................ G06F 21/629 |
| 11,470,375 B2 | 10/2022 | Lee et al. |
| 11,489,726 B2 * | 11/2022 | Ichieda .................. H04B 5/72 |
| 11,511,756 B2 * | 11/2022 | Brown ............... G01C 21/3438 |
| 11,656,586 B1 * | 5/2023 | Puskarich ............ G06F 3/0482 700/83 |
| 11,678,386 B2 * | 6/2023 | Ichieda ............... H04L 41/0806 370/329 |
| 2003/0001898 A1 | 1/2003 | Bernhardson |
| 2003/0169302 A1 | 9/2003 | Davidsson et al. |
| 2004/0246607 A1 | 12/2004 | Watson et al. |
| 2005/0058885 A1 | 3/2005 | Brocklin et al. |
| 2006/0025923 A1 | 2/2006 | Dotan et al. |
| 2006/0122748 A1 | 6/2006 | Nou |
| 2006/0123353 A1 | 6/2006 | Matthews et al. |
| 2006/0271605 A1 | 11/2006 | Petruzzo |
| 2007/0001830 A1 | 1/2007 | Dagci et al. |
| 2007/0004387 A1 | 1/2007 | Gadamsetty et al. |
| 2007/0233369 A1 | 10/2007 | Ng et al. |
| 2008/0016443 A1 | 1/2008 | Hiroshima et al. |
| 2008/0027586 A1 | 1/2008 | Hern et al. |
| 2008/0076637 A1 | 3/2008 | Gilley et al. |
| 2008/0183909 A1 | 7/2008 | Lim et al. |
| 2008/0211652 A1 | 9/2008 | Cope et al. |
| 2008/0250408 A1 | 10/2008 | Tsui et al. |
| 2009/0005080 A1 | 1/2009 | Forstall et al. |
| 2009/0006994 A1 | 1/2009 | Forstall et al. |
| 2009/0027495 A1 | 1/2009 | Oskin et al. |
| 2009/0089689 A1 * | 4/2009 | Clark .................... G06F 3/1438 715/762 |
| 2009/0178008 A1 | 7/2009 | Herz et al. |
| 2009/0267753 A1 | 10/2009 | Kim |
| 2010/0054519 A1 | 3/2010 | Mulvey et al. |
| 2010/0131190 A1 | 5/2010 | Terauchi et al. |
| 2010/0151908 A1 | 6/2010 | Skarby et al. |
| 2010/0151918 A1 | 6/2010 | Annambhotla et al. |
| 2010/0194553 A1 | 8/2010 | Mizutani et al. |
| 2010/0211685 A1 | 8/2010 | Mcdowall et al. |
| 2010/0223563 A1 | 9/2010 | Green |
| 2010/0225962 A1 | 9/2010 | Okigami et al. |
| 2010/0231372 A1 | 9/2010 | Sandstroem et al. |
| 2010/0295795 A1 | 11/2010 | Wilairat |
| 2010/0332497 A1 | 12/2010 | Valliani et al. |
| 2011/0040657 A1 | 2/2011 | Roswell |
| 2011/0061010 A1 | 3/2011 | Wasko et al. |
| 2011/0082620 A1 | 4/2011 | Small et al. |
| 2011/0093728 A1 | 4/2011 | Das |
| 2011/0106954 A1 | 5/2011 | Chatterjee et al. |
| 2011/0109473 A1 | 5/2011 | Fujimoto et al. |
| 2011/0126116 A1 | 5/2011 | Lee et al. |
| 2011/0166777 A1 | 7/2011 | Chavakula |
| 2011/0167058 A1 | 7/2011 | Van Os |
| 2011/0177845 A1 | 7/2011 | Fasold |
| 2011/0225549 A1 | 9/2011 | Kim |
| 2011/0309924 A1 | 12/2011 | Dybalski et al. |
| 2012/0035924 A1 | 2/2012 | Jitkoff et al. |
| 2012/0036460 A1 | 2/2012 | Cieplinski et al. |
| 2012/0060092 A1 | 3/2012 | Hill et al. |
| 2012/0066630 A1 | 3/2012 | Kim et al. |
| 2012/0077586 A1 | 3/2012 | Pishevar |
| 2012/0079080 A1 | 3/2012 | Pishevar |
| 2012/0079122 A1 | 3/2012 | Brown et al. |
| 2012/0083258 A1 | 4/2012 | Rabii et al. |
| 2012/0151331 A1 | 6/2012 | Pallakoff et al. |
| 2012/0169608 A1 | 7/2012 | Forutanpour et al. |
| 2012/0169617 A1 | 7/2012 | Mäenpää |
| 2012/0173622 A1 | 7/2012 | Toledano et al. |
| 2012/0216146 A1 | 8/2012 | Korkonen |
| 2012/0280804 A1 | 11/2012 | Matsumoto et al. |
| 2012/0319828 A1 | 12/2012 | Krauss et al. |
| 2013/0141331 A1 | 6/2013 | Shiu et al. |
| 2013/0179784 A1 | 7/2013 | Bang |
| 2013/0253980 A1 | 9/2013 | Blom et al. |
| 2013/0295961 A1 | 11/2013 | Lehtiniemi et al. |
| 2013/0304276 A1 | 11/2013 | Flies |
| 2013/0321340 A1 | 12/2013 | Seo et al. |
| 2013/0332113 A1 | 12/2013 | Piemonte et al. |
| 2013/0344905 A1 | 12/2013 | Kim et al. |
| 2013/0345971 A1 | 12/2013 | Stamm et al. |
| 2013/0346408 A1 | 12/2013 | Duarte et al. |
| 2014/0006769 A1 | 1/2014 | Chory et al. |
| 2014/0011481 A1 | 1/2014 | Kho |
| 2014/0013014 A1 | 1/2014 | Huang et al. |
| 2014/0019522 A1 | 1/2014 | Weng et al. |
| 2014/0026088 A1 | 1/2014 | Monte |
| 2014/0068520 A1 | 3/2014 | Missig et al. |
| 2014/0075234 A1 | 3/2014 | Stekkelpak et al. |
| 2014/0082383 A1 | 3/2014 | De Cesare et al. |
| 2014/0082384 A1 | 3/2014 | De Cesare et al. |
| 2014/0108978 A1 | 4/2014 | Yu et al. |
| 2014/0128021 A1 | 5/2014 | Walker et al. |
| 2014/0152235 A1 | 6/2014 | Huang et al. |
| 2014/0153557 A1 | 6/2014 | Kim |
| 2014/0163792 A1 | 6/2014 | Kim |
| 2014/0181558 A1 | 6/2014 | Taha et al. |
| 2014/0195826 A1 | 7/2014 | Wojcik et al. |
| 2014/0195972 A1 | 7/2014 | Lee et al. |
| 2014/0196112 A1 | 7/2014 | Huang et al. |
| 2014/0208250 A1 | 7/2014 | Ording et al. |
| 2014/0236459 A1 | 8/2014 | Boesch et al. |
| 2014/0277843 A1 | 9/2014 | Langlois et al. |
| 2014/0278028 A1 | 9/2014 | Nye et al. |
| 2014/0278051 A1 | 9/2014 | McGavran et al. |
| 2014/0280580 A1 | 9/2014 | Langlois et al. |
| 2014/0281957 A1 | 9/2014 | Weng et al. |
| 2014/0297674 A1 | 10/2014 | Rhee et al. |
| 2014/0304635 A1 | 10/2014 | Kristinsson et al. |
| 2014/0317555 A1 | 10/2014 | Choi et al. |
| 2014/0336931 A1 | 11/2014 | Wilkins |
| 2014/0362056 A1 | 12/2014 | Zambetti et al. |
| 2014/0365126 A1 | 12/2014 | Vulcano et al. |
| 2014/0373123 A1 | 12/2014 | Kang |
| 2015/0070362 A1 | 3/2015 | Hirai |
| 2015/0083035 A1 | 3/2015 | Paszkowicz et al. |
| 2015/0100982 A1 | 4/2015 | Sirpal et al. |
| 2015/0169477 A1 | 6/2015 | Beel et al. |
| 2015/0241920 A1 | 8/2015 | Kakani |
| 2015/0244805 A1 | 8/2015 | Hampiholi et al. |
| 2015/0250021 A1 | 9/2015 | Stice et al. |
| 2015/0254041 A1 | 9/2015 | Hoshihara et al. |
| 2015/0295901 A1 | 10/2015 | Woodward et al. |
| 2015/0351004 A1 | 12/2015 | Ko et al. |
| 2016/0050280 A1 | 2/2016 | Ong et al. |

(56) References Cited

U.S. PATENT DOCUMENTS

| | | | |
|---|---|---|---|
| 2016/0073437 A1 | 3/2016 | John et al. | |
| 2016/0081132 A1 | 3/2016 | Lee et al. | |
| 2016/0189444 A1 | 6/2016 | Madhok et al. | |
| 2016/0224211 A1 | 8/2016 | Xu et al. | |
| 2016/0226713 A1 | 8/2016 | Pitschel et al. | |
| 2016/0328962 A1 | 11/2016 | Mcmahon | |
| 2016/0366206 A1 | 12/2016 | Shemer et al. | |
| 2016/0370879 A1 | 12/2016 | Sharma | |
| 2016/0370984 A1* | 12/2016 | Kuhn | G06F 3/04847 |
| 2017/0013408 A1 | 1/2017 | Grzywaczewski et al. | |
| 2017/0019443 A1 | 1/2017 | Conan et al. | |
| 2017/0041847 A1 | 2/2017 | Cho et al. | |
| 2017/0046957 A1 | 2/2017 | Jördens | |
| 2017/0048373 A1 | 2/2017 | Dees | |
| 2017/0169185 A1 | 6/2017 | Weng | |
| 2017/0180915 A1 | 6/2017 | Adhikari | |
| 2017/0187773 A1 | 6/2017 | Chowdhury et al. | |
| 2017/0203653 A1 | 7/2017 | Ogasawara et al. | |
| 2017/0262158 A1 | 9/2017 | Webb | |
| 2017/0277396 A1 | 9/2017 | Chung et al. | |
| 2017/0281060 A1 | 10/2017 | Wedekind et al. | |
| 2017/0295260 A1 | 10/2017 | Pierce et al. | |
| 2017/0336920 A1 | 11/2017 | Chan et al. | |
| 2017/0337027 A1 | 11/2017 | Chan et al. | |
| 2017/0344329 A1 | 11/2017 | Oh et al. | |
| 2017/0353815 A1 | 12/2017 | Jagannathan et al. | |
| 2017/0357411 A1 | 12/2017 | Williams et al. | |
| 2017/0357433 A1 | 12/2017 | Boule et al. | |
| 2017/0357439 A1* | 12/2017 | Lemay | G06F 3/0484 |
| 2018/0001767 A1 | 1/2018 | Hall | |
| 2018/0004540 A1 | 1/2018 | Edmonds et al. | |
| 2018/0081515 A1* | 3/2018 | Block | H04N 1/00095 |
| 2018/0108243 A1 | 4/2018 | Scherer | |
| 2018/0160463 A1 | 6/2018 | Huttunen et al. | |
| 2018/0164974 A1 | 6/2018 | Park | |
| 2018/0184152 A1 | 6/2018 | Kirkpatrick et al. | |
| 2018/0192122 A1 | 7/2018 | Rajapakse | |
| 2018/0225297 A1 | 8/2018 | Andrew et al. | |
| 2018/0260092 A1 | 9/2018 | Alsante | |
| 2018/0287958 A1 | 10/2018 | Sukoff et al. | |
| 2018/0321843 A1 | 11/2018 | Giannotti et al. | |
| 2018/0350144 A1 | 12/2018 | Rathod | |
| 2018/0356243 A1 | 12/2018 | Mehta et al. | |
| 2019/0114128 A1 | 4/2019 | Nagahara | |
| 2019/0191206 A1* | 6/2019 | Stachewicz | G06F 16/635 |
| 2019/0297478 A1 | 9/2019 | Langlois et al. | |
| 2019/0298315 A1 | 10/2019 | Dickie et al. | |
| 2019/0334782 A1 | 10/2019 | Dellinger et al. | |
| 2019/0334907 A1 | 10/2019 | Rodden et al. | |
| 2020/0073620 A1 | 3/2020 | Bai et al. | |
| 2020/0120170 A1 | 4/2020 | Amitay et al. | |
| 2020/0159894 A1 | 5/2020 | Keen et al. | |
| 2020/0182643 A1 | 6/2020 | Ludwig | |
| 2020/0272404 A1 | 8/2020 | Mu | |
| 2020/0358897 A1 | 11/2020 | Dellinger et al. | |
| 2020/0371968 A1 | 11/2020 | Beel et al. | |
| 2020/0384859 A1 | 12/2020 | Higuchi et al. | |
| 2020/0394010 A1 | 12/2020 | Cooper | |
| 2021/0044853 A1 | 2/2021 | Alsante | |
| 2021/0289067 A1 | 9/2021 | Dellinger et al. | |
| 2022/0289029 A1 | 9/2022 | Dellinger | |
| 2024/0051391 A1 | 2/2024 | Crick et al. | |
| 2024/0089366 A1 | 3/2024 | Dellinger et al. | |
| 2024/0348714 A1 | 10/2024 | Dellinger et al. | |

FOREIGN PATENT DOCUMENTS

| | | |
|---|---|---|
| CN | 1786906 A | 6/2006 |
| CN | 101822020 A | 9/2010 |
| CN | 101827363 A | 9/2010 |
| CN | 101828411 A | 9/2010 |
| CN | 102081502 A | 6/2011 |
| CN | 102646081 A | 8/2012 |
| CN | 102801649 A | 11/2012 |
| CN | 109314735 A | 2/2019 |
| CN | 110696587 A | 1/2020 |
| DE | 102017112064 A1 | 12/2018 |
| EP | 3192691 A1 | 7/2017 |
| EP | 3409526 A1 | 12/2018 |
| EP | 3715164 A1 | 9/2020 |
| EP | 3789738 A1 | 3/2021 |
| EP | 3828017 A1 | 6/2021 |
| JP | 2016-68931 A | 5/2016 |
| JP | 2018-197691 A | 12/2018 |
| KR | 10-2007-0077663 A | 7/2007 |
| KR | 10-2012-0032596 A | 4/2012 |
| KR | 10-2013-0114928 A | 10/2013 |
| KR | 10-2021-0017242 A | 2/2021 |
| WO | 2007/100944 A3 | 8/2008 |
| WO | 2016/126733 A1 | 8/2016 |

OTHER PUBLICATIONS

Applicant-Initiated Interview Summary received for U.S. Appl. No. 17/693,048, mailed on Oct. 7, 2024, 5 pages.
Invitation to Pay Search Fees received for European Patent Application No. 22714301.3, mailed on Sep. 24, 2024, 11 pages.
Office Action received for Australian Patent Application No. 2023237162, mailed on Sep. 27, 2024, 2 pages.
Office Action received for European Patent Application No. 22714301.3, mailed on Sep. 13, 2024, 4 pages.
Applicant-Initiated Interview Summary received for U.S. Appl. No. 17/693,048, mailed on Aug. 13, 2024, 4 pages.
Non-Final Office Action received for U.S. Appl. No. 18/510,050, mailed on Aug. 1, 2024, 27 pages.
Applicant-Initiated Interview Summary received for U.S. Appl. No. 18/510,050, mailed on Aug. 26, 2024, 6 pages.
Office Action received for Chinese Patent Application No. 202111392782.4, mailed on Jul. 26, 2024, 12 pages (6 pages of English Translation and 6 pages of Official Copy).
Advisory Action received for U.S. Appl. No. 15/411,110, mailed on Jun. 29, 2021, 4 pages.
Applicant-Initiated Interview Summary received for U.S. Appl. No. 15/411,110, mailed on Apr. 21, 2020, 5 pages.
Applicant-Initiated Interview Summary received for U.S. Appl. No. 15/411,110, mailed on Nov. 17, 2020, 7 pages.
Applicant-Initiated Interview Summary received for U.S. Appl. No. 15/411,110, mailed on Oct. 28, 2019, 6 pages.
Applicant-Initiated Interview Summary received for U.S. Appl. No. 17/327,204, mailed on Jan. 25, 2022, 5 pages.
Applicant-Initiated Interview Summary received for U.S. Appl. No. 15/411,110, mailed on May 3, 2023, 3 pages.
Applicant-Initiated Interview Summary received for U.S. Appl. No. 15/411,110, mailed on Oct. 31, 2022, 6 pages.
Applicant-Initiated Interview Summary received for U.S. Appl. No. 16/407,590, mailed on Jun. 5, 2020, 3 pages.
Applicant-Initiated Interview Summary received for U.S. Appl. No. 16/407,590, mailed on Nov. 17, 2020, 6 pages.
Applicant-Initiated Interview Summary received for U.S. Appl. No. 16/533,540, mailed on Apr. 19, 2023, 7 pages.
Applicant-Initiated Interview Summary received for U.S. Appl. No. 16/533,540, mailed on Aug. 16, 2021, 6 pages.
Applicant-Initiated Interview Summary received for U.S. Appl. No. 16/533,540, mailed on Aug. 25, 2022, 8 pages.
Applicant-Initiated Interview Summary received for U.S. Appl. No. 16/533,540, mailed on Dec. 21, 2020, 4 pages.
Applicant-Initiated Interview Summary received for U.S. Appl. No. 16/533,540, mailed on Feb. 28, 2022, 6 pages.
Applicant-Initiated Interview Summary received for U.S. Appl. No. 17/693,048, mailed on Apr. 16, 2024, 4 pages.
Corrected Notice of Allowance received for U.S. Appl. No. 16/533,540, mailed on Aug. 18, 2023, 3 pages.
Decision to Grant received for European Patent Application No. 16706081.3, mailed on Nov. 29, 2018, 2 pages.
Decision to Grant received for European Patent Application No. 18213157.3, mailed on Feb. 24, 2022, 2 pages.
Decision to Grant received for European Patent Application No. 22150207.3, mailed on Jul. 11, 2024, 2 pages.

(56) References Cited

OTHER PUBLICATIONS

Examiner's Answer to Appeal Brief received for U.S. Appl. No. 15/411,110, mailed on Feb. 1, 2022, 9 pages.
Extended European Search Report received for European Patent Application No. 17813879.8, mailed on Jan. 8, 2020, 8 pages.
Extended European Search Report received for European Patent Application No. 18213157.3, mailed on Apr. 12, 2019, 8 pages.
Extended European Search Report received for European Patent Application No. 22150207.3, mailed on Apr. 11, 2022, 11 pages.
Final Office Action received for U.S. Appl. No. 14/863,069, mailed on Jul. 5, 2018, 19 pages.
Final Office Action received for U.S. Appl. No. 15/411,110, mailed on Apr. 12, 2023, 27 pages.
Final Office Action received for U.S. Appl. No. 15/411,110, mailed on Mar. 5, 2020, 30 pages.
Final Office Action received for U.S. Appl. No. 15/411,110, mailed on Mar. 15, 2021, 28 pages.
Final Office Action received for U.S. Appl. No. 16/407,590, mailed on Aug. 25, 2020, 14 pages.
Final Office Action received for U.S. Appl. No. 16/533,540, mailed on Apr. 19, 2021, 38 pages.
Final Office Action received for U.S. Appl. No. 16/533,540, mailed on Jun. 15, 2022, 38 pages.
Final Office Action received for U.S. Appl. No. 17/693,048, mailed on Jul. 22, 2024, 39 pages.
Intention to Grant received for European Patent Application No. 16706081.3, mailed on Jul. 18, 2018, 8 pages.
Intention to Grant received for European Patent Application No. 16706081.3, mailed on Jun. 11, 2018, 7 pages.
Intention to Grant received for European Patent Application No. 18213157.3, mailed on May 19, 2021, 8 pages.
Intention to Grant received for European Patent Application No. 18213157.3, mailed on Oct. 27, 2021, 8 pages.
Intention to Grant received for European Patent Application No. 22150207.3, mailed on Mar. 21, 2024, 9 pages.
International Preliminary Report on Patentability received for PCT Patent Application No. PCT/US2016/016216, mailed on May 4, 2017, 14 pages.
International Preliminary Report on Patentability received for PCT Patent Application No. PCT/US2017/037057, mailed on Dec. 27, 2018, 24 pages.
International Preliminary Report on Patentability received for PCT Patent Application No. PCT/US2020/031528, mailed on Nov. 18, 2021, 13 pages.
International Preliminary Report on Patentability received for PCT Patent Application No. PCT/US2022/020042, mailed on Sep. 28, 2023, 17 pages.
International Search Report and Written Opinion received for PCT Patent Application No. PCT/US2016/016216, mailed on Jun. 27, 2016, 18 pages.
International Search Report and Written Opinion received for PCT Patent Application No. PCT/US2017/037057, mailed on Aug. 29, 2017, 26 pages.
International Search Report and Written Opinion received for PCT Patent Application No. PCT/US2020/031528, mailed on Sep. 23, 2020, 18 pages.
International Search Report and Written Opinion received for PCT Patent Application No. PCT/US2022/020042, mailed on Aug. 16, 2022, 25 pages.
International Search Report and Written Opinion received for PCT Patent Application No. PCT/US2023/024293, mailed on Dec. 11, 2023, 21 pages.
International Search Report and Written Opinion received for PCT Patent Application No. PCT/US2023/030104, mailed on Nov. 24, 2023, 11 pages.
Invitation to Pay Additional Fees and Partial International Search Report received for PCT Patent Application. PCT/US2023/024293, mailed on Oct. 10, 2023, 13 pages.
Invitation to Pay Additional Fees received for PCT Patent Application No. PCT/US2016/016216, mailed on Apr. 20, 2016, 6 pages.
Invitation to Pay Additional Fees received for PCT Patent Application No. PCT/US2020/031528, mailed on Jul. 30, 2020, 11 pages.
Invitation to Pay Additional Fees received for PCT Patent Application No. PCT/US2022/020042, mailed on Jun. 23, 2022, 21 pages.
Invitation to Restrict or Pay Additional Fees received for PCT Patent Application No. PCT/US2016/016216, mailed on Dec. 19, 2016, 9 pages.
Non-Final Office Action received for U.S. Appl. No. 14/863,069, mailed on Oct. 5, 2017, 19 pages.
Non-Final Office Action received for U.S. Appl. No. 15/411,110, mailed on Dec. 13, 2018, 23 pages.
Non-Final Office Action received for U.S. Appl. No. 15/411,110, mailed on Jul. 14, 2022, 28 pages.
Non-Final Office Action received for U.S. Appl. No. 15/411,110, mailed on Jul. 22, 2019, 29 pages.
Non-Final Office Action received for U.S. Appl. No. 15/411,110, mailed on Jun. 26, 2020, 32 pages.
Non-Final Office Action received for U.S. Appl. No. 16/407,590, mailed on Apr. 10, 2020, 12 pages.
Non-Final Office Action received for U.S. Appl. No. 16/533,540, mailed on Feb. 16, 2023, 39 pages.
Non-Final Office Action received for U.S. Appl. No. 16/533,540, mailed on Oct. 15, 2021, 40 pages.
Non-Final Office Action received for U.S. Appl. No. 16/533,540, mailed on Oct. 23, 2020, 34 pages.
Non-Final Office Action received for U.S. Appl. No. 17/327,204, mailed on Nov. 26, 2021, 13 pages.
Non-Final Office Action received for U.S. Appl. No. 17/693,048, mailed on Mar. 22, 2024, 22 pages.
Notice of Acceptance received for Australian Patent Application No. 2016215440, mailed on Feb. 28, 2019, 3 pages.
Notice of Acceptance received for Australian Patent Application No. 2022201720, mailed on Aug. 15, 2023, 3 pages.
Notice of Allowance received for Chinese Patent Application No. 201680008151.9, mailed on Jun. 16, 2020, 2 pages (1 page of English Translation and 1 page of Official Copy).
Notice of Allowance received for Chinese Patent Application No. 201780033621.1, mailed on Mar. 10, 2022, 2 pages (1 page of English Translation and 1 page of Official Copy).
Notice of Allowance received for U.S. Appl. No. 14/863,069, mailed on Feb. 6, 2019, 6 pages.
Notice of Allowance received for U.S. Appl. No. 14/863,069, mailed on Jun. 18, 2019, 6 pages.
Notice of Allowance received for U.S. Appl. No. 15/411,110, mailed on Aug. 2, 2023, 2 pages.
Notice of Allowance received for U.S. Appl. No. 15/411,110, mailed on May 23, 2023, 8 pages.
Notice of Allowance received for U.S. Appl. No. 16/407,590, mailed on Apr. 9, 2021, 3 pages.
Notice of Allowance received for U.S. Appl. No. 16/407,590, mailed on Dec. 16, 2020, 6 pages.
Notice of Allowance received for U.S. Appl. No. 16/407,590, mailed on Mar. 22, 2021, 6 pages.
Notice of Allowance received for U.S. Appl. No. 16/533,540, mailed on Aug. 15, 2023, 17 pages.
Notice of Allowance received for U.S. Appl. No. 17/327,204, mailed on May 18, 2022, 18 pages.
Office Action received for Australian Patent Application No. 2016215440, mailed on Jan. 22, 2019, 2 pages.
Office Action received for Australian Patent Application No. 2016215440, mailed on Mar. 13, 2018, 3 pages.
Office Action received for Australian Patent Application No. 2022201720, mailed on Feb. 15, 2023, 4 pages.
Office Action received for Australian Patent Application No. 2022201720, mailed on May 29, 2023, 3 pages.
Office Action received for Chinese Patent Application No. 201680008151.9, mailed on Apr. 20, 2020, 6 pages (3 pages of English Translation and 3 pages of Official Copy).
Office Action received for Chinese Patent Application No. 201680008151.9, mailed on Aug. 27, 2019, 24 pages (11 pages of English Translation and 13 pages of Official Copy).

(56) References Cited

OTHER PUBLICATIONS

Office Action received for Chinese Patent Application No. 201780033621.1, mailed on Dec. 14, 2021, 8 pages (4 pages of English Translation and 4 pages of Official Copy).
Office Action received for Chinese Patent Application No. 201780033621.1, mailed on Dec. 22, 2020, 30 pages (16 pages of English Translation and 14 pages of Official Copy).
Office Action received for Chinese Patent Application No. 201780033621.1, mailed on May 24, 2021, 18 pages (7 pages of English Translation and 11 pages of Official Copy).
Office Action received for Chinese Patent Application No. 202111392782.4, mailed on Mar. 28, 2024, 15 pages (8 pages of English Translation and 7 pages of Official Copy).
Office Action received for European Patent Application No. 17813879.8, mailed on Jun. 22, 2023, 7 pages.
Office Action received for European Patent Application No. 17813879.8, mailed on Oct. 20, 2021, 7 pages.
Office Action received for European Patent Application No. 18213157.3, mailed on May 15, 2020, 7 pages.
Office Action received for European Patent Application No. 20729345.7, mailed on Jul. 13, 2023, 9 pages.
Peoria Larryh., "Pair Your Bluetooth Device to Your Car", Available Online at: https://www.youtube.com/watch?v=4uW0GSsMDCY, Apr. 14, 2017, 2 pages.
Supplemental Notice of Allowance received for U.S. Appl. No. 14/863,069, mailed on Aug. 15, 2019, 3 pages.
Supplemental Notice of Allowance received for U.S. Appl. No. 14/863,069, mailed on Mar. 29, 2019, 3 pages.
Supplemental Notice of Allowance received for U.S. Appl. No. 14/863,069, mailed on Mar. 1, 2019, 3 pages.
Written Opinion Issued from International Preliminary Examining Authority for PCT Application No. PCT/US2016/016216, mailed on Feb. 20, 2017, 12 pages.
Applicant-Initiated Interview Summary received for U.S. Appl. No. 18/510,050, mailed on Nov. 25, 2024, 7 pages.
Notice of Acceptance received for Australian Patent Application No. 2023237162, mailed on Nov. 27, 2024, 3 pages.
Advisory Action received for U.S. Appl. No. 18/510,050, mailed on Dec. 31, 2024, 6 pages.
Corrected Notice of Allowance received for U.S. Appl. No. 18/103,376, mailed on Dec. 20, 2024, 5 pages.
International Preliminary Report on Patentability received for PCT Patent Application No. PCT/US2023/024293, mailed on Dec. 19, 2024, 15 pages.
Notice of Allowance received for U.S. Appl. No. 18/103,376, mailed on Dec. 17, 2024, 8 pages.
Supplemental Notice of Allowance received for U.S. Appl. No. 18/103,376, mailed on Dec. 23, 2024, 2 pages.
Final Office Action received for U.S. Appl. No. 18/510,050, mailed on Nov. 14, 2024, 22 pages.
International Search Report and Written Opinion received for PCT Patent Application No. PCT/US2024/024786, mailed on Jul. 11, 2024, 14 pages.
Notice of Allowance received for Chinese Patent Application No. 202111392782.4, mailed on Oct. 30, 2024, 4 pages (1 page of English Translation and 3 pages of Official Copy).
Applicant-Initiated Interview Summary received for U.S. Appl. No. 17/693,048, mailed on Mar. 7, 2025, 4 pages.
Applicant-Initiated Interview Summary received for U.S. Appl. No. 18/510,050, mailed on Feb. 18, 2025, 7 pages.
Final Office Action received for U.S. Appl. No. 17/693,048, mailed on Feb. 6, 2025, 44 pages.
Intention to Grant received for European Patent Application No. 20729345.7, mailed on Feb. 27, 2025, 9 pages.
International Preliminary Report on Patentability received for PCT Patent Application No. PCT/US2023/030104, mailed on Feb. 27, 2025, 8 pages.
Non-Final Office Action received for U.S. Appl. No. 18/510,050, mailed on Jan. 28, 2025, 25 pages.
Office Action received for European Patent Application No. 22714301.3, mailed on Feb. 12, 2025, 9 pages.
Supplemental Notice of Allowance received for U.S. Appl. No. 18/103,376, mailed on Feb. 10, 2025, 4 pages.
Intention to Grant received for European Patent Application No. 17813879.8, mailed on Apr. 28, 2025, 9 pages.
Intention to Grant received for European Patent Application No. 20729345.7, mailed on May 27, 2025, 8 pages.

\* cited by examiner

CUSTOMIZED USER INTERFACES

CROSS-REFERENCE TO RELATED APPLICATIONS

This application claims priority to U.S. Provisional Patent Application No. 63/349,076, filed Jun. 4, 2022, entitled "CUSTOMIZED USER INTERFACES," which relates to U.S. Provisional Patent Application No. 63/349,063, filed Jun. 4, 2022, and titled SYNCHRONIZED RENDERING, the contents of each of which are hereby incorporated by reference in their entirety.

FIELD

The present disclosure relates generally to computer user interfaces, and more specifically to techniques for displaying customized user interfaces.

BACKGROUND

User interfaces enable a user to interact with an electronic device. Some users access particular features of the electronic device more frequently than other features. Some users access particular features of the electronic device more frequently than other features under certain circumstances.

BRIEF SUMMARY

Some techniques for displaying customized user interfaces using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for displaying customized user interfaces. Such methods and interfaces optionally complement or replace other methods for displaying customized user interfaces. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: at a computer system of a vehicle, wherein the computer system is in communication with a display generation component and one or more input devices: detecting one or more contextual factors; receiving, via the one or more input devices, user input; and in response to receiving the user input, displaying, via the display generation component, a set of one or more selectable vehicle climate control options for controlling the climate in the vehicle, wherein: in accordance with a determination, based on the one or more contextual factors, that a first set of contextual criteria are met, the set of one or more selectable vehicle climate control options includes a first selectable vehicle climate control option without including a second selectable vehicle climate control option; and in accordance with a determination, based on the one or more contextual factors, that a second set of contextual criteria are met, the set of one or more selectable vehicle climate control options includes the second selectable vehicle climate control option without including the first selectable vehicle climate control option.

In accordance with some embodiments, a non-transitory computer-readable storage medium is described. The non-transitory computer-readable storage medium stores one or more programs configured to be executed by one or more processors of a computer system of a vehicle, wherein the computer system is in communication with a display generation component and one or more input devices, the one or more programs including instructions for: detecting one or more contextual factors; receiving, via the one or more input devices, user input; and in response to receiving the user input, displaying, via the display generation component, a set of one or more selectable vehicle climate control options for controlling the climate in the vehicle, wherein: in accordance with a determination, based on the one or more contextual factors, that a first set of contextual criteria are met, the set of one or more selectable vehicle climate control options includes a first selectable vehicle climate control option without including a second selectable vehicle climate control option; and in accordance with a determination, based on the one or more contextual factors, that a second set of contextual criteria are met, the set of one or more selectable vehicle climate control options includes the second selectable vehicle climate control option without including the first selectable vehicle climate control option.

In accordance with some embodiments, a transitory computer-readable storage medium is described. The transitory computer-readable storage medium stores one or more programs configured to be executed by one or more processors of a computer system of a vehicle, wherein the computer system is in communication with a display generation component and one or more input devices, the one or more programs including instructions for: detecting one or more contextual factors; receiving, via the one or more input devices, user input; and in response to receiving the user input, displaying, via the display generation component, a set of one or more selectable vehicle climate control options for controlling the climate in the vehicle, wherein: in accordance with a determination, based on the one or more contextual factors, that a first set of contextual criteria are met, the set of one or more selectable vehicle climate control options includes a first selectable vehicle climate control option without including a second selectable vehicle climate control option; and in accordance with a determination, based on the one or more contextual factors, that a second set of contextual criteria are met, the set of one or more selectable vehicle climate control options includes the second selectable vehicle climate control option without including the first selectable vehicle climate control option.

In accordance with some embodiments, a computer system of a vehicle is described. The computer system is configured to communicate with a display generation component and one or more input devices and comprises: one or more processors; and memory storing one or more programs configured to be executed by the one or more processors, the one or more programs including instructions for: detecting one or more contextual factors; receiving, via the one or more input devices, user input; and in response to receiving the user input, displaying, via the display generation component, a set of one or more selectable vehicle climate control options for controlling the climate in the vehicle, wherein: in accordance with a determination, based on the one or more contextual factors, that a first set of contextual criteria are met, the set of one or more selectable vehicle climate control options includes a first selectable vehicle climate control option without including a second selectable vehicle climate control option; and in accordance with a determination, based on the one or more contextual factors, that a second set of contextual criteria are met, the set of one or more selectable vehicle climate control options includes the second selectable vehicle climate control option without including the first selectable vehicle climate control option.

In accordance with some embodiments, a computer system of a vehicle is described. The computer system is configured to communicate with a display generation component and one or more input devices. The computer system comprises: means for detecting one or more contextual factors; means for receiving, via the one or more input devices, user input; and means, responsive to receiving the user input, for displaying, via the display generation component, a set of one or more selectable vehicle climate control options for controlling the climate in the vehicle, wherein: in accordance with a determination, based on the one or more contextual factors, that a first set of contextual criteria are met, the set of one or more selectable vehicle climate control options includes a first selectable vehicle climate control option without including a second selectable vehicle climate control option; and in accordance with a determination, based on the one or more contextual factors, that a second set of contextual criteria are met, the set of one or more selectable vehicle climate control options includes the second selectable vehicle climate control option without including the first selectable vehicle climate control option.

In accordance with some embodiments, a computer program product is described. The computer program product comprises one or more programs configured to be executed by one or more processors of a computer system of a vehicle, wherein the computer system is in communication with a display generation component and one or more input devices, the one or more programs including instructions for: detecting one or more contextual factors; receiving, via the one or more input devices, user input; and in response to receiving the user input, displaying, via the display generation component, a set of one or more selectable vehicle climate control options for controlling the climate in the vehicle, wherein: in accordance with a determination, based on the one or more contextual factors, that a first set of contextual criteria are met, the set of one or more selectable vehicle climate control options includes a first selectable vehicle climate control option without including a second selectable vehicle climate control option; and in accordance with a determination, based on the one or more contextual factors, that a second set of contextual criteria are met, the set of one or more selectable vehicle climate control options includes the second selectable vehicle climate control option without including the first selectable vehicle climate control option.

In accordance with some embodiments, a method is described. The method comprises: at a computer system of a first vehicle, wherein the computer system is in communication with a display generation component: detecting an electronic device inside a cabin of the first vehicle, wherein the electronic device was present inside a cabin of a second vehicle when a user interface and/or a vehicle setting of the second vehicle was configured to a first option; and in response to detecting the electronic device inside the cabin of the first vehicle, configuring a user interface of the display generation component and/or a vehicle setting of the first vehicle to the first option based on the electronic device being present inside the cabin of the second vehicle when the user interface and/or the vehicle setting of the second vehicle was configured to the first option.

In accordance with some embodiments, a non-transitory computer-readable storage medium is described. The non-transitory computer-readable storage medium stores one or more programs configured to be executed by one or more processors of a computer system of a first vehicle, wherein the computer system is in communication with a display generation component, the one or more programs including instructions for: detecting an electronic device inside a cabin of the first vehicle, wherein the electronic device was present inside a cabin of a second vehicle when a user interface and/or a vehicle setting of the second vehicle was configured to a first option; and in response to detecting the electronic device inside the cabin of the first vehicle, configuring a user interface of the display generation component and/or a vehicle setting of the first vehicle to the first option based on the electronic device being present inside the cabin of the second vehicle when the user interface and/or the vehicle setting of the second vehicle was configured to the first option.

In accordance with some embodiments, a transitory computer-readable storage medium is described. The transitory computer-readable storage medium stores one or more programs configured to be executed by one or more processors of a computer system of a first vehicle, wherein the computer system is in communication with a display generation component, the one or more programs including instructions for: detecting an electronic device inside a cabin of the first vehicle, wherein the electronic device was present inside a cabin of a second vehicle when a user interface and/or a vehicle setting of the second vehicle was configured to a first option; and in response to detecting the electronic device inside the cabin of the first vehicle, configuring a user interface of the display generation component and/or a vehicle setting of the first vehicle to the first option based on the electronic device being present inside the cabin of the second vehicle when the user interface and/or the vehicle setting of the second vehicle was configured to the first option.

In accordance with some embodiments, a computer system of a first vehicle is described. The computer system is configured to communicate with a display generation component. The computer system comprises: one or more processors; and memory storing one or more programs configured to be executed by the one or more processors, the one or more programs including instructions for: detecting an electronic device inside a cabin of the first vehicle, wherein the electronic device was present inside a cabin of a second vehicle when a user interface and/or a vehicle setting of the second vehicle was configured to a first option; and in response to detecting the electronic device inside the cabin of the first vehicle, configuring a user interface of the display generation component and/or a vehicle setting of the first vehicle to the first option based on the electronic device being present inside the cabin of the second vehicle when the user interface and/or the vehicle setting of the second vehicle was configured to the first option.

In accordance with some embodiments, a computer system of a first vehicle is described, wherein the computer system is configured to communicate with a display generation component. The computer system comprises: means for detecting an electronic device inside a cabin of the first vehicle, wherein the electronic device was present inside a cabin of a second vehicle when a user interface and/or a vehicle setting of the second vehicle was configured to a first option; and means, responsive to detecting the electronic device inside the cabin of the first vehicle, for configuring a user interface of the display generation component and/or a vehicle setting of the first vehicle to the first option based on the electronic device being present inside the cabin of the second vehicle when the user interface and/or the vehicle setting of the second vehicle was configured to the first option.

In accordance with some embodiments, a computer program product is described. The computer program product comprises one or more programs configured to be executed by one or more processors of a computer system of a first vehicle, wherein the computer system is in communication with a display generation component, the one or more programs including instructions for: detecting an electronic device inside a cabin of the first vehicle, wherein the electronic device was present inside a cabin of a second vehicle when a user interface and/or a vehicle setting of the second vehicle was configured to a first option; and in response to detecting the electronic device inside the cabin of the first vehicle, configuring a user interface of the display generation component and/or a vehicle setting of the first vehicle to the first option based on the electronic device being present inside the cabin of the second vehicle when the user interface and/or the vehicle setting of the second vehicle was configured to the first option.

In accordance with some embodiments, a method is described. The method comprises: at a computer system of a vehicle, wherein the computer system is in communication with a first display generation component and second display generation component: concurrently detecting a first electronic device in a cabin of the vehicle and a second electronic device in the cabin of the vehicle; displaying, via the first display generation component, a first user interface based on a first set of contextual information including detection of the first electronic device; and displaying, via the second display generation component, a second user interface based on a second set of contextual information including detection of the second electronic device.

In accordance with some embodiments, a non-transitory computer-readable storage medium is described. The non-computer-readable storage medium stores one or more programs configured to be executed by one or more processors of a computer system of a vehicle, wherein the computer system is in communication with a first display generation component and a second display generation component, the one or more programs including instructions for: concurrently detecting a first electronic device in a cabin of the vehicle and a second electronic device in the cabin of the vehicle; displaying, via the first display generation component, a first user interface based on a first set of contextual information including detection of the first electronic device; and displaying, via the second display generation component, a second user interface based on a second set of contextual information including detection of the second electronic device.

In accordance with some embodiments, a transitory computer-readable storage medium is described. The computer-readable storage medium stores one or more programs configured to be executed by one or more processors of a computer system of a vehicle, wherein the computer system is in communication with a first display generation component and a second display generation component, the one or more programs including instructions for: concurrently detecting a first electronic device in a cabin of the vehicle and a second electronic device in the cabin of the vehicle; displaying, via the first display generation component, a first user interface based on a first set of contextual information including detection of the first electronic device; and displaying, via the second display generation component, a second user interface based on a second set of contextual information including detection of the second electronic device.

In accordance with some embodiments, a computer system of a vehicle is described. The computer system is configured to communicate with a first display generation component and a second display generation component. The computer system comprises: one or more processors; and memory storing one or more programs configured to be executed by the one or more processors, the one or more programs including instructions for: concurrently detecting a first electronic device in a cabin of the vehicle and a second electronic device in the cabin of the vehicle; displaying, via the first display generation component, a first user interface based on a first set of contextual information including detection of the first electronic device; and displaying, via the second display generation component, a second user interface based on a second set of contextual information including detection of the second electronic device.

In accordance with some embodiments, a computer system of a vehicle is described. The computer system is configured to communicate with a first display generation component and a second display generation component. The computer system comprises: means for concurrently detecting a first electronic device in a cabin of the vehicle and a second electronic device in the cabin of the vehicle; means for displaying, via the first display generation component, a first user interface based on a first set of contextual information including detection of the first electronic device; and means for displaying, via the second display generation component, a second user interface based on a second set of contextual information including detection of the second electronic device.

In accordance with some embodiments, a computer program product is described. The computer program product comprises one or more programs configured to be executed by one or more processors of a computer system of a vehicle, wherein the computer system is in communication with a first display generation component and a second display generation component, the one or more programs including instructions for: concurrently detecting a first electronic device in a cabin of the vehicle and a second electronic device in the cabin of the vehicle; displaying, via the first display generation component, a first user interface based on a first set of contextual information including detection of the first electronic device; and displaying, via the second display generation component, a second user interface based on a second set of contextual information including detection of the second electronic device.

In accordance with some embodiments, a method is described. The method comprises: at a computer system of a vehicle, wherein the computer system is in communication with a display generation component: receiving, from a first source, first video content; receiving, from a second source different from the first source, second video content that is different from the first video content; compositing the first video content and the second video content to produce a composited video content; and displaying, via the display generation component, the composited video.

In accordance with some embodiments, a non-transitory computer-readable storage medium is described. The non-transitory computer-readable storage medium stores one or more programs configured to be executed by one or more processors of a computer system of a vehicle, wherein the computer system is in communication with a display generation component, the one or more programs including instructions for: receiving, from a first source, first video content; receiving, from a second source different from the first source, second video content that is different from the first video content; compositing the first video content and the second video content to produce a composited video content; and displaying, via the display generation component, the composited video.

In accordance with some embodiments, a transitory computer-readable storage medium is described. The transitory computer-readable storage medium stores one or more programs configured to be executed by one or more processors of a computer system of a vehicle, wherein the computer system is in communication with a display generation component, the one or more programs including instructions for: receiving, from a first source, first video content; receiving, from a second source different from the first source, second video content that is different from the first video content; compositing the first video content and the second video content to produce a composited video content; and displaying, via the display generation component, the composited video.

In accordance with some embodiments, a computer system of a vehicle is described. The computer system is configured to communicate with a display generation component. The computer system comprises: one or more processors; and memory storing one or more programs configured to be executed by the one or more processors, the one or more programs including instructions for: receiving, from a first source, first video content; receiving, from a second source different from the first source, second video content that is different from the first video content; compositing the first video content and the second video content to produce a composited video content; and displaying, via the display generation component, the composited video.

In accordance with some embodiments, a computer system of a vehicle is described. The computer system is configured to communicate with a display generation component. The computer system comprises: means for receiving, from a first source, first video content; means for receiving, from a second source different from the first source, second video content that is different from the first video content; means for compositing the first video content and the second video content to produce a composited video content; and means for displaying, via the display generation component, the composited video.

In accordance with some embodiments, a computer program product is described. The computer program product comprises one or more programs configured to be executed by one or more processors of a computer system of a vehicle, wherein the computer system is in communication with a display generation component, the one or more programs including instructions for: receiving, from a first source, first video content; receiving, from a second source different from the first source, second video content that is different from the first video content; compositing the first video content and the second video content to produce a composited video content; and displaying, via the display generation component, the composited video.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for displaying customized user interfaces, thereby increasing the effectiveness, efficiency, and user satisfaction with such devices. Such methods and interfaces may complement or replace other methods for displaying customized user interfaces.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for displaying customized user interfaces, such as by displaying customized user interfaced based on contextual information. Such techniques can reduce the cognitive burden on a user who uses the user interfaces, thereby enhancing productivity. Further, such techniques can reduce processor and battery power otherwise wasted on redundant user inputs.

Figure 11:
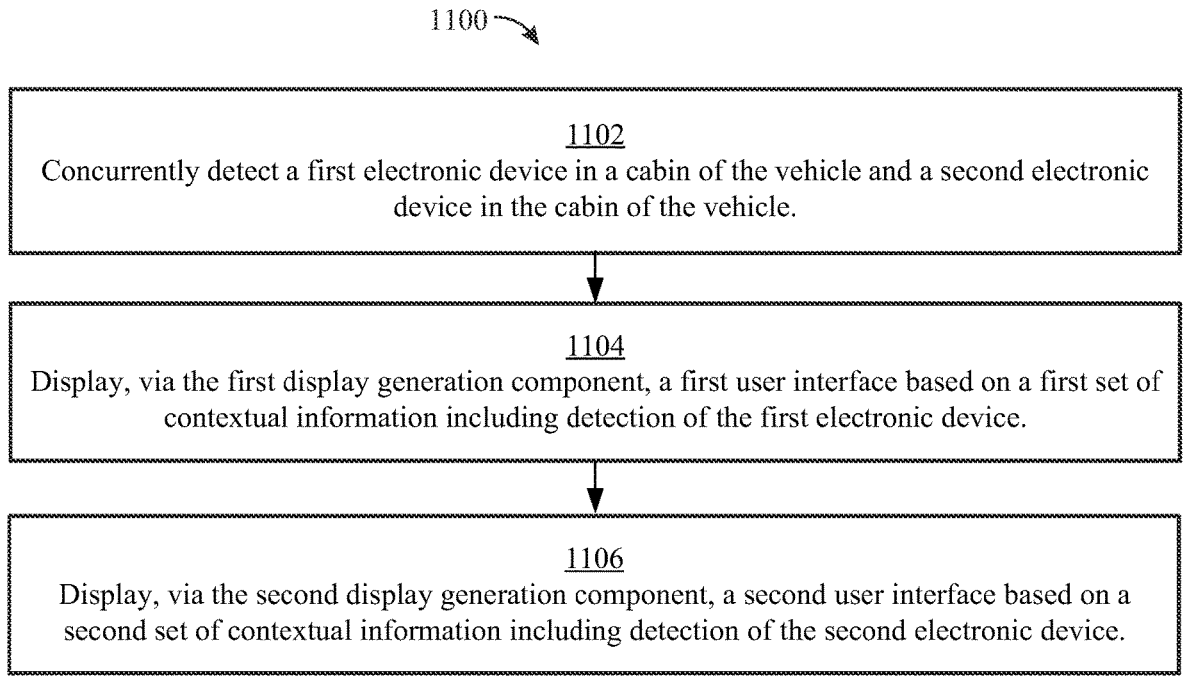
FIG. 11 is a flow diagram illustrating methods of displaying user interfaces on two displays in accordance with some embodiments.
Figure 12A:
FIGS. 12A-12C illustrate exemplary techniques for displaying a composited user interface in accordance with some embodiments.
Figure 12B:
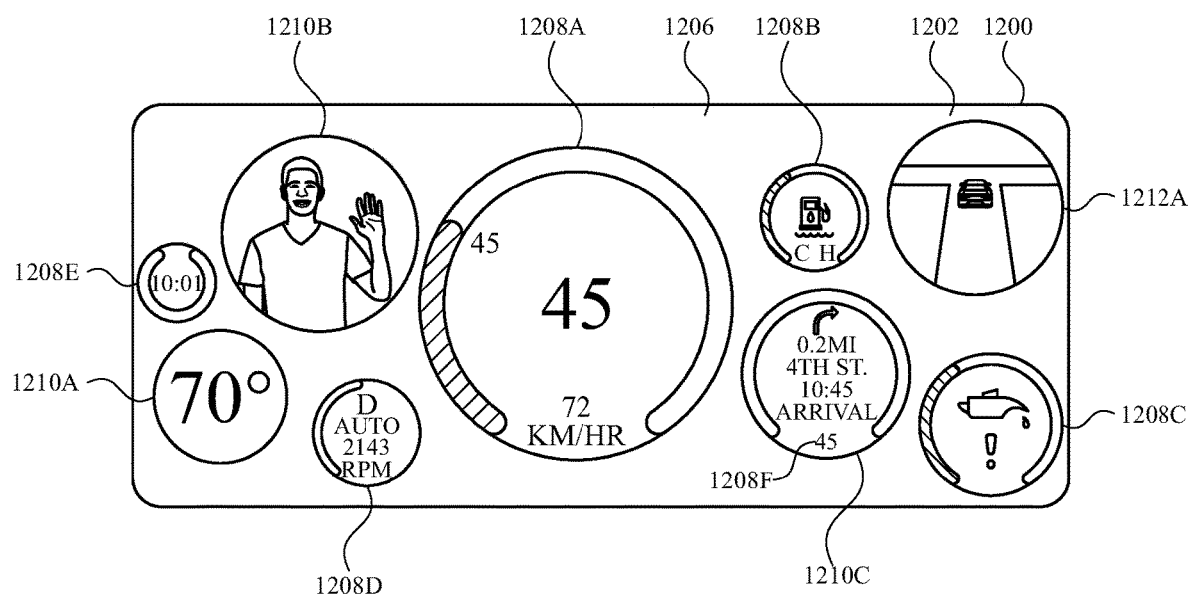
Figure 12C:
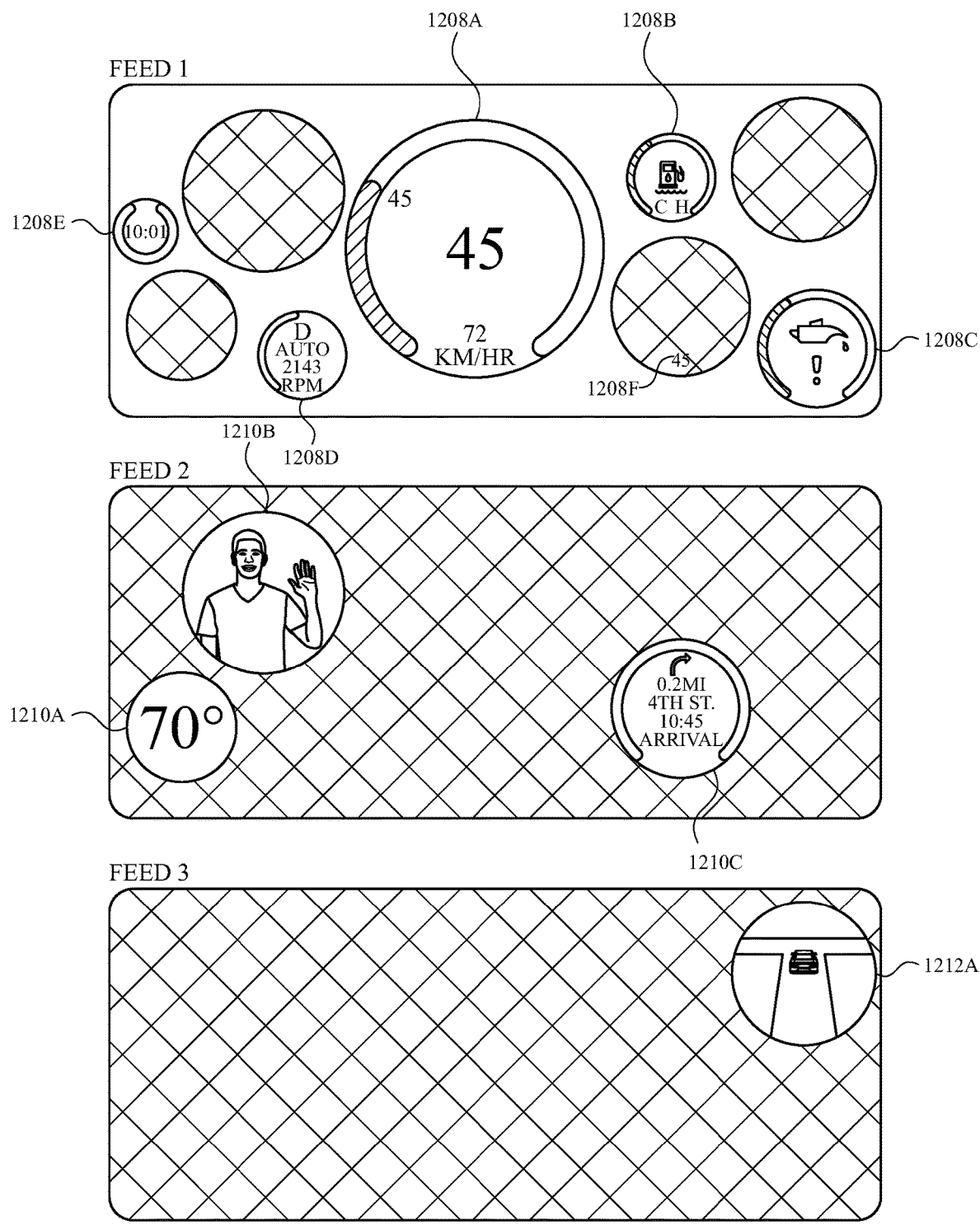
Figure 13:
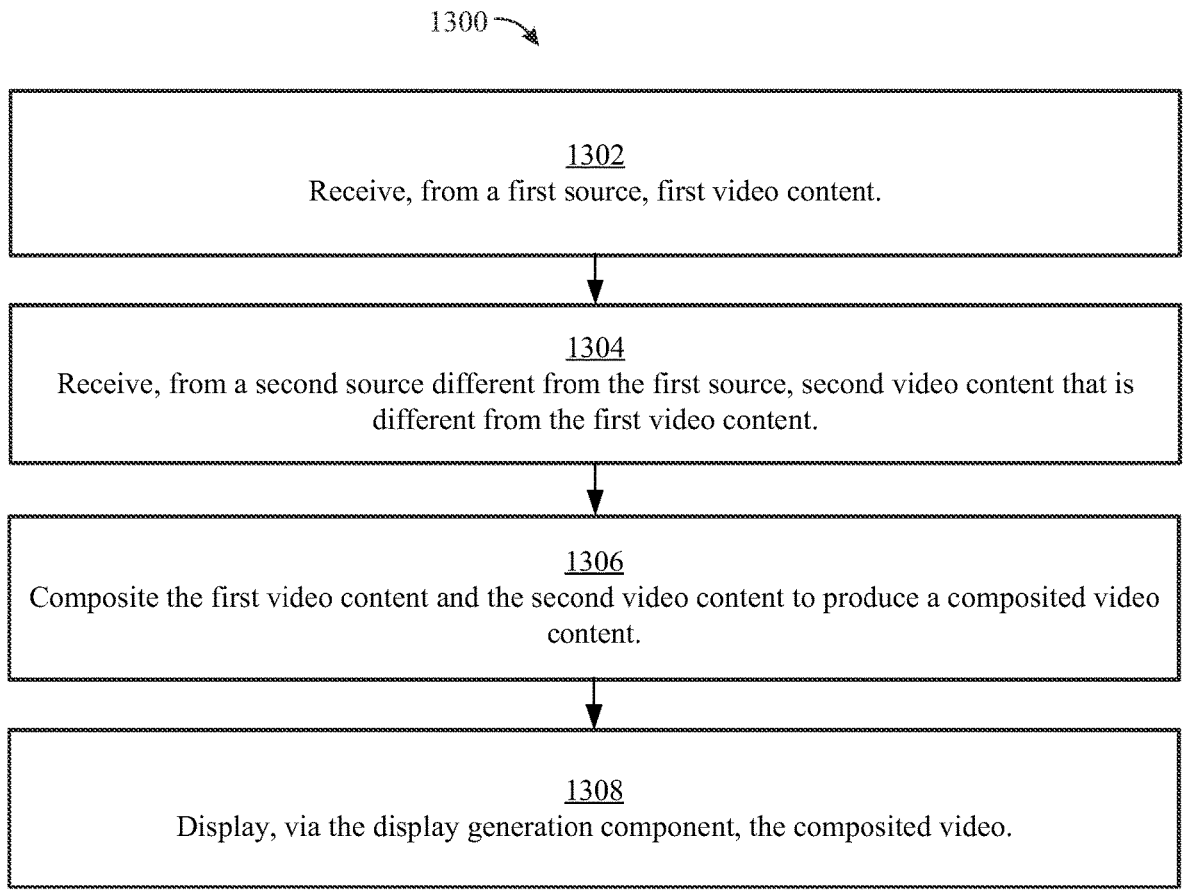
FIG. 13 is a flow diagram illustrating methods of displaying a composited user interface in accordance with some embodiments.
Figure 14A:
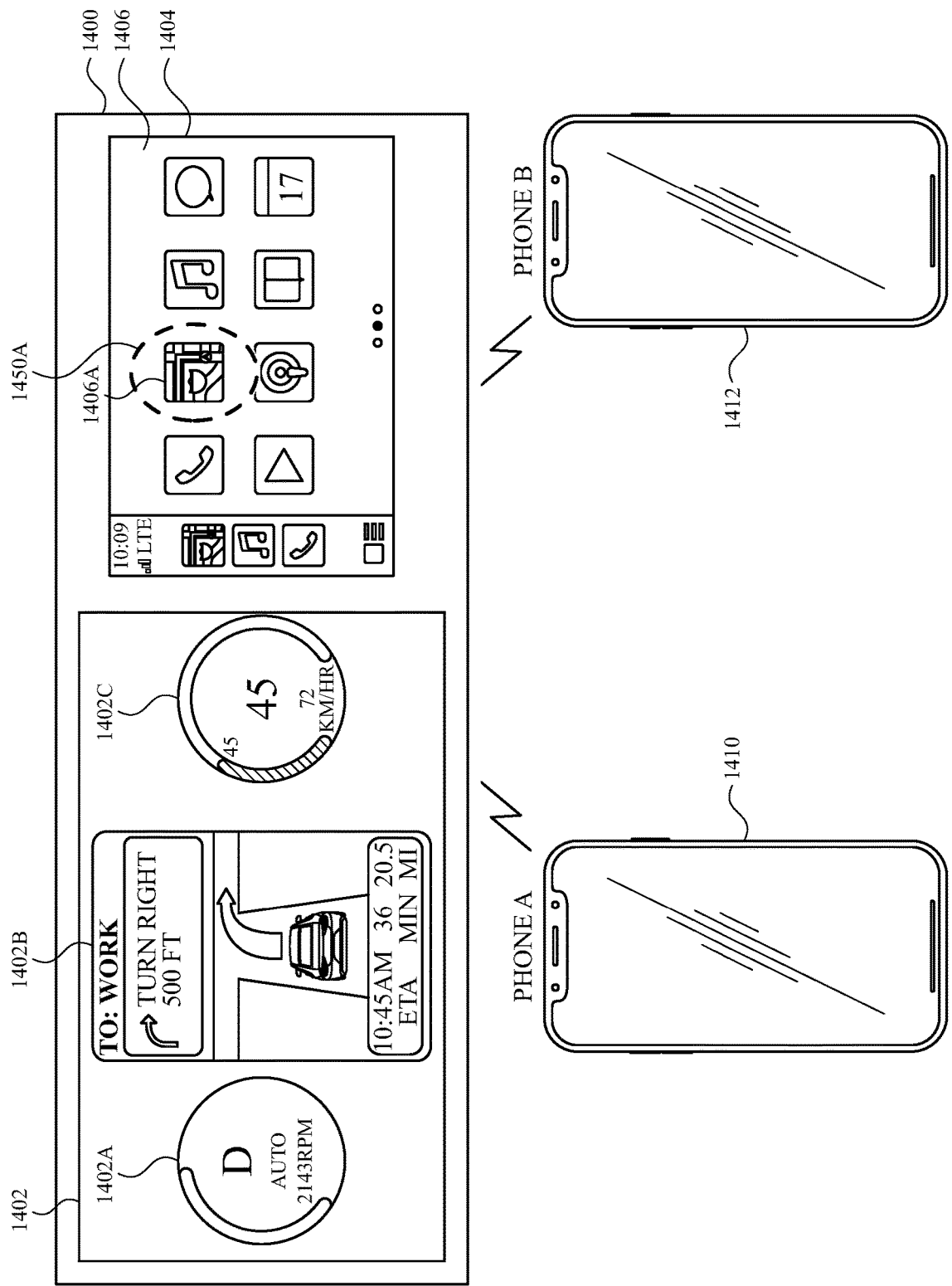
FIGS. 14A-14C illustrate exemplary techniques for displaying content in accordance with some embodiments.
Figure 14B:
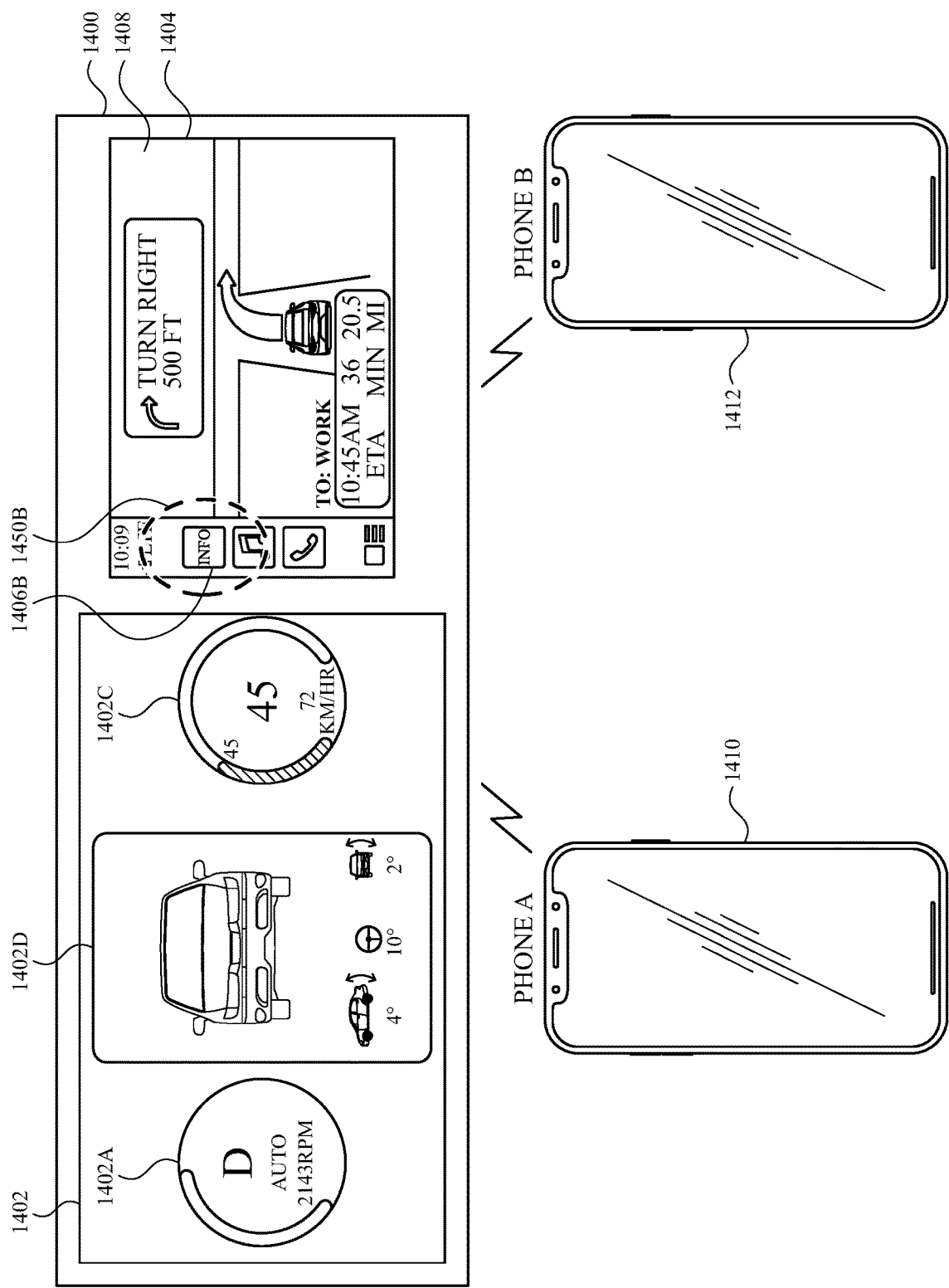
Figure 14C:
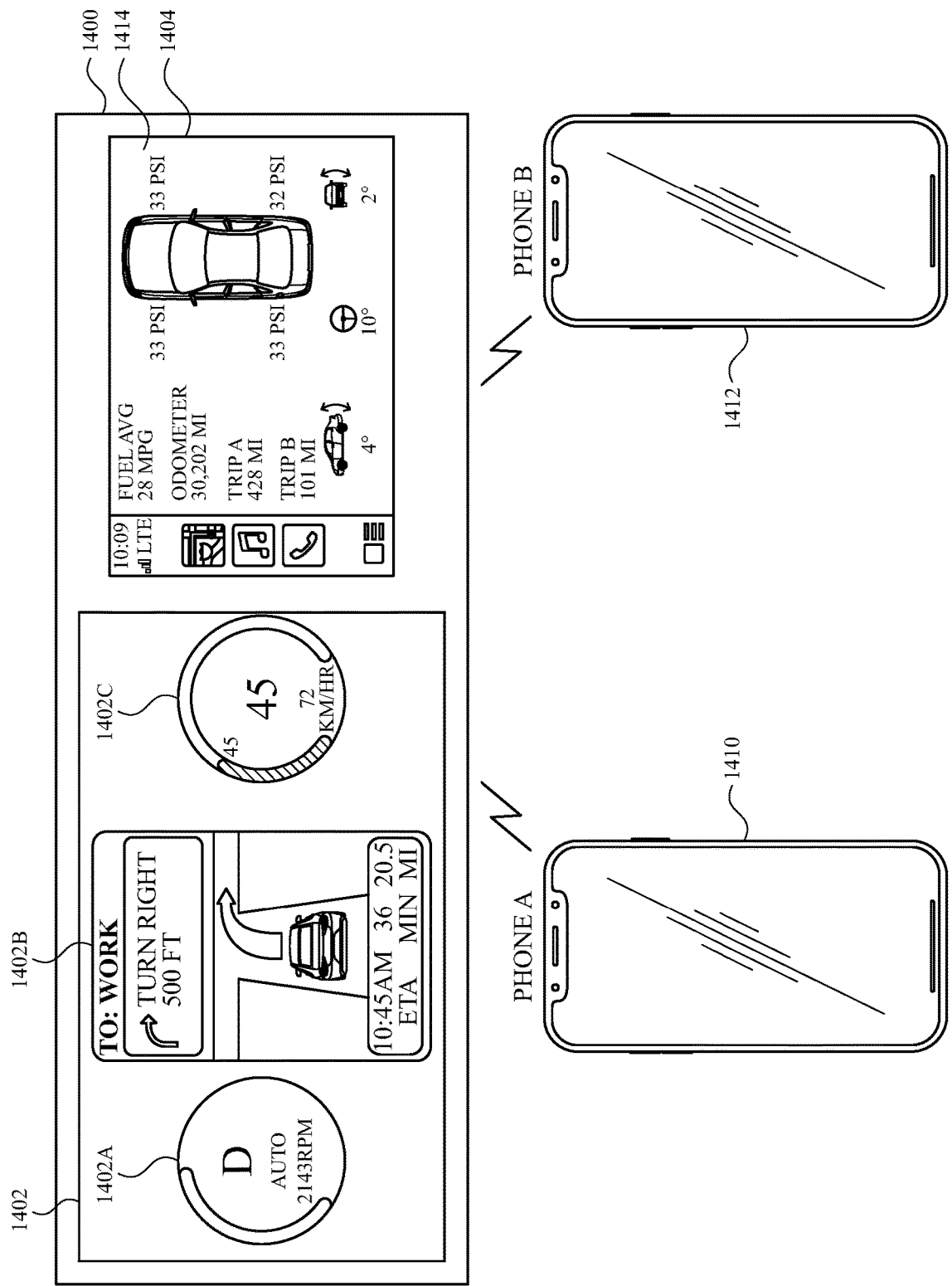

Below, FIGS. 1A-1B, 2, 3, 4A-4B, and 5A-5B provide a description of exemplary devices for performing the techniques for displaying customized user interfaces. FIGS. 6A-6I illustrate exemplary techniques for displaying climate control user interfaces in accordance with some embodiments. FIG. 7 is a flow diagram illustrating methods of displaying climate control user interfaces in accordance with some embodiments. The user interfaces in FIGS. 6A-6I are used to illustrate the processes described below, including the processes in FIG. 7. FIGS. 8A-8F illustrate techniques for displaying user interfaces based on detecting one or more electronic devices. FIG. 9 is a flow diagram illustrating methods of displaying user interfaces based on detecting one or more electronic devices in accordance with some embodiments. The user interfaces in FIGS. 8A-8F are used to illustrate the processes described below, including the processes in FIG. 9. FIGS. 10A-10D illustrate exemplary techniques for displaying user interfaces on two displays in accordance with some embodiments. FIG. 11 is a flow diagram illustrating methods of displaying user interfaces on two displays in accordance with some embodiments. The user interfaces in FIGS. 10A-10D are used to illustrate the processes described below, including the processes in FIG. 11. FIGS. 12A-12C illustrate exemplary techniques for displaying a composited user interface in accordance with some embodiments. FIG. 13 is a flow diagram illustrating methods of displaying a composited user interface in accordance with some embodiments. The user interfaces in FIGS. 12A-12C are used to illustrate the processes described below, including the processes in FIG. 13. FIGS. 14A-14C illustrate exemplary techniques for displaying content in accordance with some embodiments.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
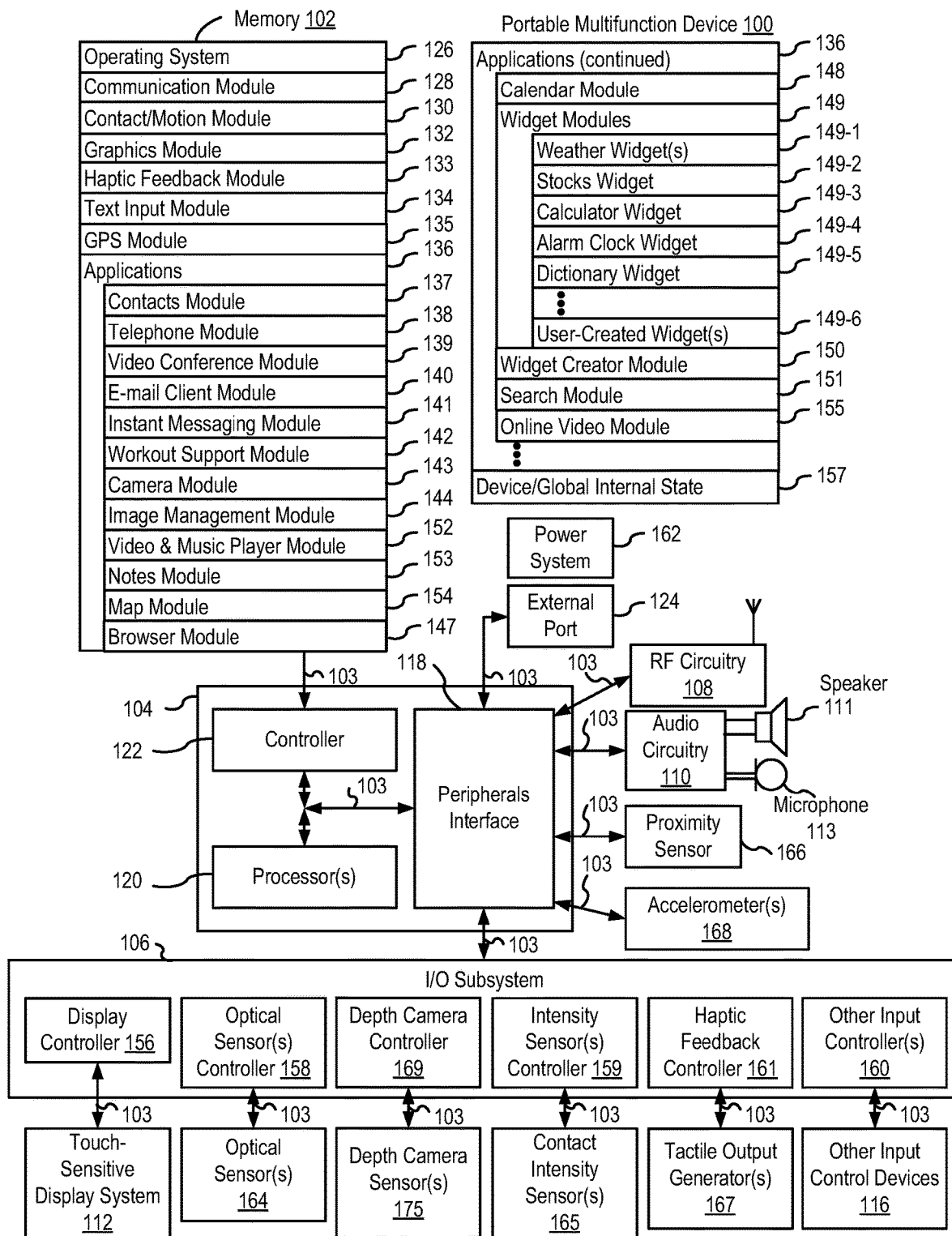
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
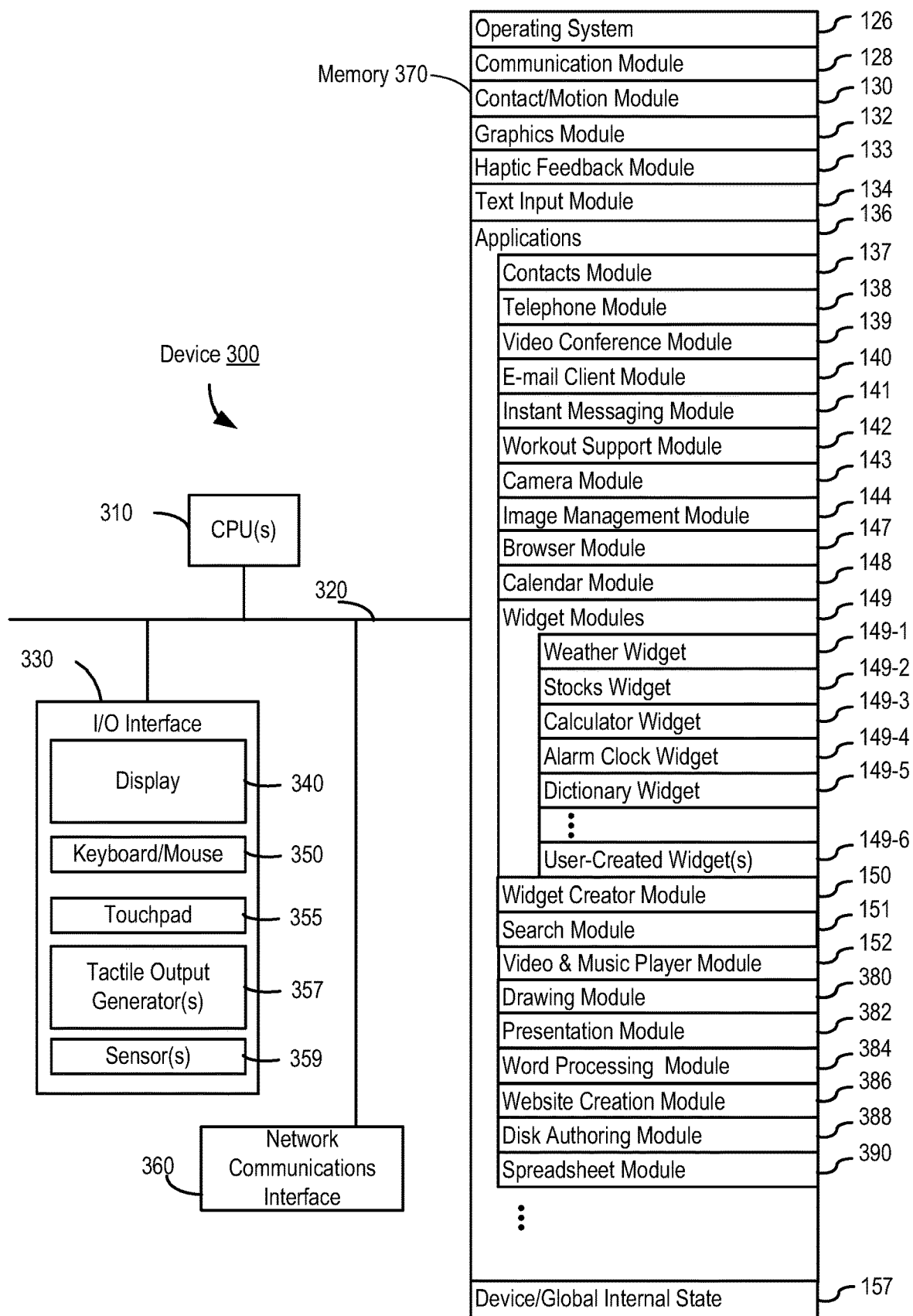
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
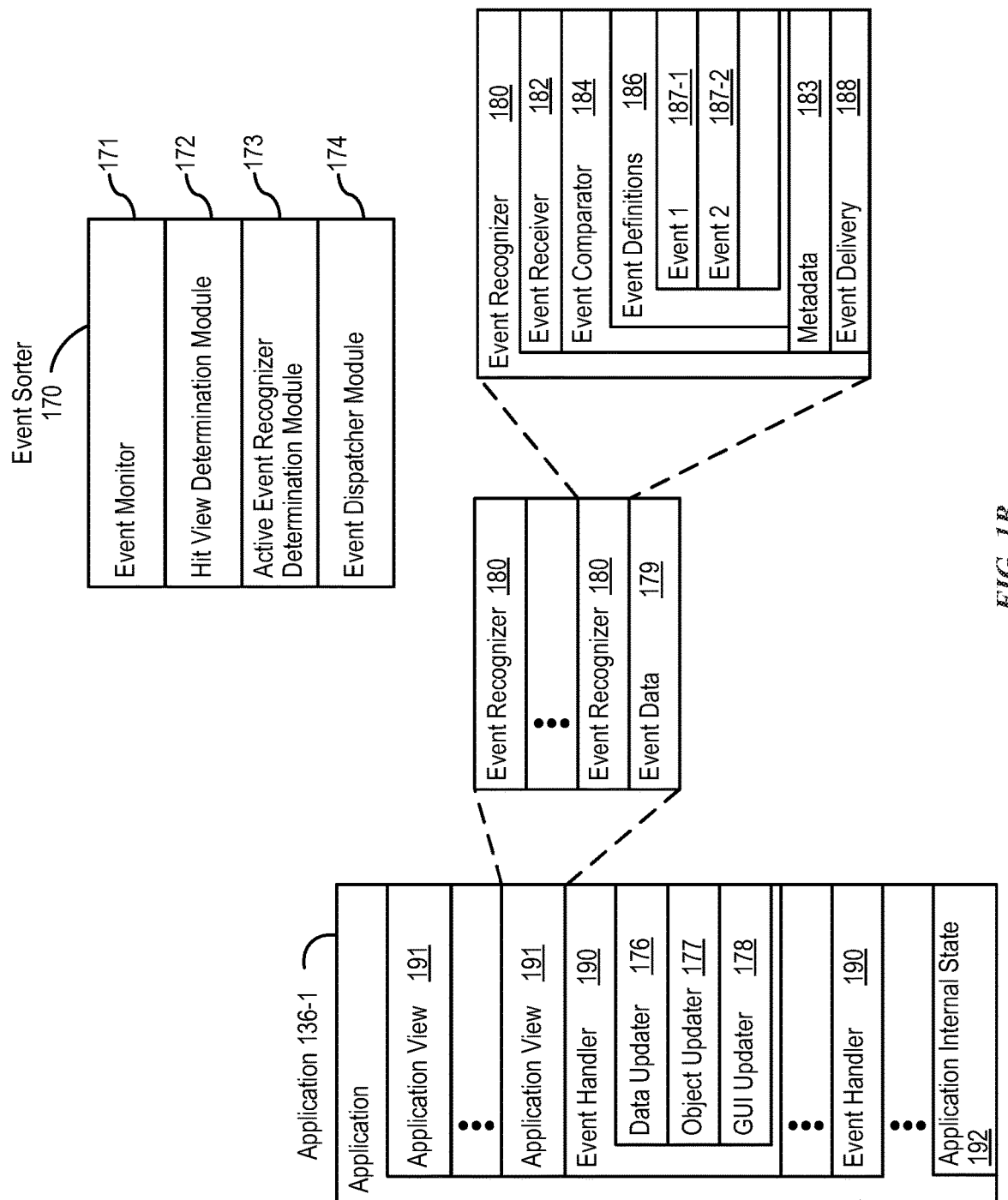
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object.

In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
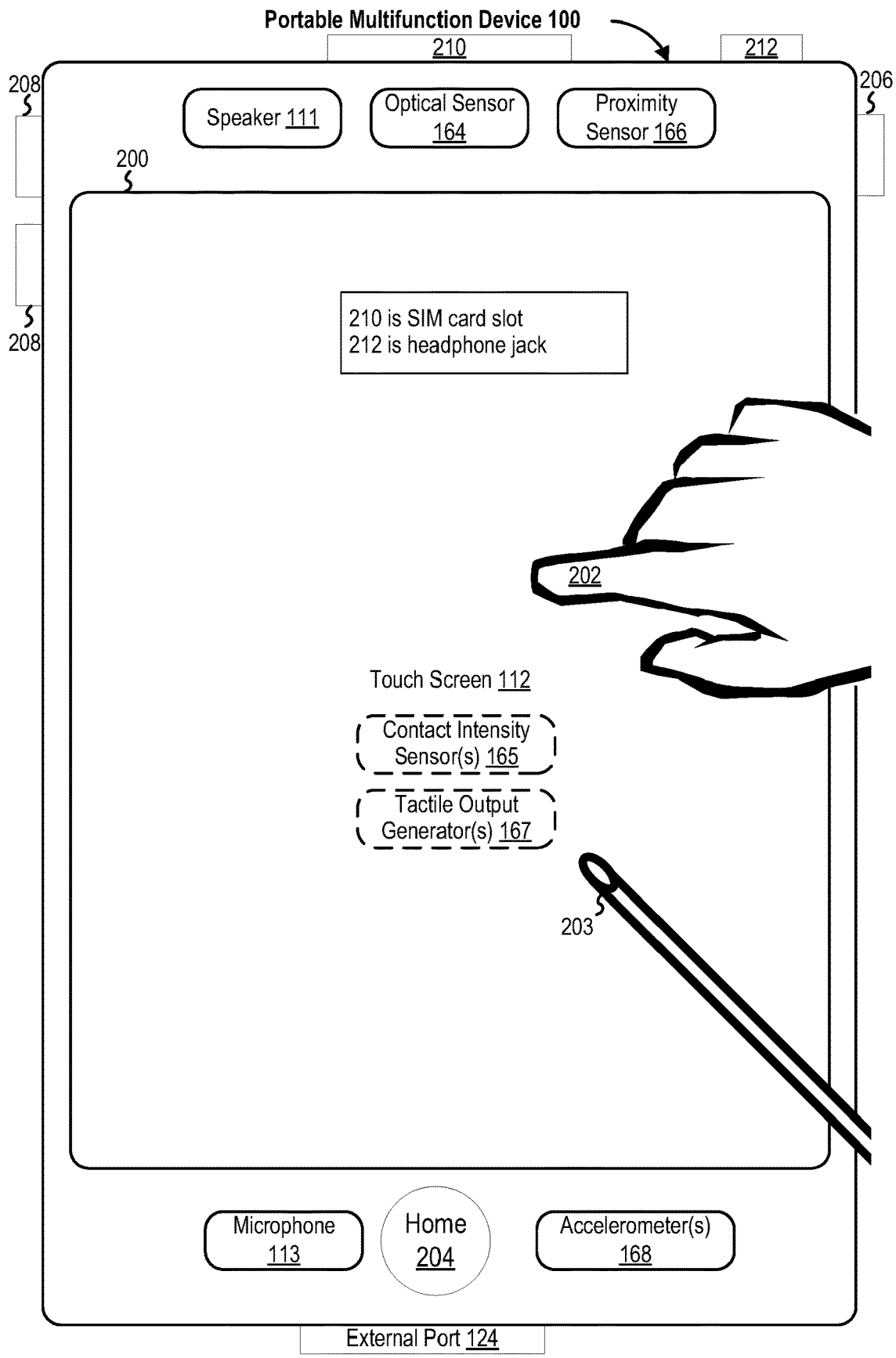
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
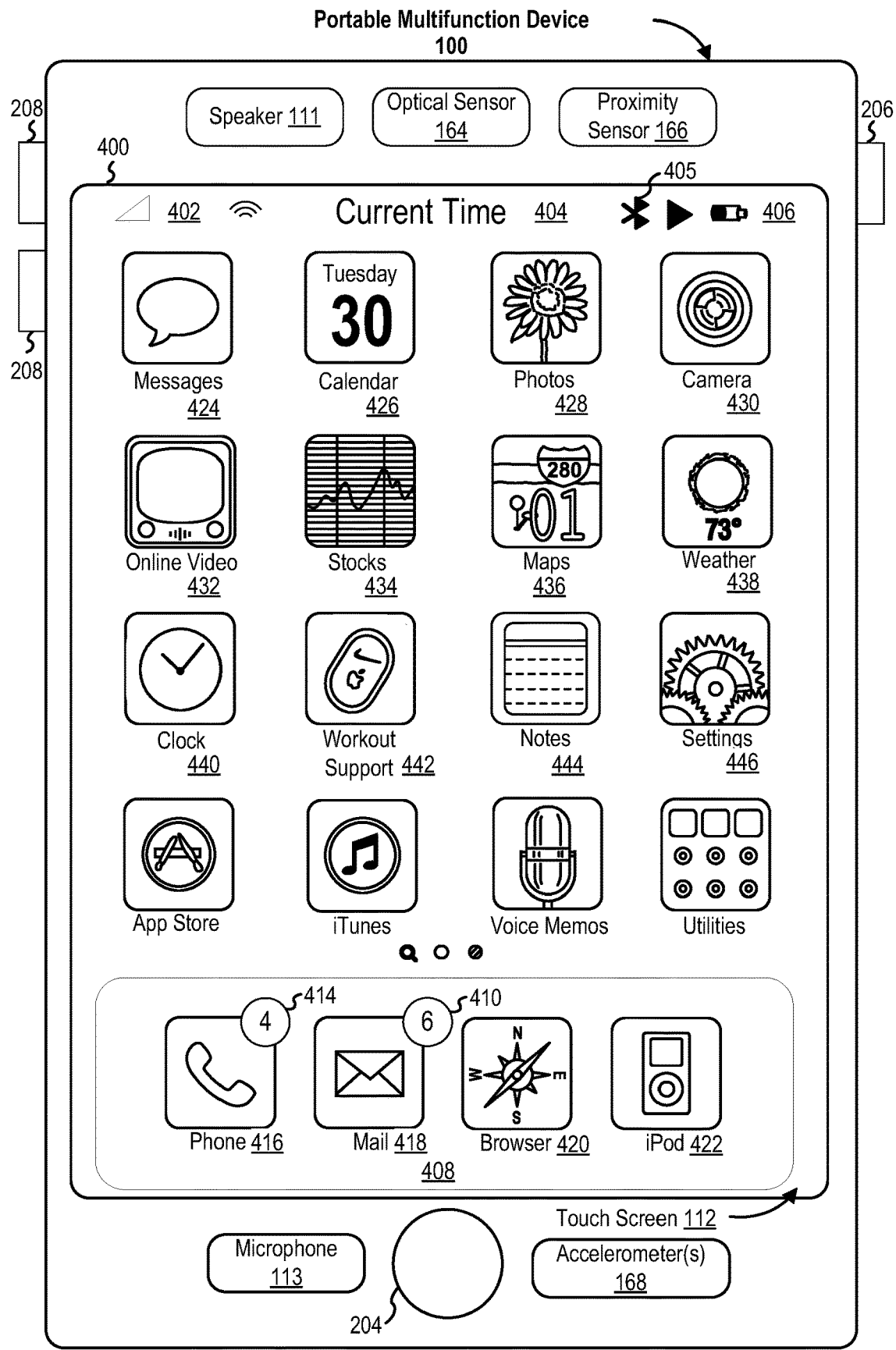
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
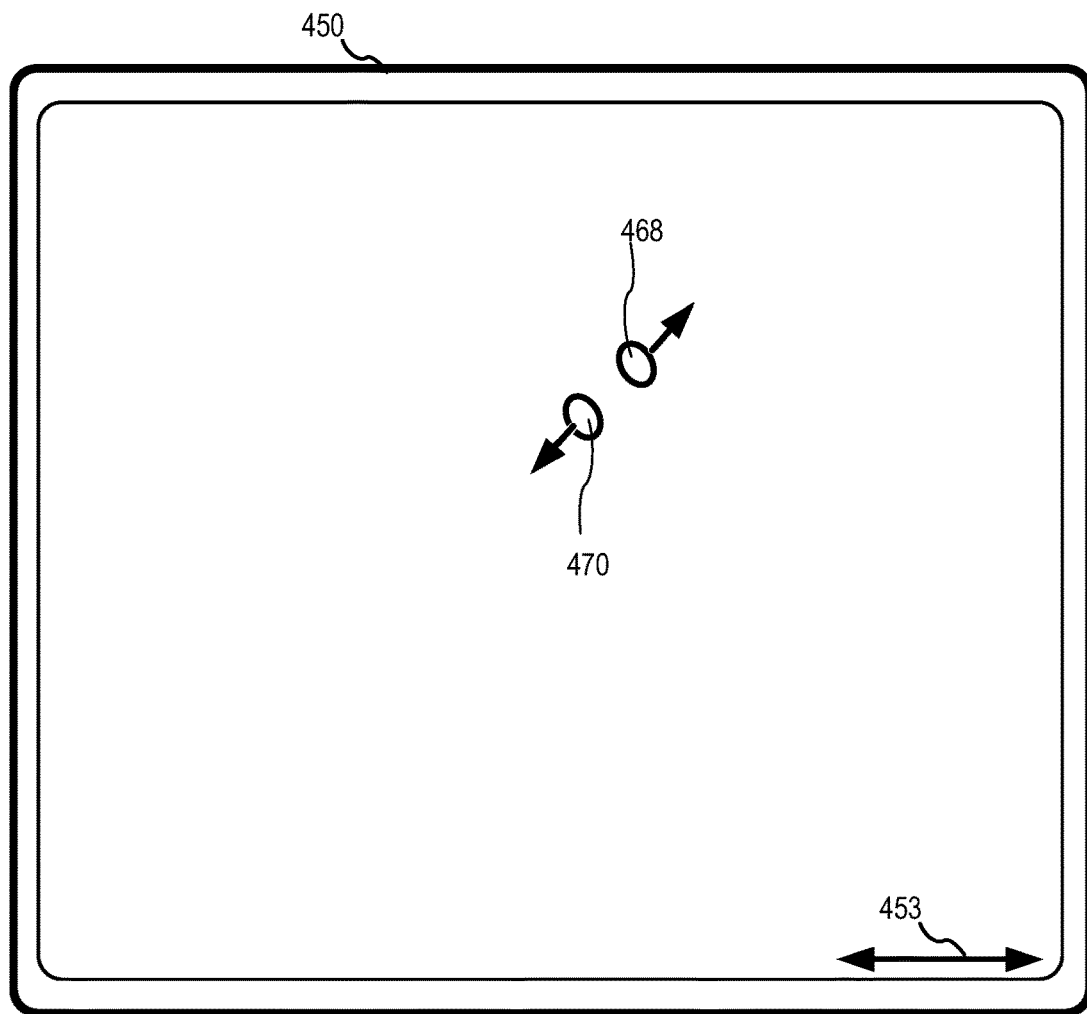
FIG. 4B illustrates an exemplary user interface for a multifunction device with a touch-sensitive surface that is separate from the display in accordance with some embodiments.
Figure 4B:
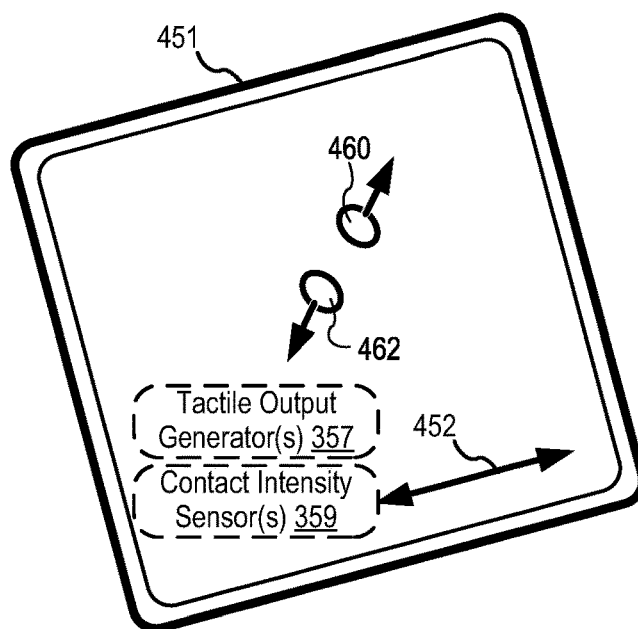

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
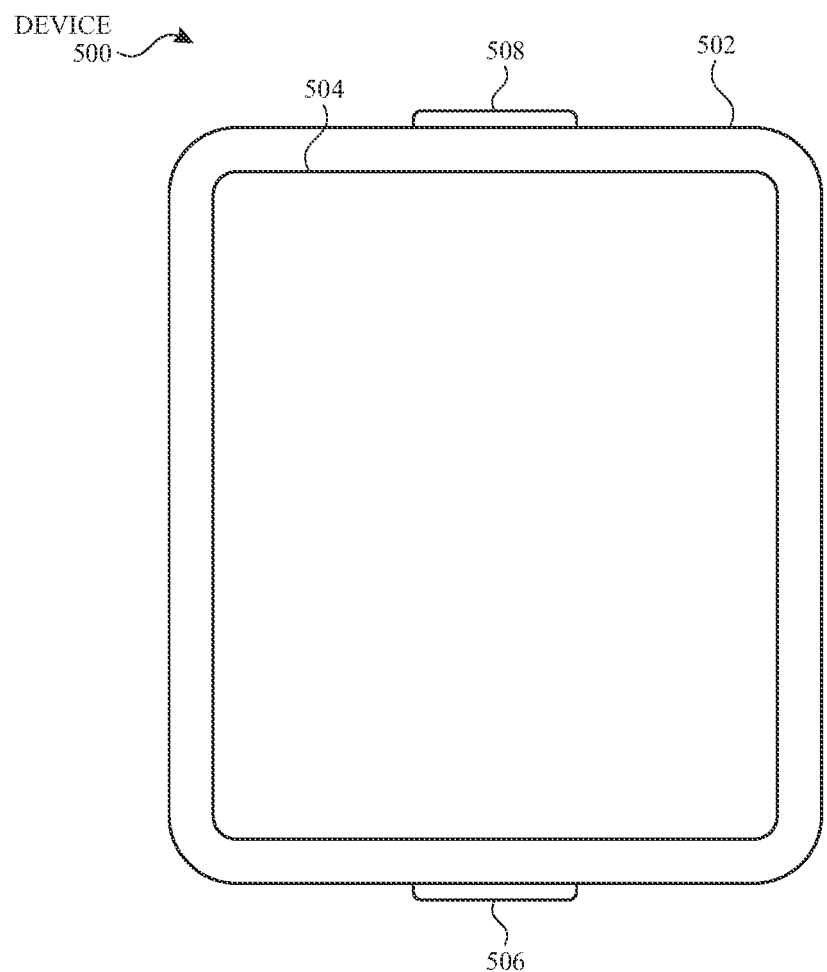
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
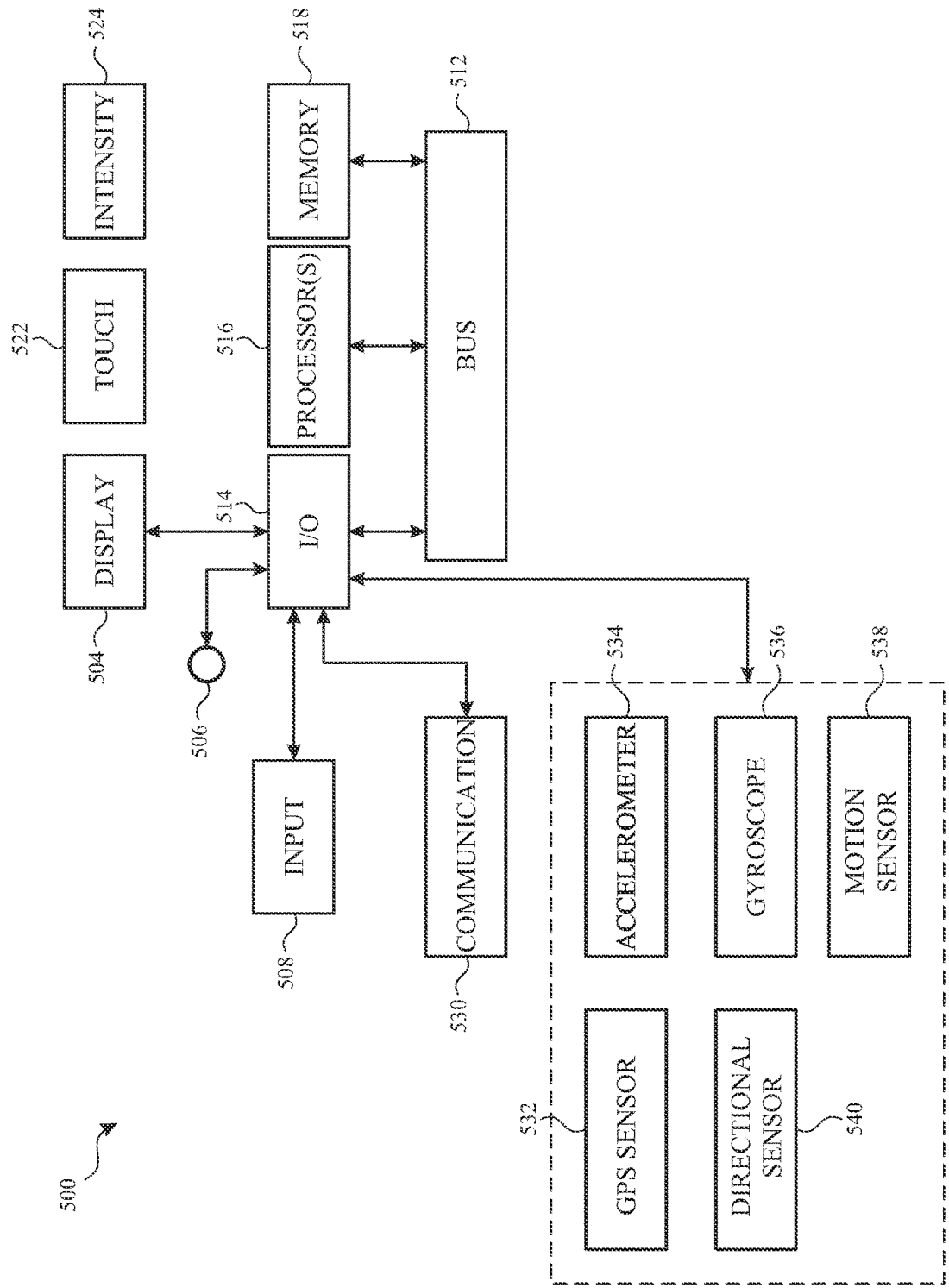
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, and 1300 (FIGS. 7, 9, 11, and 13). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6I illustrate exemplary techniques for displaying climate control user interfaces, in accordance with some embodiments. The user interfaces in these figures are used to illustrate the processes described below, including the processes in FIG. 7.

Figure 6A:
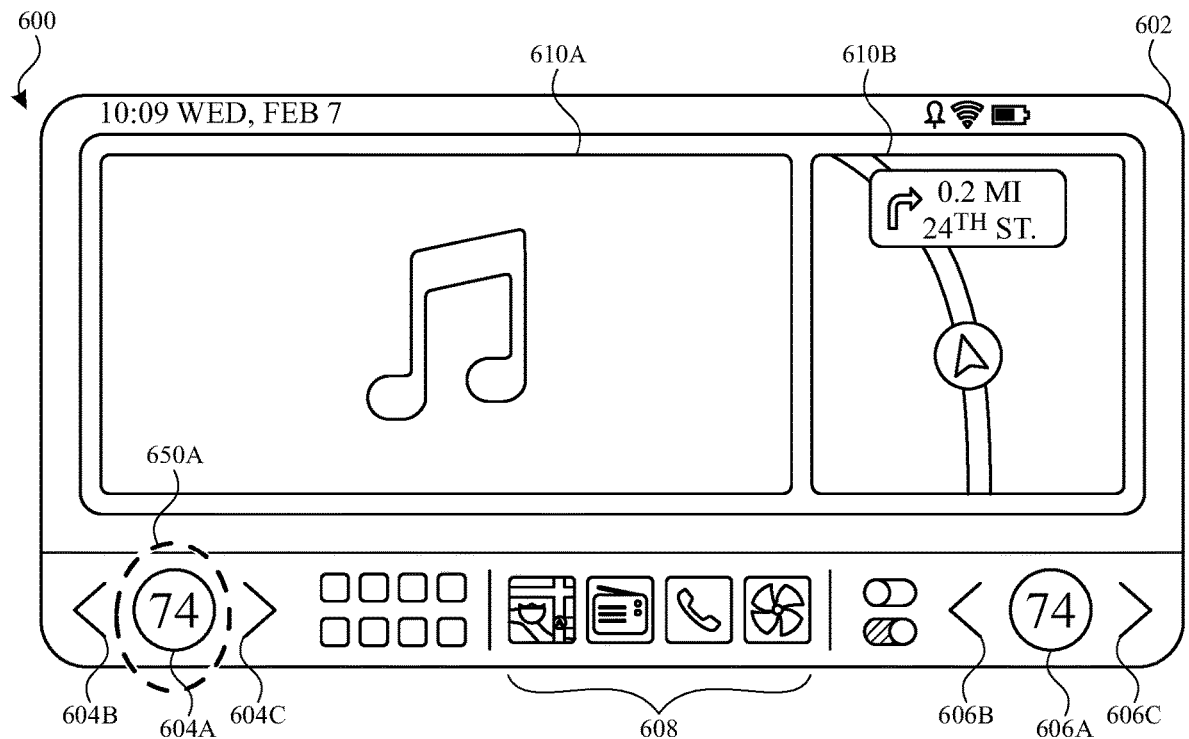
FIGS. 6A-6I illustrate exemplary techniques for displaying climate control user interfaces in accordance with some embodiments.
Figure 7:
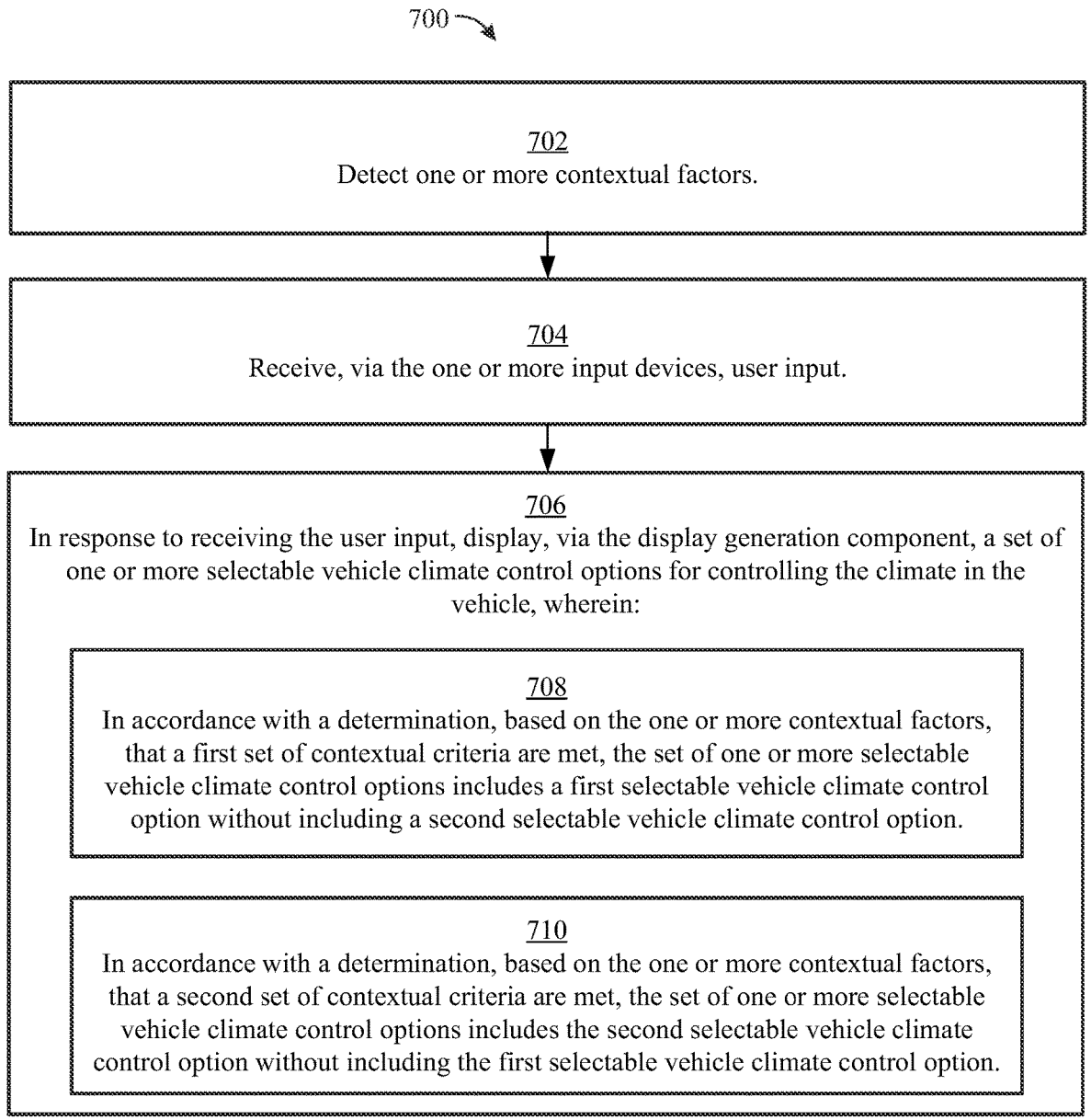
FIG. 7 is a flow diagram illustrating methods of displaying climate control user interfaces in accordance with some embodiments.

In FIG. 6A, computer system 600 displays content on display 602. In some embodiments, display 602 is a touch-screen display. In some embodiments, computer system 600 includes one or more features of devices 100, 300, and/or 500. In some embodiments, display 602 is a part of (e.g., integrated into and/or installed in) a vehicle, such as part of a dashboard display and/or an infotainment system. Display 602 includes user interface 610A of an audio application and user interface 610B of a maps application. At the bottom of display 602, various options are displayed, including application icons 608, driver temperature options 604A-604C, and passenger temperature options 606A-606C. Each icon of application icons 608 corresponds to a respective application. Selection of (e.g., a tap on) a respective icon of application icons 608 causes display of a respective application (e.g., in place of user interface 610A of the audio application and/or in place of user interface 610B of a maps application).

Computer system 600 accesses and/or collects contextual information, such as a temperature of an interior of a cabin of the vehicle, a temperature of an exterior of the vehicle (e.g., the ambient temperature in the area and or in the city that vehicle is located in), past user behavior (e.g., most used climate control features and/or most recently used climate control features), crowd-sourced behaviors (e.g., indicating that an air conditioning feature or seat warmer feature is likely to be used), a location of the vehicle, and/or a current destination of the vehicle (e.g., a home of the user, a work location of the user, a restaurant, or a grocery store). Computer system 600 uses the contextual information to present relevant content and/or climate control options to the user on display 602.

At FIG. 6A, computer system 600 receives a user input 650A (e.g., a tap input or a tap-and-hold input) at target temperature indicator 604A, which corresponds to a target (e.g., preferred) cabin temperature setting for a driver of the vehicle. In response to receiving user input at target temperature indicator 604A, computer system 600 causes display of various climate control options based on the contextual information.

Figure 6B:
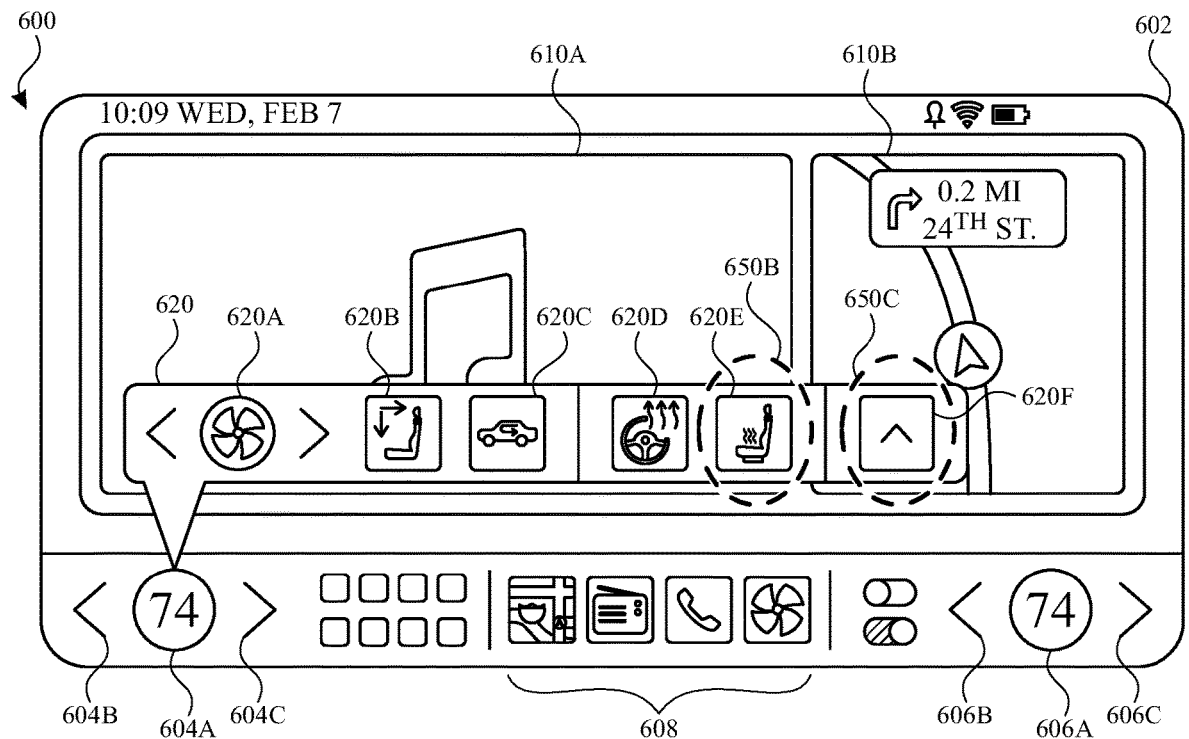

In response to receiving user input 650A and based on the contextual information meeting a first set of contextual criteria, the computer system displays first set of selectable vehicle climate control options 620, as illustrated in FIG. 6B. In this example, computer system 600 has determined, based on the contextual information, that the user is likely to want to access certain climate control options and displays those options as part of first set of selectable vehicle climate control options 620. As illustrated in FIG. 6B, first set of selectable vehicle climate control options 620 includes fan speed option 620A, air flow options 620B, air recirculation option 620C, option 620D to turn on heat for a steering wheel, option 620E to turn on heat for the driver's seat, and expand option 620F. At FIG. 6B, first set of selectable vehicle climate control options 620 does not include some available options, such as an option to cool the driver's seat and an option to turn on maximum air conditioning. First set of selectable vehicle climate control options 620 is selected and/or displayed at least in part based on the contextual information. For example, the computer system determines that the current cabin temperature is below a temperature that the driver typically sets (e.g., it is cold in the vehicle), that the destination is an indoor community swimming pool (and, therefore, the driver is likely to not be wearing warm clothing), and/or that other occupants of other vehicles in the area have recently turned on a steering wheel heat option and/or a seat heater option.

At FIG. 6B, in some embodiments, computer system 600 receives user input 650B (e.g., tap input or tap-and-hold input) selecting option 620E to turn on heat for the driver's seat, and, in response, computer system 600 turns on the heat for the driver's seat. At FIG. 6B, in some embodiments, computer system 600 receives user input 650C (e.g., tap input or tap-and-hold input) selecting expand option 620F and, in response, computer system 600 expands the vehicle climate control options 620, as illustrated in FIG. 6D.

Figure 6C:
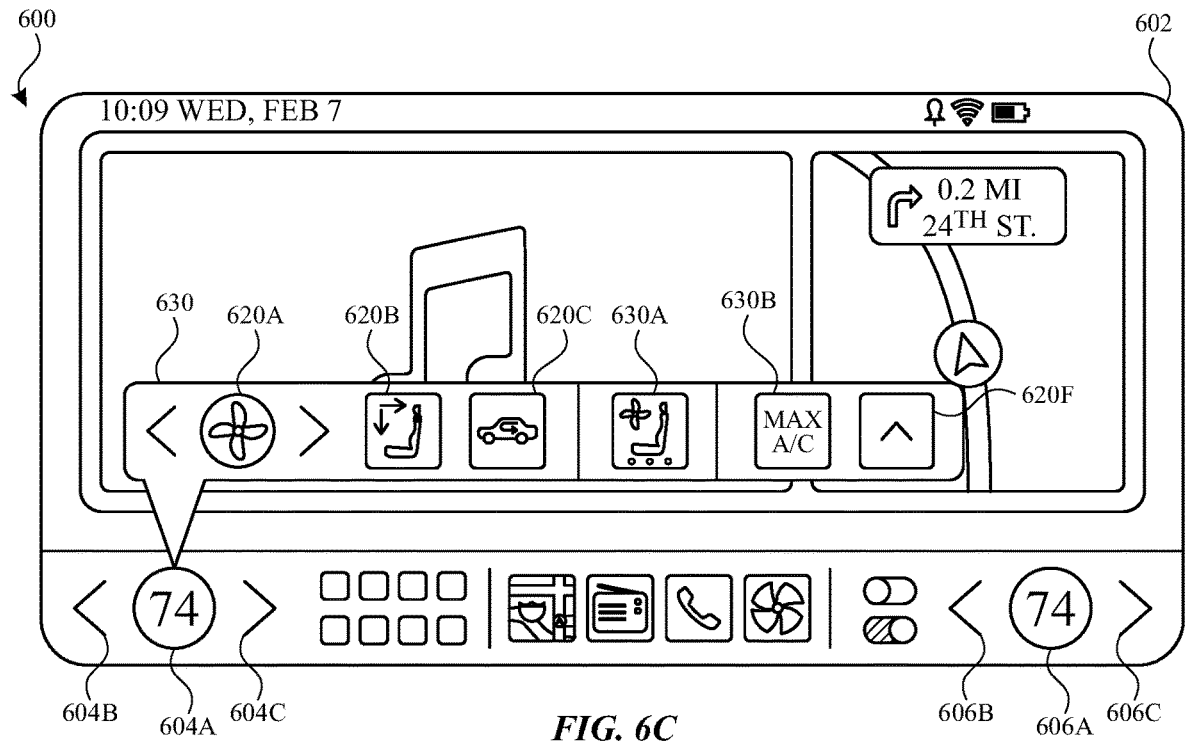

Returning to FIG. 6A, in response to receiving user input 650A and based on the contextual information meeting a second set of contextual criteria that is different from the first set of contextual criteria, the computer system displays second set of selectable vehicle climate control options 630, as illustrated in FIG. 6C, that are different from the first set of selectable vehicle climate control options 620. In this example, computer system 600 has determined, based on the contextual information, that the user is likely to want to access certain climate control options and displays those options as part of second set of selectable vehicle climate control options 630. As illustrated in FIG. 6C, second set of selectable vehicle climate control options 630 includes fan speed option 620A, air flow options 620B, air recirculation option 620C, option 630A to turn on cooling for the driver's seat, option 630B to turn on high (e.g., max) air conditioning, and expand option 620F. At FIG. 6C, second set of selectable vehicle climate control options 630 does not include some options, such as option 620D to turn on heat for a steering wheel and option 620E to turn on heat for the driver's seat. Second set of selectable vehicle climate control options 630 is selected and/or displayed at least in part based on the contextual information. For example, computer system 600 determines that the current cabin temperature is above a temperature that the driver typically sets (e.g., it is warm in the vehicle), that the destination is a work location of the driver (and, therefore, the driver is wearing warm work-related clothes), that the temperature outside of the vehicle is above or below a threshold temperature, that information from a weather service (e.g., information received from a weather application and/or information sourced from the Internet) indicates that the weather meets certain weather criteria (e.g., outside temperature is above a threshold temperature and/or wind speed is below a threshold speed) and/or that other occupants of other vehicles in the area have recently turned on cooling options.

At FIG. 6C, in some embodiments, computer system 600 receives user input selecting option 630A to turn on cooling for the driver's seat, and, in response, computer system 600 turns on cooling for the driver's seat. At FIG. 6B, in some embodiments, computer system 600 receives user input selecting expand option 620F and, in response, computer system 600 expands the second set of selectable vehicle climate control options 630, as illustrated in FIG. 6D.

Figure 6D:
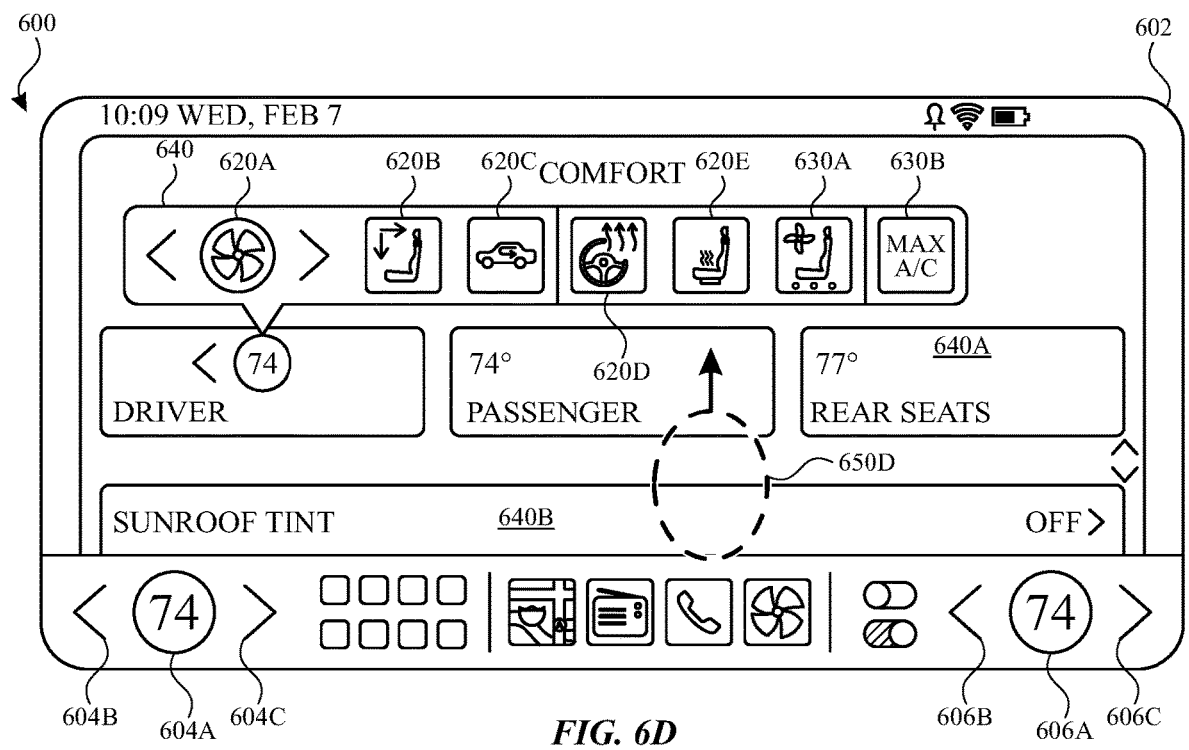

At FIG. 6D, computer system 600 displays expanded climate control options 640 that are selectable and that include at least some vehicle climate control options that were not part of first set of selectable vehicle climate control options 620 and at least some vehicle climate control options that were not part of second set of selectable vehicle climate control options 630. In some embodiments, expanded climate control options 640 are scrollable. At FIG. 6D, computer system 600 receives a scroll input 650D (e.g., a swipe up) and, in response, computer system 600 scrolls expanded climate control options 640 to display additional vehicle climate control options, as illustrated in FIG. 6E.

Figure 6E:
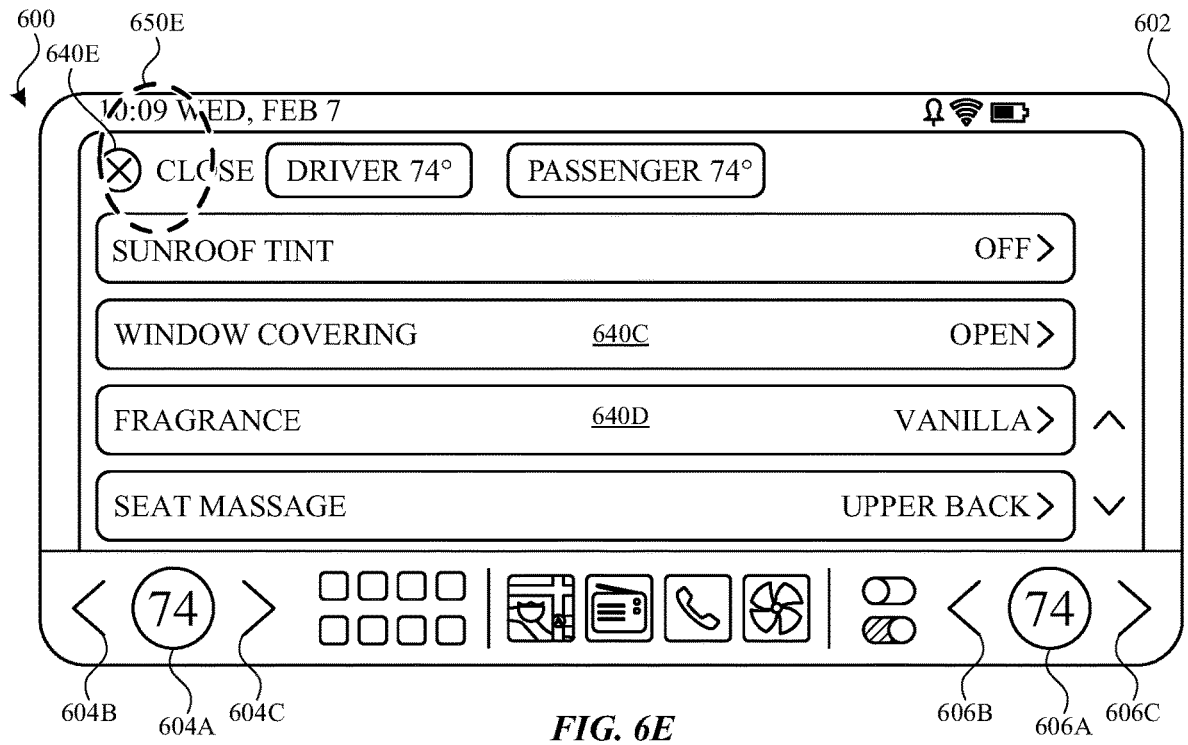

As illustrated in FIGS. 6D and 6E, expanded climate control options 640 includes a more complete listing of climate control options, including temperature controls for rear seats 640A, sunroof tint control 640B, window covering option 640C, and fragrance option 640D. In FIGS. 6D and 6E, selection of a respective option causes computer system 600 to change a corresponding vehicle climate control setting of the vehicle. At FIG. 6E, computer system 600 receives user input 650E on close option 640E and, in response, computer system 600 ceases to display expanded climate control options 640, as shown in FIG. 6F.

Figure 6F:
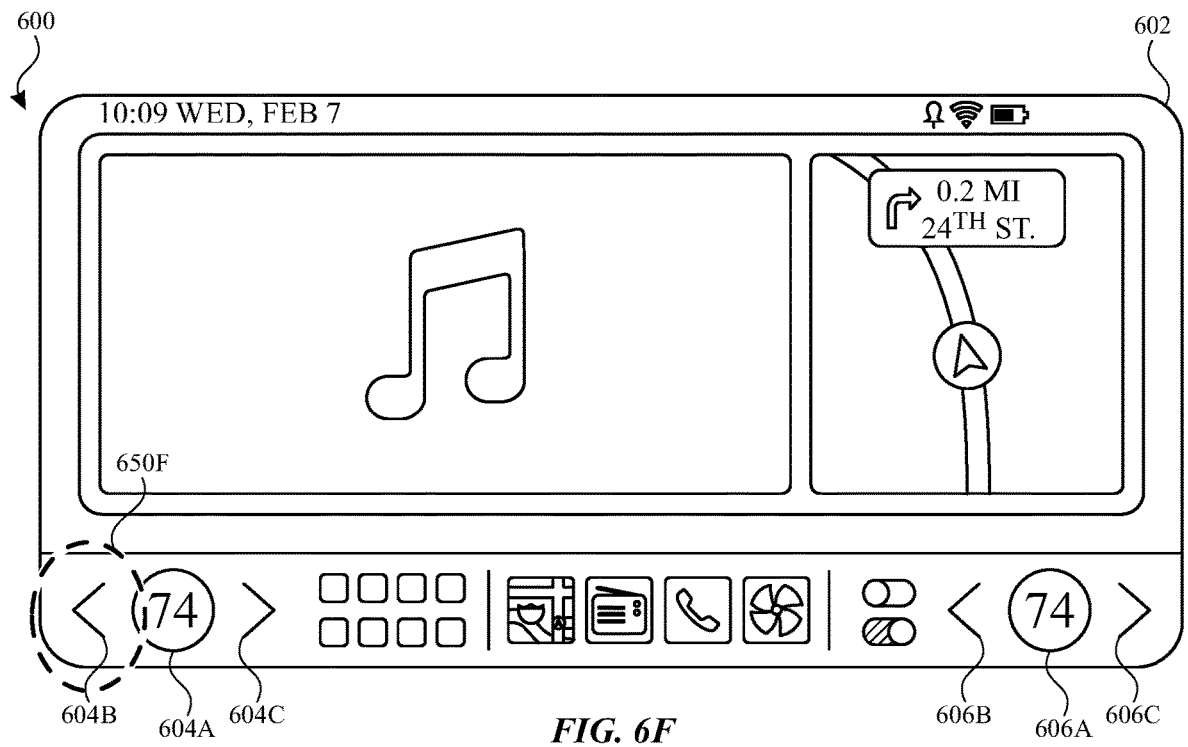
Figure 6G:
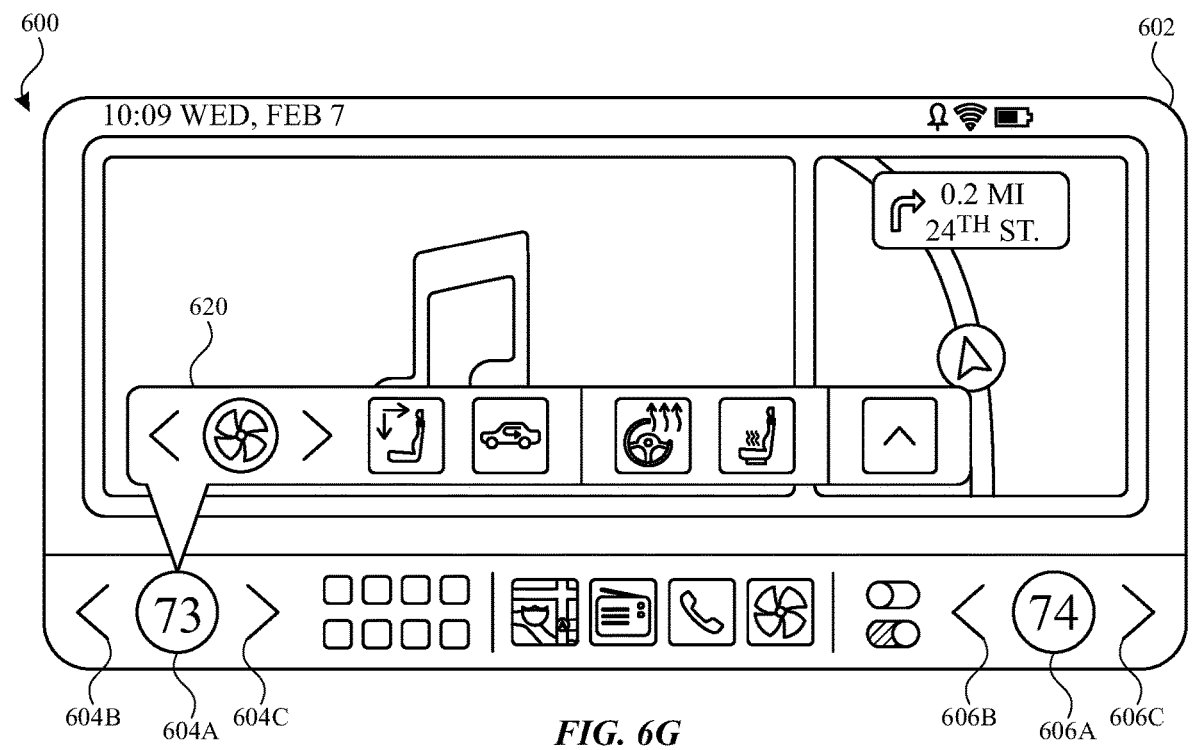

At FIG. 6F, computer system 600 receives user input 650F (e.g., a tap input or a tap-and-hold input) on driver temperature down option 604B. In response to receiving user input 650F, as illustrated in FIG. 6G, computer system 600 reduces the target cabin temperature setting for the driver of the vehicle and displays a respective set of selectable vehicle climate control options based on contextual information (e.g., the same as the first set of selectable vehicle climate control options, the same as the second set of selectable vehicle climate control options, or different from the first and second sets of selectable vehicle climate control options). As a result, a user adjusting the target cabin temperature setting for the driver is presented with additional (but not the expanded) vehicle climate control options to further adjust the vehicle's climate. As described above, selection of a respective climate control option at FIG. 6G causes computer system 600 to change a corresponding vehicle climate control setting of the vehicle.

Figure 6H:
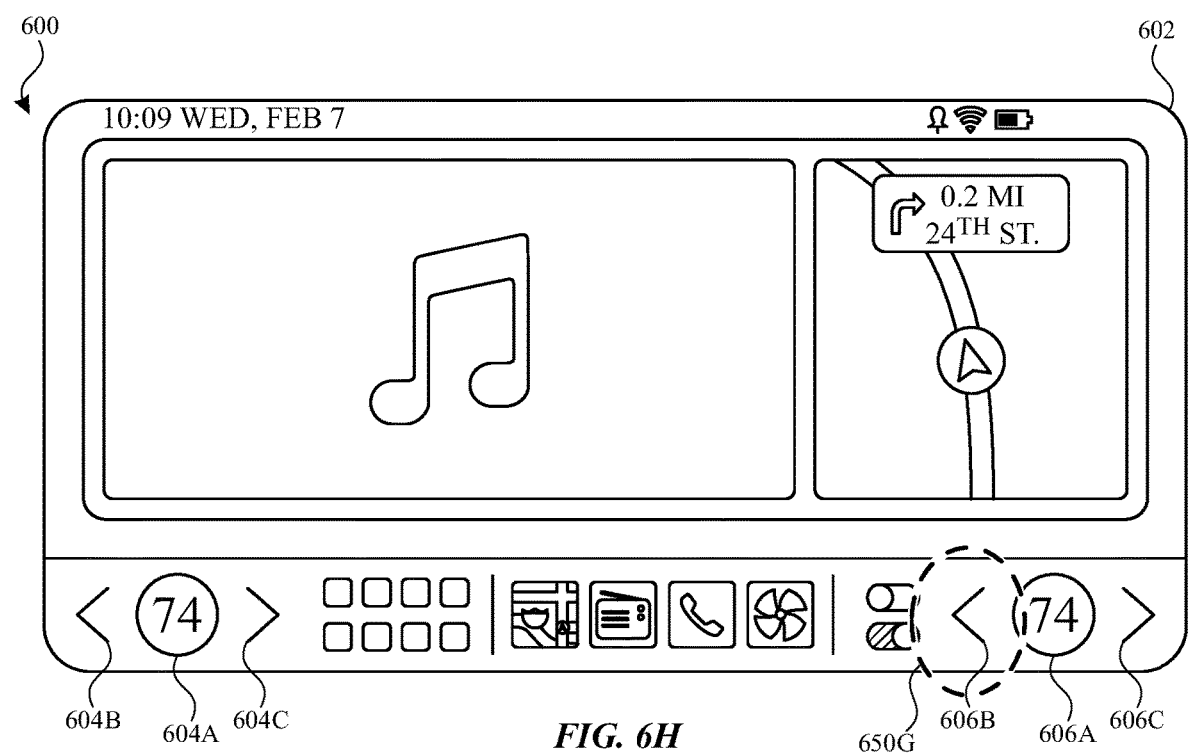
Figure 6I:
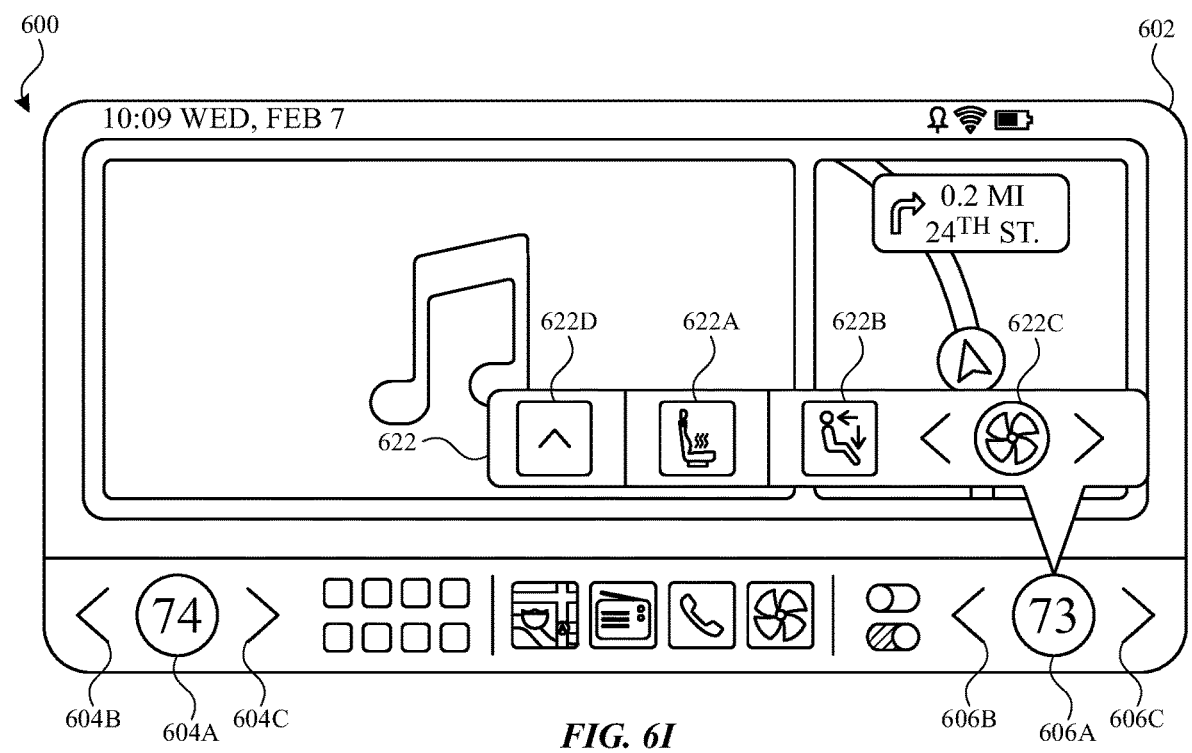

At FIG. 6H, computer system 600 receives user input 650G (e.g., a tap input or a tap-and-hold input) on passenger temperature down option 604B. In response to receiving user input 650G, as illustrated in FIG. 6I, computer system 600 reduces the target cabin temperature setting for the passenger of the vehicle and displays third set of selectable vehicle climate control options 622 based on contextual information. Third set of selectable vehicle climate control options 622 optionally includes vehicle climate control options that are specific to the passenger, such as option 622A to turn on heat for the passenger's seat, air flow options 622B for the passenger, and fan speed option 622C for the passenger. In some embodiments, third set of selectable vehicle climate control options 622 includes an expand option 622D that, when selected, provides an expanded display of vehicle climate control options for the passenger.

Accordingly, users of computer system 600 can quickly access a smaller set of the most likely to be used vehicle climate control options quickly and without the need to scroll through vehicle climate control options that are likely not going to be used. If the user does want to access a more complete (or a complete) set of vehicle climate control options, the user can access an expanded climate control options (e.g., 640).

FIG. 7 is a flow diagram illustrating a method for displaying climate control user interfaces using a computer system in accordance with some embodiments. Method 700 is performed at a computer system (e.g., 100, 300, 500, 600) of a vehicle (e.g., an automobile, a boat, or an airplane), wherein the computer system is in communication with a display generation component (e.g., 602) (e.g., a display generation component of the vehicle, a display set within a front console of a vehicle and/or a display positioned ahead of/in front of a driver's seat of a vehicle) and one or more input devices (a touch-sensitive surface and/or a microphone). Some operations in method 700 are, optionally, combined, the orders of some operations are, optionally, changed, and some operations are, optionally, omitted.

The computer system (e.g., 600) detects (702) one or more contextual factors (e.g., temperature, past user behavior, location, and/or destination).

The computer system receives (704), via the one or more input devices, user input (e.g., 650A, 650F, or 650G) (e.g., touch input, a gesture, and/or a voice command).

In response to receiving the user input (e.g., 650A, 650F, or 650G), the computer system displays (706), via the display generation component (e.g., 602), a set of one or more selectable vehicle climate control options for controlling the climate in the vehicle, wherein: in accordance with a determination (708), based on the one or more contextual factors, that a first set of contextual criteria are met, the set of one or more selectable vehicle climate control options includes a first selectable vehicle climate control option (e.g., 620D and/or 620E) (e.g., heated seat option and/or heated steering wheel option) without including a second selectable vehicle climate control option (e.g., 630A and/or 630B) (e.g., window defrost option and/or vent air flow selectors); and in accordance with a determination (710), based on the one or more contextual factors, that a second set of contextual criteria are met, the set of one or more selectable vehicle climate control options includes the second selectable vehicle climate control option (e.g., 630A and/or 630B) without including the first selectable vehicle climate control option (e.g., 620D and/or 620E). Displaying selectable vehicle climate control options based on contextual factors and whether contextual criteria are met enables the computer system to display relevant selectable vehicle climate control options without displaying selectable vehicle climate control options that the user is less likely to want to use, thereby providing additional control options without cluttering the UI.

In accordance with some embodiments, the one or more contextual factors includes a local temperature, and wherein the first set of contextual criteria includes a first temperature criterion that is met when the local temperature does not exceed a first threshold temperature and the second set of contextual criteria includes a second temperature criterion that is met when the local temperature exceeds a second threshold temperature (e.g., the same as or different from the first threshold temperature) (e.g., as discussed with reference to FIGS. 6B and 6C). In some embodiments, the computer system is in communication with an air temperature sensor that senses air temperature. In some embodiments, the computer system receives (e.g., via a wireless communication network) weather information. In some embodiments, the computer system provides location information of the vehicle to a server and receives weather information (e.g., including air temperature information) based on the location information provided. In some embodiments, the first selectable vehicle climate control option is a heated seat option and/or heated steering wheel option. In some embodiments, the second selectable vehicle climate control option is a seat cooling option. Displaying selectable vehicle climate control options based on local temperature factors enables the computer system to display relevant selectable vehicle climate control options without displaying selectable vehicle climate control options that the user is less likely to want to use, thereby providing additional control options without cluttering the UI.

In accordance with some embodiments, the local temperature includes a temperature of an interior of a cabin of the vehicle. In some embodiments, the computer system is in communication with an air temperature sensor that senses the air temperature of the interior of the cabin of the vehicle. Displaying selectable vehicle climate control options based on cabin temperature enables the computer system to display relevant selectable vehicle climate control options without displaying selectable vehicle climate control options that the user is less likely to want to use, thereby providing additional control options without cluttering the UI.

In accordance with some embodiments, the local temperature includes a temperature of an exterior of a cabin of the vehicle. In some embodiments, the computer system is in communication with an air temperature sensor that senses the air temperature of the exterior of the cabin of the vehicle. Displaying selectable vehicle climate control options based on exterior temperature enables the computer system to display relevant selectable vehicle climate control options without displaying selectable vehicle climate control options that the user is less likely to want to use, thereby providing additional control options without cluttering the UI.

In accordance with some embodiments, the one or more contextual factors includes information about a past user behavior, and wherein the first set of contextual criteria includes a first past behavior criterion that is based on usage of the first selectable vehicle climate control option (e.g., frequent use or most recent use) and the second set of contextual criteria includes a second past behavior criterion that is based on usage of the second selectable vehicle climate control option (e.g., frequent use or most recent use). In some embodiments, the past user behavior identifies the most frequently used item and/or feature. In some embodiments, the past user behavior identifies the most recently used item and/or feature. Displaying selectable vehicle climate control options based on past user behavior enables the computer system to display relevant selectable vehicle climate control options without displaying selectable vehicle climate control options that the user is less likely to want to use, thereby providing additional control options without cluttering the UI.

In accordance with some embodiments, the one or more contextual factors includes information about crowd-sourced behavior. In some embodiments, the crowd-sourced behavior is anonymized to protect the privacy of users. In some embodiments, the crowd-source information is only collected from users who opt into having the information collected. In some embodiments, the crowd-sourced behavior includes information about an item or feature used by a plurality of other users. In some embodiments, the crowd-sourced behavior is sourced from a localized set of other users (e.g., users within geographic and/or temporal proximity to the vehicle) and can include information on which climate controls options have a high frequency of use in the localized set of other users. In some embodiments, the crowdsourced behavior is sourced over a predetermined duration or period, such as the current hour, the current day, or the previous week. In some embodiments, the crowd sourced behavior indicates that an air conditioning feature is likely to be used and, therefore, an air conditioning option is presented as the second selectable vehicle climate control option. In some embodiments, the crowd sourced behavior indicates that a seat warmer is likely to be used, and, therefore, a seat warmer option is presented as the first selectable vehicle climate control option. Displaying selectable vehicle climate control options based on crowd sourced behavior enables the computer system to display relevant selectable vehicle climate control options without displaying selectable vehicle climate control options that the user is less likely to want to use, thereby providing additional control options without cluttering the UI.

In accordance with some embodiments, the one or more contextual factors includes a current location of the vehicle. Displaying selectable vehicle climate control options based on a current location of the vehicle enables the computer system to display relevant selectable vehicle climate control options without displaying selectable vehicle climate control options that the user is less likely to want to use, thereby providing additional control options without cluttering the UI.

In accordance with some embodiments, the one or more contextual factors includes a current destination of the vehicle (e.g., as identified by the user specifying a destination for driving directions). In some embodiments, the destination is identified as a work location for the user of the computer system. For example, the computer system determines that the user is driving to work and provides an air conditioning option because, in the past, the user has frequently used air conditioning when driving to work (e.g., because the user frequently wears a jack and/or suit to work that is warm). In some embodiments, the destination is identified as a home location for the user of the computer system. For example, the computer system determines that the user is driving home and provides a specific option because, in the past, the user has frequently used that feature when driving home. Displaying selectable vehicle climate control options based on a current destination of the vehicle enables the computer system to display relevant selectable vehicle climate control options without displaying selectable vehicle climate control options that the user is less likely to want to use, thereby providing additional control options without cluttering the UI.

In accordance with some embodiments, the computer system receives, via the one or more input devices, a second user input (e.g., 650F and/or 650G) directed to controlling a temperature setting. In response to receiving the second user input (e.g., 650F and/or 650G) directed to controlling the temperature setting, the computer system displays, via the display generation component, a first plurality of selectable vehicle climate control options (e.g., 620D and/or 620E) for controlling the climate in the vehicle (e.g., the same as or different from the set of one or more selectable vehicle climate control options for controlling the climate in the vehicle) without displaying a second plurality of selectable vehicle climate control options (e.g., 630A and/or 630B) for controlling the climate in the vehicle. Displaying additional controls when a change is made to a temperature setting enables the computer system to perform the temperature setting change and display additional climate control options for the user to select, thereby reducing the number of inputs required to activate the additional climate control options.

In accordance with some embodiments, in response to receiving the second user input directed to controlling the temperature setting, the computer system changes (e.g., increase, decreasing, turning on, and/or turning off) a vehicle cabin temperature setting (e.g., a target air temperature and/or a seat warm setting) (e.g., as indicated by 604A in FIG. 6F and/or 606A in FIG. 6I). Displaying additional controls when a change is made to a temperature setting enables the computer system to perform the temperature setting change and display additional climate control options for the user to select, thereby reducing the number of inputs required to activate the additional climate control options.

In accordance with some embodiments, in response to receiving the second user input (e.g., 650F and/or 650G) directed to controlling the temperature setting, the computer system displays, via the display generation component and concurrently with the first plurality of selectable vehicle climate control options for controlling the climate in the vehicle, an option (e.g., 620F and/or 622D) to expand display of vehicle climate controls (e.g., display additional vehicle climate controls). While displaying the option (e.g., 620F and/or 622D) to expand display of the vehicle climate controls, the computer system receives, via the one or more input devices, selection (e.g., 650C) of the option to expand display of the vehicle climate controls. In response to receiving selection of the option (e.g., 650C) to expand display of the vehicle climate controls, the computer system displays, via the display generation component and concurrently with the first plurality of selectable vehicle climate control options for controlling the climate in the vehicle, the second plurality of selectable vehicle climate control options for controlling the climate in the vehicle different from the first plurality of selectable vehicle climate control options for controlling the climate in the vehicle (e.g., 640 as shown in FIG. 6D). Providing an option to the user to display additional vehicle climate control options allows the computer system to initially display a subset of the vehicle climate control options, and thereby initially displaying more relevant selectable vehicle climate control options without displaying selectable vehicle climate control options that the user is less likely to want to use, providing additional control options without cluttering the UI.

In accordance with some embodiments, in response to receiving the second user input (e.g., 650F and/or 650G) directed to controlling the temperature setting: in accordance with a determination that the second user input is directed to controlling the temperature setting of a driver, the first plurality of selectable vehicle climate control options for controlling the climate in the vehicle are driver climate control options (and, optionally, the second plurality of selectable vehicle climate control options for controlling the climate in the vehicle are passenger climate control options) (e.g., as in FIG. 6C); and in accordance with a determination that the second user input is directed to controlling the temperature setting of a passenger that is different from the driver, the first plurality of selectable vehicle climate control options for controlling the climate in the vehicle are passenger climate control options (and, optionally, the second plurality of selectable vehicle climate control options for controlling the climate in the vehicle are driver climate control options) (e.g., as in FIG. 6I). Providing different mechanism to display driver climate control options and passenger climate control options enables the computer system to display more relevant selectable vehicle climate control options without displaying selectable vehicle climate control options that the user is less likely to want to use, thereby providing additional control options without cluttering the UI.

As described below, method 700 provides an intuitive way for displaying climate control user interfaces. The method reduces the cognitive burden on a user for accessing climate control user interfaces, thereby creating a more efficient human-machine interface. For battery-operated computing devices, enabling a user to access climate control user interfaces faster and more efficiently conserves power and increases the time between battery charges.

Note that details of the processes described above with respect to method 700 (e.g., FIG. 7) are also applicable in an analogous manner to the methods described below (e.g., with respect to FIGS. 9, 11, 13). For example, the computer systems are the same computer systems. For another example, the vehicles are the same vehicles. For brevity, these details are not repeated below.

FIGS. 8A-8F illustrate exemplary techniques for displaying user interfaces based on detecting one or more electronic devices in accordance with some embodiments. The user interfaces in these figures are used to illustrate the processes described below, including the processes in FIG. 9.

Figure 8A:
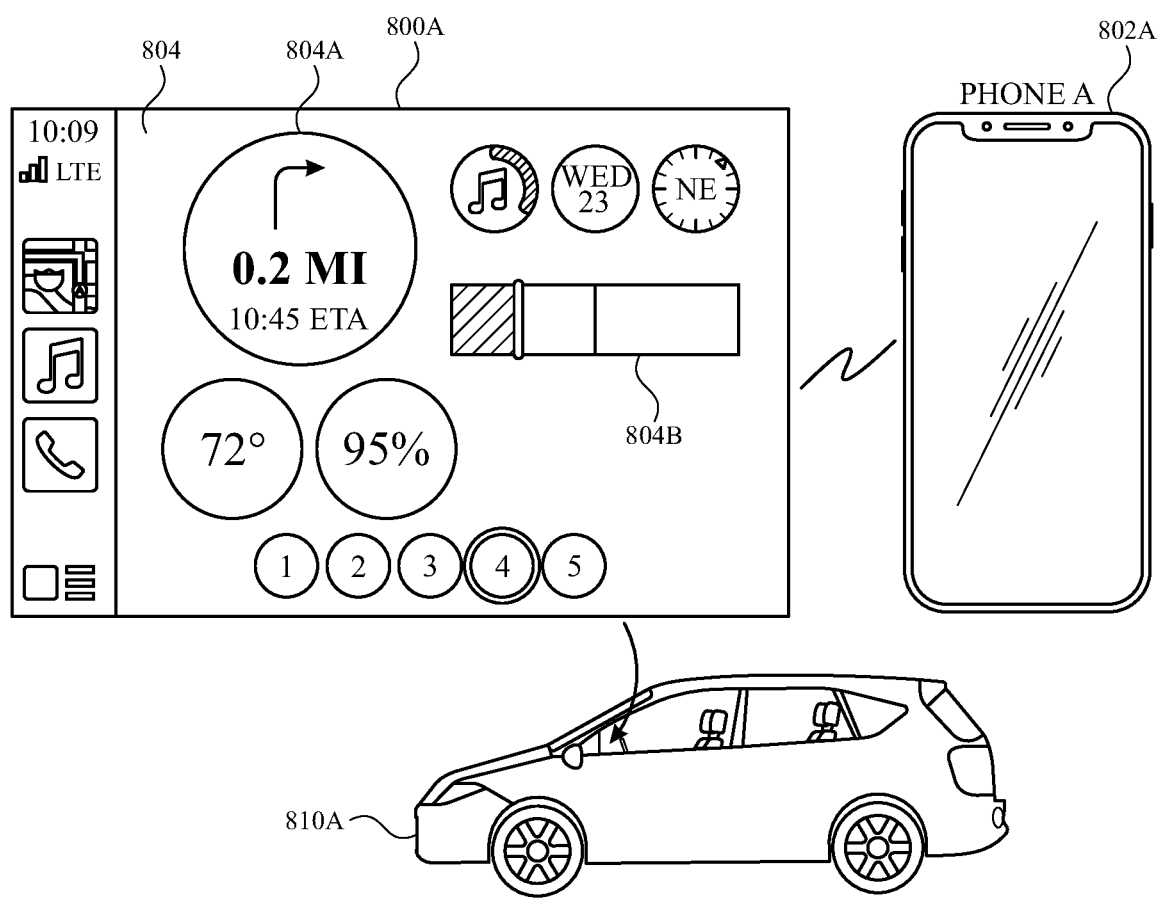
FIGS. 8A-8F illustrate exemplary techniques for displaying user interfaces based on detecting one or more electronic devices in accordance with some embodiments.
Figure 9:
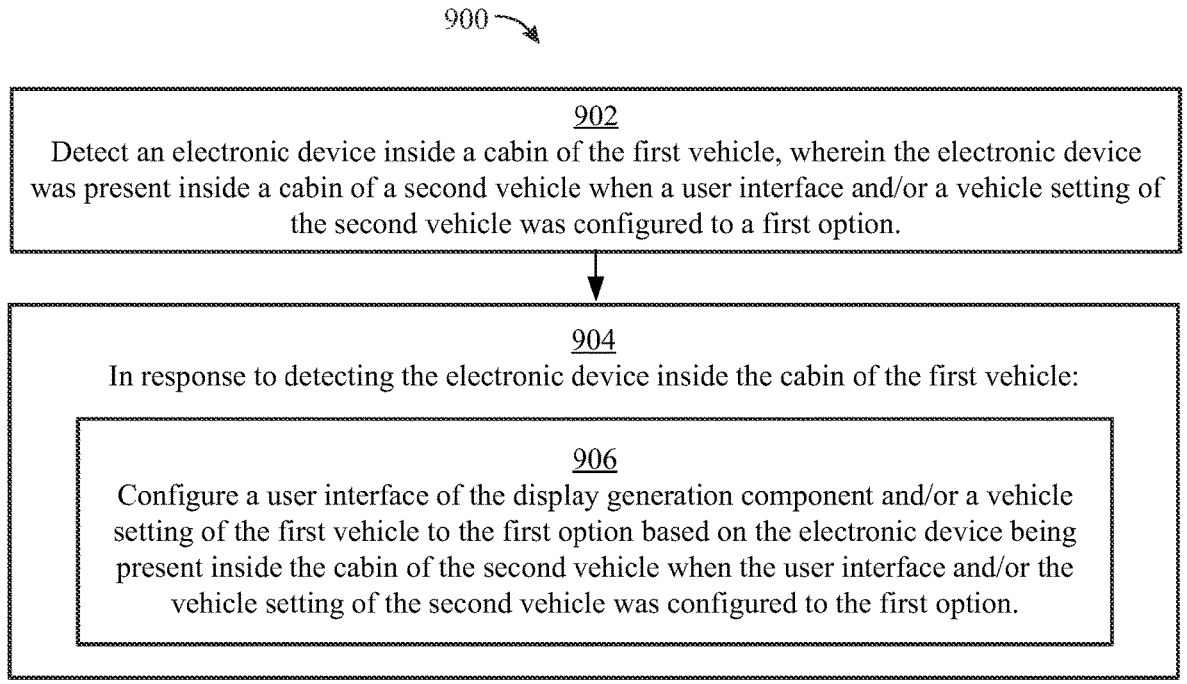
FIG. 9 is a flow diagram illustrating methods of displaying user interfaces based on detecting one or more electronic devices in accordance with some embodiments.

At FIG. 8A, a first user enters vehicle 810A, resulting in first user's phone 802A (an external device that, in some embodiments, includes one or more features of devices 100, 300, and/or 500) being inside the cabin of vehicle 810A. While phone 802A is inside the cabin of vehicle 810A, the first user provides inputs (e.g., at a touchscreen display of computer system 800A) to change user interface 804 and/or vehicle setting of vehicle 810A.

Figure 8B:
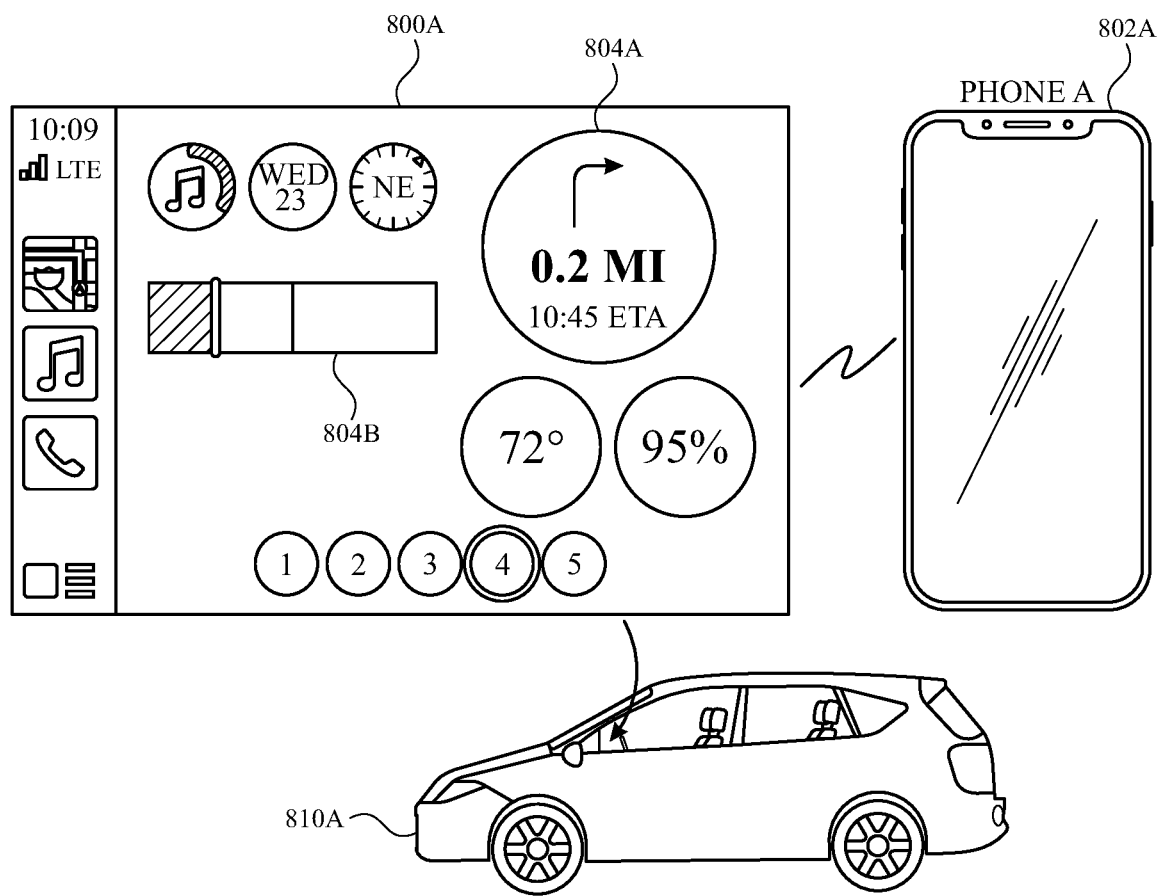

As illustrated in FIG. 8B, while first user's phone 802A remains in vehicle 810A, in response to receiving the inputs to change user interface 804 and/or vehicle settings of vehicle 810A, computer system 800A has updated the arrangement of dashboard elements of user interface 804. For example, the locations of navigation element 804A and speed indicator 804B have changed. In some embodiments, the rearranged dashboard elements include instrument cluster elements, such as a speedometer (e.g., speed indicator 804B), a vehicle mileage, and/or a vehicle charge indicator. In some embodiments, a color, font, and/or style of dashboard elements are also updated. In some embodiments, computer system 800A of vehicle 810A detects that phone 802A is in vehicle 810A when the dashboard elements are rearranged and transmits information corresponding to the rearrangement (e.g., to a server and/or to phone 802A) in association with phone 802A and/or in association with a first user account associated with (e.g., logged into) phone 802A (e.g., first user's account). In some embodiments, the first user account is also associated with (e.g., logged into) computer system 800A. In some embodiments, computer system 800A includes one or more features of devices 100, 300, and/or 500.

Figure 8C:
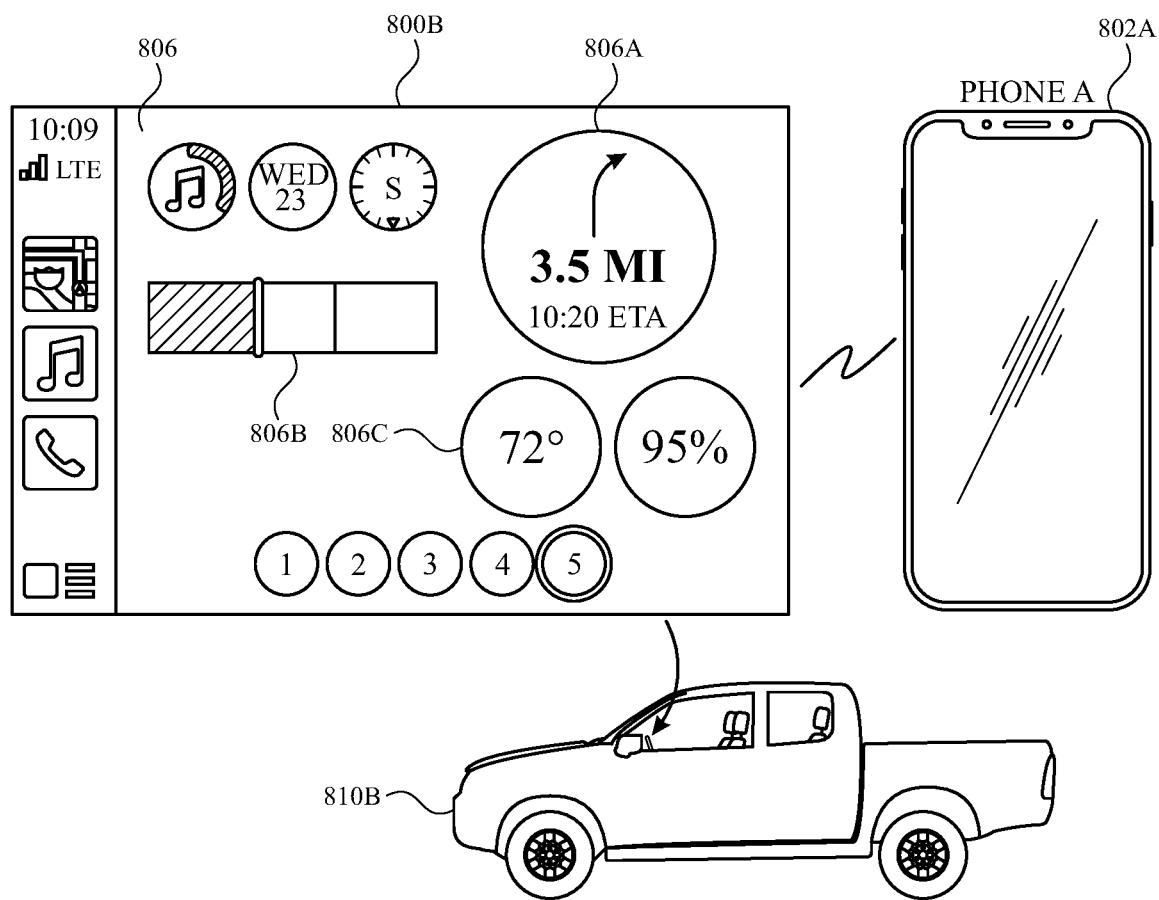

At FIG. 8C, subsequent to updating the arrangement of dashboard elements of user interface 804 in vehicle 810A, the first user enters vehicle 810B, resulting in first user's phone 802A being inside the cabin of vehicle 810B. Based on detecting phone 802A inside the cabin of vehicle 810B and based on phone 802A having been inside the cabin of vehicle 810A when user interface 804 was rearranged, computer system 800B of vehicle 810B displays user interface 806 that is based on the rearrangement performed at computer system 800A (without requiring user inputs to rearrange user interface 806). For example, the navigation element 806A and speed indicator 806B are at locations within user interface 806 that correspond to the rearranged locations of navigation element 804A and speed indicator 804B in user interface 804, as illustrated in FIG. 8B. In some embodiments, the color, font, and/or style of dashboard elements of vehicle 810B are similarly updated based on changes at vehicle 810A. In some embodiments, computer system 800B receives information about the changes to user interface 804 and/or vehicle setting of vehicle 810A from a server and/or from phone 802A. In some embodiments, the first user account is also associated with (e.g., logged into) computer system 800B. In some embodiments, computer system 800B includes one or more features of devices 100, 300, and/or 500.

As a result, when first user takes their phone 802A into various vehicles, the adjustments (e.g., some adjustments or all adjustments) first user makes to the various vehicles carries forward to subsequent vehicles that the first user enters. In this way, the first user does not need to repeatedly reconfigure each vehicle to the first user's preferences and, instead, the first user's preferences with regard to user interfaces and/or vehicle settings automatically carry over, enabling the first user to more quickly and more comfortably operate the vehicle.

Figure 8D:
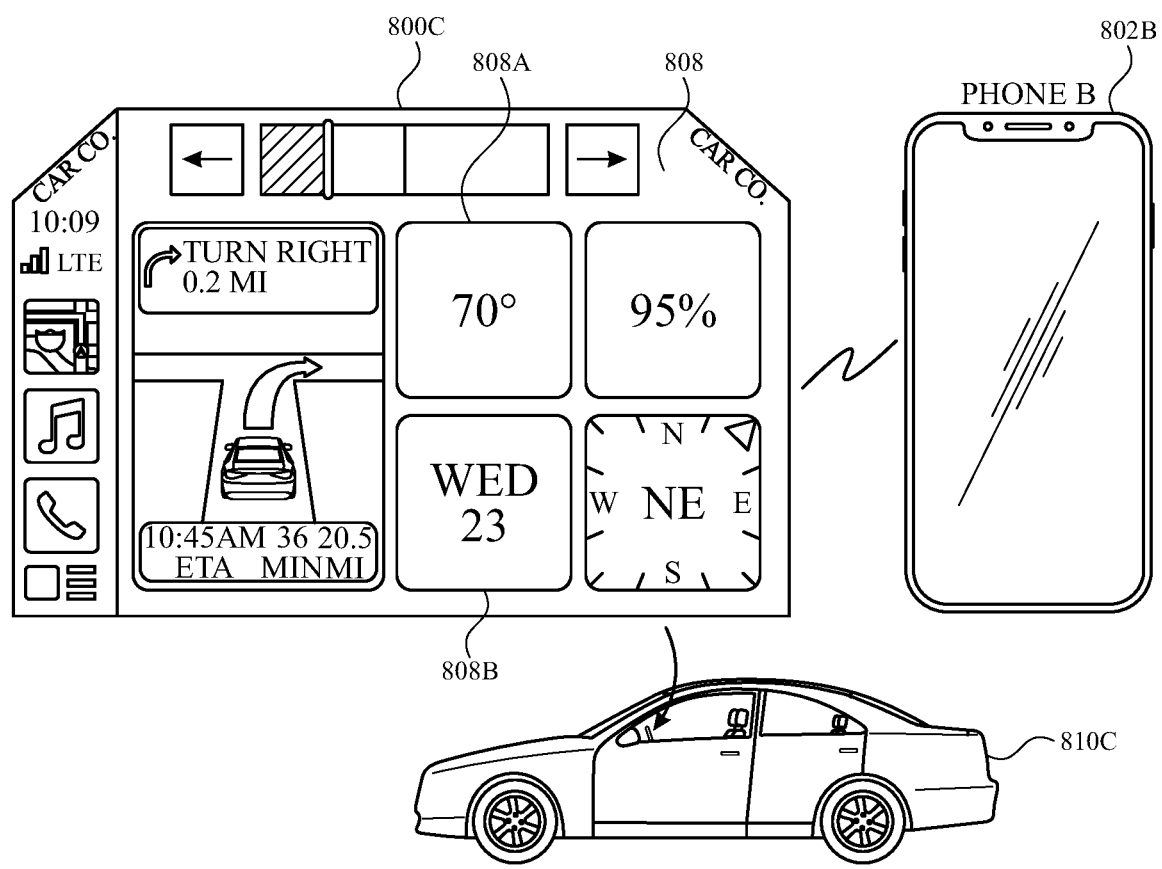
Figure 8E:
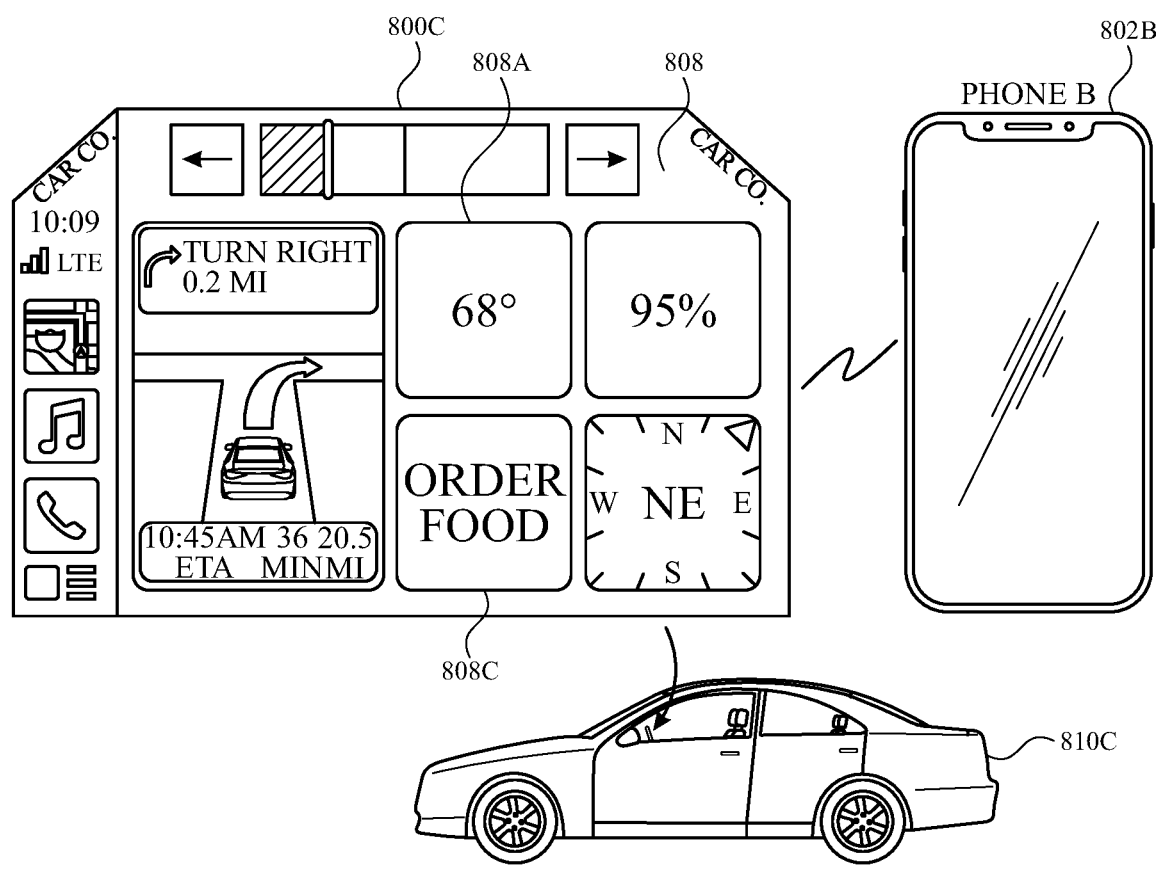

At FIG. 8D, a second user takes their phone 802B (an external device) into vehicle 810C. While phone 802B is inside the cabin of vehicle 810C, the second user provides inputs (e.g., at a touchscreen display of computer system 800C) to change user interface 808 and/or vehicle setting of vehicle 810C, as shown in FIG. 8E. In some embodiments, computer system 800C of vehicle 810C detects that phone 802B is in vehicle 810C when user interface 808 and/or the vehicle settings are changed and transmits information corresponding to the changes (e.g., to a server and/or to phone 802B) in association with phone 802B and/or in association with a second user account associated with (e.g., logged into) phone 802B (e.g., second user's account). In some embodiments, the second user account is also associated with (e.g., logged into) computer system 800C.

At FIG. 8E, the second user has adjusted a target (e.g., preferred) cabin temperature setting in vehicle 810C from 70 degrees to 68 degrees Fahrenheit while the second user's phone 802B is in the cabin of vehicle 810C. The second user has also replaced calendar application icon 808B with food ordering application icon 808C in user interface 808, while the second user's phone 802B is in the cabin of vehicle 810C.

Figure 8F:
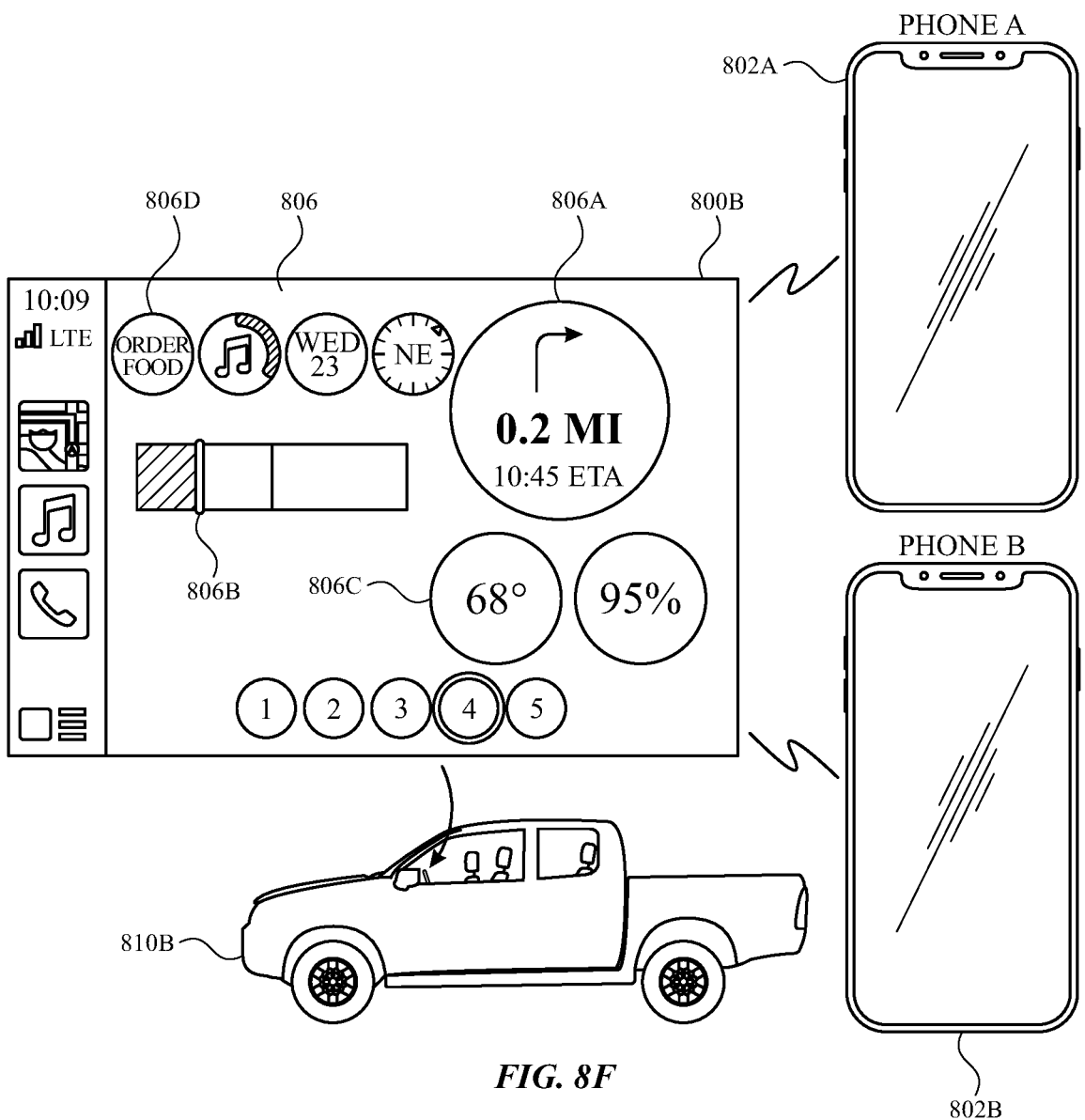

At FIG. 8F, both the first user and the second user have entered vehicle 810B, along with their respective phones 802A and 802B. Computer system 800B of vehicle 810B detects that phone 802A and phone 802B are in the cabin of vehicle 810B and automatically updates user interfaces and/or vehicle settings of vehicle 810B in view of previous changes to user interfaces and or vehicle settings the users have made while their respective phones were in the vehicles.

As illustrated in FIG. 8F, user interface 806 is based on the rearrangement performed by the first user at computer system 800A (without requiring user inputs to rearrange user interface 806 at FIG. 8F), target (e.g., preferred) cabin temperature setting 806C in vehicle 810B has been updated to 68 degrees Fahrenheit based on the change made by the second user at vehicle 810C, and a food ordering application icon 806D has been added to user interface 806 based on the change made by the second user at vehicle 810C. In addition, computer system 800B has automatically adjusted a seat position of a seat (e.g., corresponding to a detected location at which the second user is sitting) of vehicle 810B (e.g., based on a seat position in vehicle 810C and/or a seat position of a vehicle previously adjusted by the second user). In some embodiments, computer system 800B also automatically adjusts mirrors and steering wheel positions based on past adjustments made in past vehicles. In some embodiments, phone 802A and phone 802B are not associated with (e.g., logged into) the same user account. In some embodiments, phone 802A and phone 802B are associated with (e.g., logged into) respective accounts of the same service (e.g., such that the service coordinates communicating each user's preferences and settings). In some embodiments, vehicle 810B is also associated with (e.g., logged into) an account of the same service.

As a result, when first user takes their phone 802A into vehicle 810B and second user also takes their phone 802B into vehicle 810B, the adjustments (e.g., some adjustments or all adjustments) the first user and the second user have made in various previous vehicles carries forward to the current vehicle that they are in. In this way, the first user and the second user do not need to repeatedly reconfigure each vehicle to their preferences and, instead, the first user's and the second user's preferences with regard to user interfaces and/or vehicle settings automatically carry over, enabling the first user and the second user to more quickly and more comfortably ride the vehicle.

FIG. 9 is a flow diagram illustrating a method for displaying user interfaces based on detecting one or more electronic devices in accordance with some embodiments. Method 900 is performed at a computer system (e.g., 100, 300, 500, 600, 800A, 800B, 800C) of a first vehicle (e.g., an automobile, a boat, or an airplane), wherein the computer system is in communication with a display generation component (e.g., 806A) (e.g., a display generation component of the first vehicle, a display set within a front console of the first vehicle and/or a display positioned ahead of/in front of a driver's seat of the first vehicle). Some operations in method 900 are, optionally, combined, the orders of some operations are, optionally, changed, and some operations are, optionally, omitted.

The computer system (e.g., 800B) detects (902) an electronic device (e.g., 802A, 802B) (e.g., a smartphone, a smartwatch, and/or a laptop computer) inside a cabin of the first vehicle (e.g., 810B), wherein the electronic device (e.g., 802A, 802B) was present inside a cabin of a second vehicle (e.g., 810A) when a user interface (e.g., 804) and/or a vehicle setting of the second vehicle was configured to a first option.

In response (904) to detecting the electronic device inside the cabin of the first vehicle, the computer system (e.g., 800B) configures (906) a user interface (e.g., 806) of the display generation component and/or a vehicle setting of the first vehicle to the first option based on the electronic device (e.g., 802A) being present inside the cabin of the second vehicle (e.g., 810A) when the user interface and/or the vehicle setting of the second vehicle was configured to the first option. Configuring a user interface and/or a vehicle setting based on the electronic device being present inside the cabin of the second vehicle when the user interface and/or the vehicle setting of the second vehicle was configured enables the computer system to automatically configure the vehicle to the user's preferred settings without requiring additional user input, thereby reducing the number of inputs required to perform the operation. In some embodiments, a user carries the electronic device with them into the second vehicle and configures, using the system of the second vehicle (e.g., using a touch-screen display of the second vehicle) and without using the electronic device, the user interface and/or the vehicle setting of the second vehicle to the first option. In some embodiments, the respective computer system of the second vehicle transmits information about the user interface and/or the vehicle setting to a server and/or to the electronic device. In some embodiments, the user uses the electronic device to configure the second vehicle to the first option. Subsequently, when the user carries the electronic device with them into the first vehicle, the computer system of the first vehicle detects and/or communicates with the electronic device and/or a server and receives information about user interface and/or vehicle setting being configured to the first option and, in response, (because the electronic device was in the second vehicle when the configuration happened and because the computer system detects the electronic device in the first vehicle) the computer system of the first vehicle configures a user interface and/or vehicle option of the first vehicle to be the first option.

In some embodiments, the computer system (e.g., 800B) detects a second electronic device (e.g., 802B) (e.g., a smartphone, a smartwatch, and/or a laptop computer), different from the electronic device (e.g., 802A), inside the cabin of the first vehicle (e.g., 810B) (e.g., detected to be positioned in a passenger (non-driver) area and/or detected to be in the back seat), wherein the second electronic device (e.g., 802B) was present inside a cabin of a third vehicle (e.g., 810C) (e.g., different from the first and second vehicles) when a second user interface (e.g., 808) and/or a second vehicle setting of the third vehicle (e.g., 810C) was configured to a second option (e.g., same as or different from the first option). In response to detecting the second electronic device (e.g., 802B) inside (e.g., concurrently with or not concurrently with) the cabin of the first vehicle, the computer system configures a user interface (e.g., 806) of the display generation component and/or the second vehicle setting of the first vehicle to the second option based on the second electronic device being present inside the cabin of the third vehicle when the user interface and/or the second vehicle setting of the third vehicle was configured to the second option. Configuring an additional user interface and/or a vehicle setting based on a second electronic device being present inside the cabin of a vehicle when the user interface and/or the vehicle setting of the vehicle was configured enables the computer system to automatically configure the vehicle to the user's preferred settings without requiring additional user input, thereby reducing the number of inputs required to perform the operation.

In some embodiments, the computer system (e.g., 800B) of the first vehicle (e.g., 810B) is associated with a user account of a service and the electronic device (e.g., 802A and/or 802B) is associated with the user account of the service. In some embodiments, the computer system is logged into a service using a user account and the electronic device is logged into the service using the user account. Using association of the computer system and the electronic device with the same user account enables the computer system to receive and communication information about the settings securely.

In some embodiments, the second vehicle (e.g., 810A) (e.g., a respective computer system of the second vehicle) is associated with the user account of the service. In some embodiments, the second vehicle (e.g., a respective computer system of the second vehicle) is logged into the user account of the service. Using the association of the second vehicle with the same user account enables the computer system to receive and communication information about the settings securely.

In some embodiments, configuring the user interface of the display generation component and/or the vehicle setting of the first vehicle to the first option includes configuring one or more applications to be displayed upon a startup of the first vehicle (e.g., 806D of FIG. 8F). Configuring a user interface or representations (e.g., icons) of one or more applications to be displayed upon a startup of the first vehicle enables the user to quickly access content when the first vehicle starts up, thereby reducing the number of user inputs required.

In some embodiments, configuring the user interface of the display generation component and/or the vehicle setting of the first vehicle to the first option includes: in accordance with a determination that the first option, when configured in the second vehicle, included configuring a first dashboard element (e.g., 804A) (e.g., an instrument cluster element, such as a speedometer, a vehicle mileage, and/or a vehicle charge indicator) of the second vehicle to display at a first location of a user interface of the second vehicle, configuring a first dashboard element (e.g., an instrument cluster element, such as a speedometer, a vehicle mileage, and/or a vehicle charge indicator) of the first vehicle to display at a first location of the user interface of the first vehicle that corresponds to the first location of the user interface of the second vehicle; and in accordance with a determination that the first option, when configured in the second vehicle, included configuring the first dashboard element (e.g., an instrument cluster element, such as a speedometer, a vehicle mileage, and/or a vehicle charge indicator) of the second vehicle to display at a second location of the user interface of the second vehicle that is different from the first location of the user interface of the second vehicle, configuring the first dashboard element (e.g., an instrument cluster element, such as a speedometer, a vehicle mileage, and/or a vehicle charge indicator) of the first vehicle to display at a second location of the user interface of the first vehicle that corresponds to the second location of the user interface of the second vehicle and that is different from the first location of the user interface of the first vehicle. Configuring the first dashboard element to be displayed at different locations based on the location of a related dashboard element at the second vehicle enables the computer system to place the element at a location where the user expects the element to be, thereby enabling the user to more quickly view or activate the element. In some embodiments, configuring the user interface of the display generation component and/or the vehicle setting of the first vehicle to the first option includes configuring the user interface to display a first dashboard element (e.g., an instrument cluster element, such as a speedometer, a vehicle mileage, and/or a vehicle charge indicator) at a first location of the user interface and to display a second dashboard element (e.g., an instrument cluster element, such as a speedometer, a vehicle mileage, and/or a vehicle charge indicator), different from the first dashboard element, at a second location, different from the first location, of the user interface.

In some embodiments, configuring the vehicle setting of the first vehicle (e.g., 810B) to the first option includes configuring a seat (e.g., a driver's seat and/or a passenger seat) to a specified seat position (e.g., as shown in FIG. 8F). Automatically configuring a seat position enables the computer system to configure the first vehicle without requiring additional user inputs, thereby reducing the number of inputs required.

In some embodiments, configuring the vehicle setting of the first vehicle (e.g., 810B) to the first option includes configuring a mirror (e.g., a driver's side mirror and/or a passenger's side mirror) to a specified mirror position. Automatically configuring mirror positions enables the computer system to configure the first vehicle without requiring additional user inputs, thereby reducing the number of inputs required.

In some embodiments, configuring the vehicle setting of the first vehicle to the first option includes configuring a steering wheel to a specified steering wheel position. Automatically configuring a steering wheel position enables the computer system to configure the first vehicle without requiring additional user inputs, thereby reducing the number of inputs required.

In some embodiments, configuring the vehicle setting of the first vehicle (e.g., 810B) to the first option includes configuring a font and/or color of displayed content (e.g., text, shapes, dashboard elements (e.g., an instrument cluster element, such as a speedometer, a vehicle mileage, and/or a vehicle charge indicator)) to a specified font and/or color. Automatically configuring a font and/or color of displayed content enables the computer system to configure the first vehicle without requiring additional user inputs, thereby reducing the number of inputs required.

As described below, method 900 provides an intuitive way for displaying user interfaces based on detecting one or more electronic devices. The method reduces the cognitive burden on a user for accessing user interfaces, thereby creating a more efficient human-machine interface. For battery-operated computing devices, enabling a user to access user interfaces faster and more efficiently conserves power and increases the time between battery charges.

Note that details of the processes described above with respect to method 900 (e.g., FIG. 9) are also applicable in an analogous manner to the methods described above/below (e.g., with respect to FIGS. 7, 11, 13). For example, the computer systems are the same computer systems. For another example, the vehicles are the same vehicles. For brevity, these details are not repeated below.

FIGS. 10A-10D illustrate exemplary techniques for displaying user interfaces on two displays in accordance with some embodiments. The user interfaces in these figures are used to illustrate the processes described below, including the processes in FIG. 11.

Figure 10A:
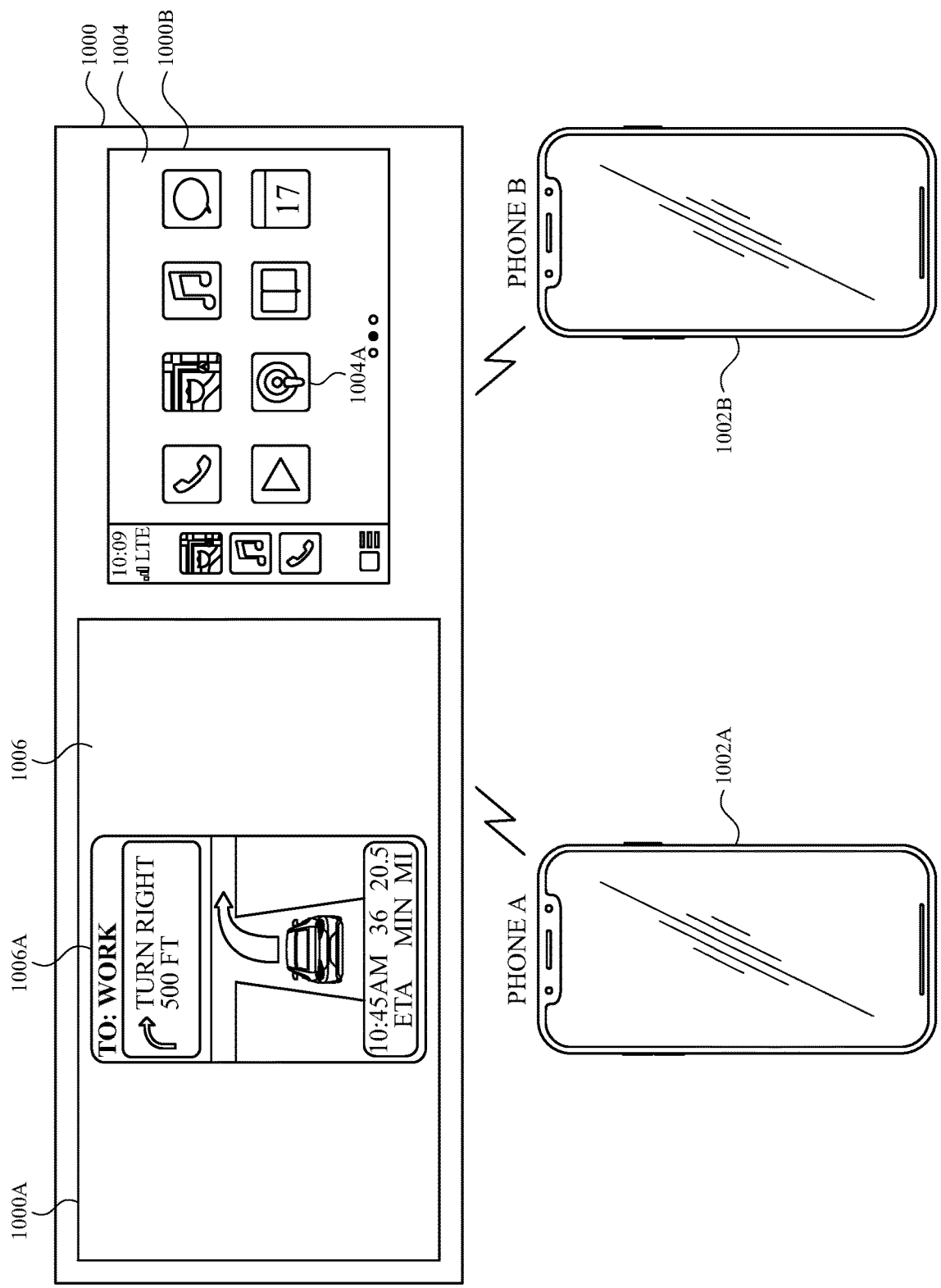
FIGS. 10A-10D illustrate exemplary techniques for displaying user interfaces on two displays in accordance with some embodiments.

At FIG. 10A, computer system 1000 includes first display 1000A and second display 1000B. In some embodiments, first display 1000A and second display 1000B are part of a vehicle. In some embodiments, first display 1000A is positioned in front of a driver of the vehicle and is optionally a vehicle instrument panel. In some embodiments, second display 1000B is not positioned in front of the driver of the vehicle and/or is positioned in the center of the dashboard or partially in front of a passenger (non-driver) of the vehicle. In some embodiments, computer system 1000 includes one or more features of devices 100, 300, and/or 500.

As illustrated in FIG. 10A, computer system 1000 displays content on first display 1000A based on first contextual information, including detecting that first external device (e.g., phone or tablet) 1002A is in the vehicle, and displays content on second display 1000B based on second contextual information, including detecting that second external device (e.g., phone or table) 1002B is in the vehicle. In some embodiments, first contextual information and/or second contextual information include: the time of day, the day of the week, a destination of the vehicle (e.g., traveling to or from a work location of a first user of first external device 1002A or second user of second external device 1002B), a type of relationship between the first user of first external device 1002A and the second user of second external device 1002B (e.g., that the second user of second external device 1002B is a coworker or child of the first user of first external device 1002A), a driving mode (e.g., fuel/battery efficient mode or standard mode), and/or operations being performed on first external device 1002A or second external device 1002B.

At FIG. 10A, user interface 1006 is displayed based on first contextual information, including detecting that first external device 1002A is in the vehicle. In some embodiments, the location of maps user interface 1006A within display 1000A is determined based on the first contextual information. In some embodiments, the content of maps user interface 1006A (e.g., displaying a first-person view rather than a bird's eye view, navigating to a particular location, font color, and/or font size) is based on the first contextual information. At FIG. 10B, user interface 1004 is based on second contextual information, including detecting that second external device 1002B is in the vehicle. In some embodiments, computer system 1000 selects icons (corresponding to applications) for display on a home screen of display 1000B based on the second contextual information. In some embodiments, podcast icon 1004A corresponding to a podcast application is displayed as part of a home screen of display 1000B based on the second contextual information (e.g., based on information indicating that the second user of second external device 1002B typically listens to a particular podcast on the current day of the week). Accordingly, user interface 1004 automatically including podcast icon 1004A that enables the second user to quickly start the podcase application.

Figure 10B:
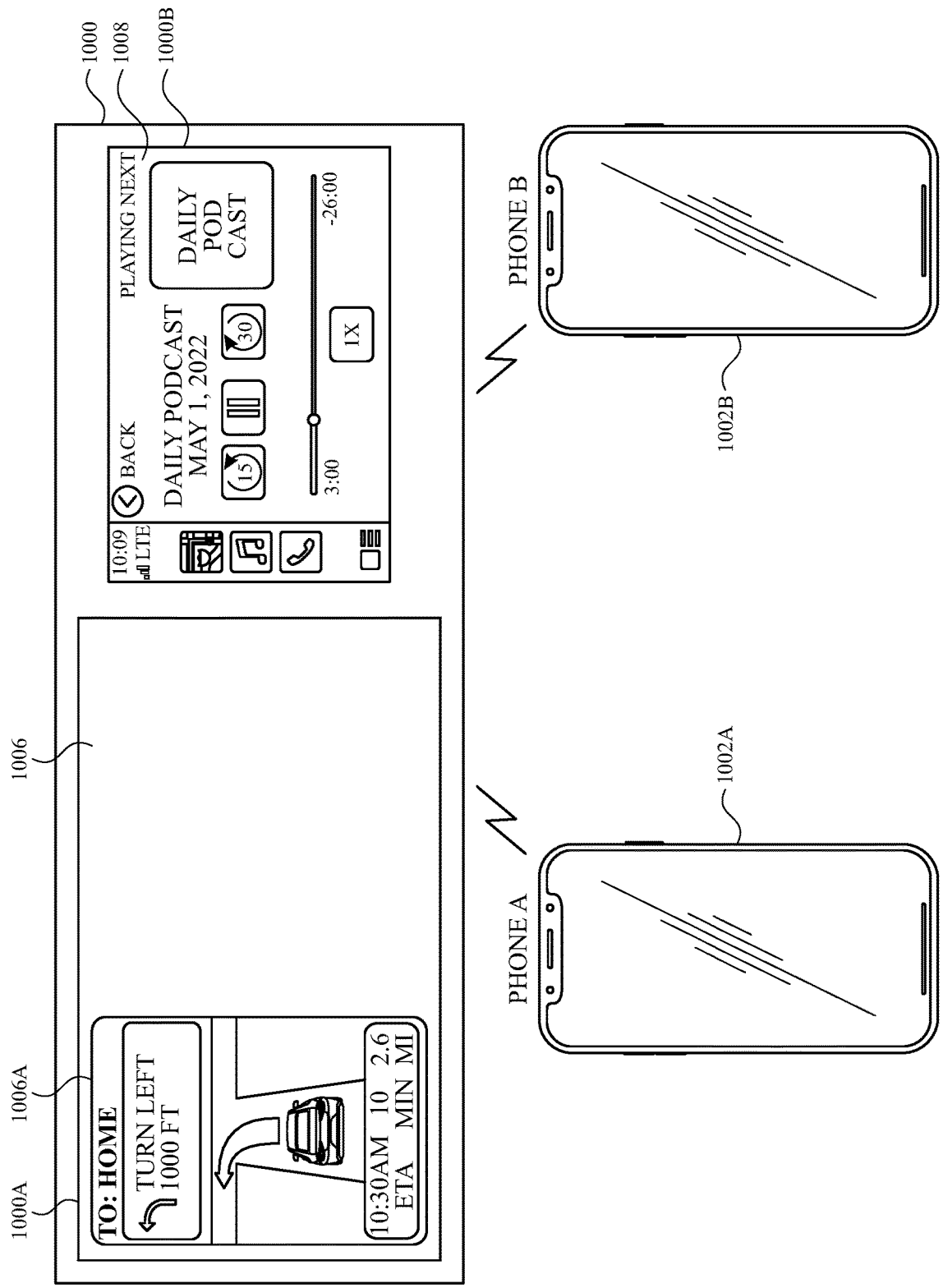

At FIG. 10B, at a time after that of FIG. 10A, the vehicle is navigating to a home of the first user of first external device 1002A, as indicated by the navigation destination of maps user interface 1006A. As the first contextual information has changed (e.g., different destination, different time of day), computer system 1000 has updated user interface 1006 based on the first contextual information. As illustrated in FIG. 10B, the location of maps user interface 1006A within display 1000A has changed (based on the first contextual information) such that maps user interface 1006A is positioned to the far left of display 1000A. In some embodiments, this enables user interfaces of other applications to be displayed (e.g., automatically, based on the first contextual information) in the center and right portions of user interface 1006. In some embodiments, this enables private information (e.g., a home address or an arrival time) to be less available (e.g., less visible) to a passenger in the vehicle (e.g., second user of second external device 1002B). At FIG. 10B, the second contextual information has also changed (e.g., different time of day and/or different location) and computer system 1000 has automatically displayed the podcast application user interface 1008 based on the second contextual information (e.g., based on the second user of second external device 1002B typically listening to this podcast at the current time of day). Accordingly, both display 1000A and display 1000B are displaying content based on respective contextual information.

Figure 10C:
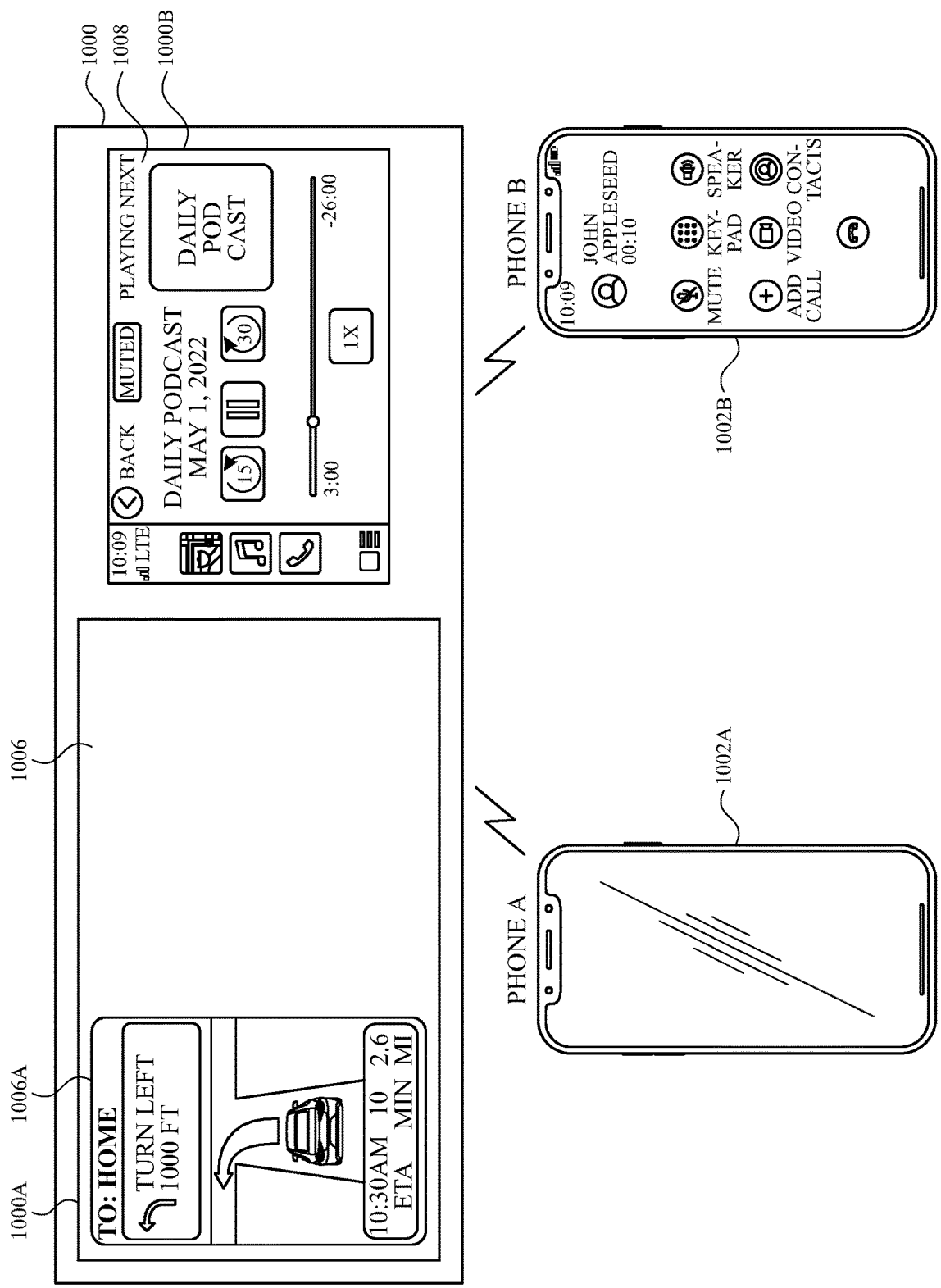

At FIG. 10C, the second contextual information has changed based on second external device 1002B participating in an audio call. In this example, based on second contextual information, including the audio call on second external device 1002B, computer system 1000B automatically mutes the podcast application.

Figure 10D:
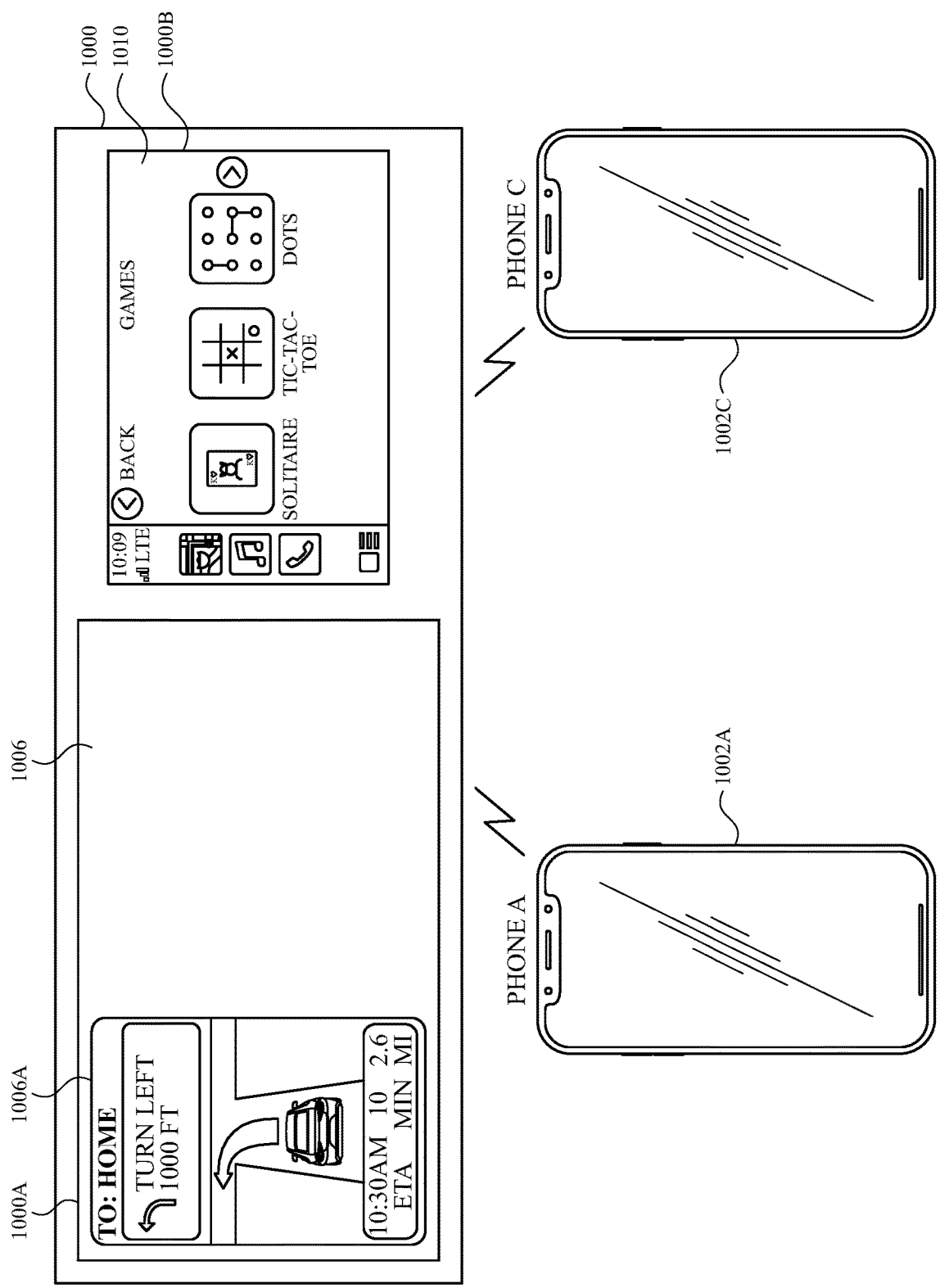

At FIG. 10D, second user and second external device 1002B have exited the vehicle and, instead, third user and their third external device (e.g., phone or table) 1002C are inside the vehicle with first user and first user's external device 1002A. Accordingly, computer system 1000 updates the contents of display 1000B in accordance with third contextual information that includes detecting external device 1002C in the cabin of the vehicle. In this example, third user is a young child of the first user and, as illustrated in FIG. 10D, computer system 1000 automatically displays gaming options based on the third contextual information.

As described below, method 1100 provides an intuitive way for displaying user interfaces on two displays. The method reduces the cognitive burden on a user for accessing user interfaces on two displays, thereby creating a more efficient human-machine interface. For battery-operated computing devices, enabling a user to access user interfaces on two displays faster and more efficiently conserves power and increases the time between battery charges.

FIG. 11 is a flow diagram illustrating a method for displaying user interfaces on two displays in accordance with some embodiments. Method 1100 is performed at a computer system (e.g., 100, 300, 500, 600, 800A, 800B, 800C, and/or 1000) of a vehicle (e.g., an automobile, a boat, or an airplane), wherein the computer system is in communication with a first display generation component (e.g., 1000A) (e.g., a display generation component of the vehicle, a display set within a front console of a vehicle and/or a display positioned ahead of/in front of a driver's seat of a vehicle) and second display generation component (1000B) (e.g., a display generation component of the vehicle, a display set within a front console of a vehicle and/or a display positioned ahead of/in front of a passenger's seat of a vehicle). Some operations in method 1100 are, optionally, combined, the orders of some operations are, optionally, changed, and some operations are, optionally, omitted.

The computer system (e.g., 1000) concurrently detects (1102) a first electronic device (e.g., 1002A) (e.g., a driver's or operator's smartphone, smartwatch, and/or laptop computer) in a cabin of the vehicle (e.g., located in a vehicle driver area of the cabin) and a second electronic device (e.g., 1002B) (e.g., a smartphone or smartwatch of a child of the vehicle operator, a smartphone or smartwatch of a coworker of the vehicle operator) in the cabin of the vehicle (e.g., located in a passenger area of the cabin).

The computer system (e.g., 1000) displays (1104), via the first display generation component (e.g., 1000A), a first user interface (e.g., 1006) based on a first set of contextual information including detection of the first electronic device (e.g., 1002A).

The computer system (e.g., 1000) displays (1106), via the second display generation component (e.g., 1000B), a second user interface (e.g., 1004) based on a second set of contextual information including detection of the second electronic device (e.g., 1002B). Automatically displaying a first user interface and a second user interface based on contextual information, including detecting first and second electronic devices in a cabin of a vehicle enables the computer system to display content that is relevant to the users of the electronic devices, thereby reducing the number of inputs required to access the content.

In some embodiments, the first set of contextual information and/or the second set of contextual information includes a time of day. In some embodiments, the first set and or second set of contextual information includes a day of week. Using a time of day as part of the contextual information enables the computer system to display more relevant content, thereby reducing the number of inputs required to access the content.

In some embodiments, the first set of contextual information includes information that the vehicle is currently travelling to work or from work (e.g., as indicated in 1006A of FIG. 10A). Using a vehicle destination (e.g., to work or from work) as part of the contextual information enables the computer system to display more relevant content, thereby reducing the number of inputs required to access the content.

In some embodiments, the second set of contextual information including detection of the second electronic device includes: in accordance with a determination that the second electronic device is of a first type (e.g., is logged in with a first user account, belongs to a coworker of the driver, and/or belongs to a child of the driver), the computer system displays, via the second generation component, the second user interface based on the second set of contextual information includes displaying a first user interface corresponding to the first type (e.g., that includes information specific to the first user account, that includes information based on the coworker being in a passenger seat of the vehicle, and/or that includes child-friendly interface elements, such as games and/or videos); and in accordance with a determination that the second electronic device is of a second type (e.g., is logged in with a first user account, belongs to a coworker of the driver, and/or belongs to a child of the driver) that is different from the first type, displaying, via the second generation component, the second user interface based on the second set of contextual information includes displaying a second user interface, different from the first user interface, corresponding to the second type (e.g., that includes information specific to the first user account, that includes information based on the coworker being in a passenger seat of the vehicle, and/or that includes child-friendly interface elements, such as games and/or videos) (e.g., as illustrated in FIGS. 10B and 10D). Using a time of day as part of the contextual information enables the computer system to display more relevant content, thereby reducing the number of inputs required to access the content.

In some embodiments, the first set of contextual information includes that a racing mode or track mode of the vehicle is currently enabled, and displaying the first user interface based on the first set of contextual information includes displaying a racing user interface (e.g., a racing dashboard, racing instrument cluster elements, instrument cluster element(s) that display forces being experienced by occupants, and/or race timing information). The racing user interface is only made available when the computer system detects that the vehicle is on a racing track and that the vehicle is not on a public road, thereby helping to prevent unsafe driving and/or improper racing. In some embodiments, the computer system receives additional authorization (e.g., via an authorized group and/or an authorized entity) to display the racing user interface, so as to limit display of the racing user interface to appropriate and safe situations. Using a driving mode as part of the contextual information enables the computer system to display more relevant content, thereby reducing the number of inputs required to access the content.

In some embodiments, the first set of contextual information and/or the second set of contextual information includes an operation (e.g., a game being played, a video being played, email being displayed, and/or messages being read) that is occurring on the first electronic device and/or second electronic device (e.g., as shown in 1002B of FIG. 10C). Using an operation that is currently occurring on the first or second electronic device as part of the contextual information enables the computer system to display more relevant content, thereby reducing the number of inputs required to access the content.

In some embodiments, displaying, via the first display generation component, the first user interface based on the first set of contextual information includes: in accordance with a determination that the first set of contextual information includes first contextual information (e.g., that the first electronic device is of a first type and/or that the speed of the vehicle does not exceed a threshold speed) without including second contextual information, displaying, via the first display generation component, an instrument cluster element (e.g., a speedometer, a vehicle mileage, and/or a vehicle charge indicator) at a first location (e.g., 1006A as shown in FIG. 10A); and in accordance with a determination that the first set of contextual information includes the second contextual information (e.g., that the first electronic device is of a second type and/or that the speed of the vehicle exceeds the threshold speed) without including the first contextual information, displaying, via the first display generation component, the instrument cluster element (e.g., a speedometer, a vehicle mileage, and/or a vehicle charge indicator) at a second location (e.g., 1006A as shown in FIG. 10B) that is different from the first location. In some embodiments, locations of multiple instrument cluster elements are based on the first set of contextual information. In some embodiments, displaying, via the second display generation component, the second user interface based on the second set of contextual information includes: in accordance with a determination that the second set of contextual information includes third contextual information (e.g., that the second electronic device is of a first type and/or that the speed of the vehicle does not exceed a threshold speed) without including fourth contextual information, displaying, via the second display generation component, a second instrument cluster element (e.g., a speedometer, a vehicle mileage, and/or a vehicle charge indicator) at a third location, and in accordance with a determination that the second set of contextual information includes the fourth contextual information (e.g., that the second electronic device is of a second type and/or that the speed of the vehicle exceeds the threshold speed) without including the third contextual information, displaying, via the second display generation component, the instrument cluster element (e.g., a speedometer, a vehicle mileage, and/or a vehicle charge indicator) at a fourth location that is different from the third location. In some embodiments, locations of multiple instrument cluster elements are based on the second set of contextual information. Customizing a location of an instrument cluster element enables the computer system to display content at locations that the user can easily access, thereby reducing the number of inputs required to access the content.

In some embodiments, displaying, via the first display generation component, the first user interface based on the first set of contextual information includes: in accordance with a determination that the first set of contextual information includes fifth contextual information (e.g., that the first electronic device is of a first type and/or that the speed of the vehicle does not exceed a threshold speed) without including sixth contextual information, displaying, via the first display generation component, a first instrument cluster element (e.g., a speedometer, a vehicle mileage, and/or a vehicle charge indicator) without displaying a second instrument cluster element; and in accordance with a determination that the first set of contextual information includes the sixth contextual information (e.g., that the first electronic device is of a second type and/or that the speed of the vehicle exceeds the threshold speed) without including the fifth contextual information, displaying, via the first display generation component, a second instrument cluster element (e.g., a speedometer, a vehicle mileage, and/or a vehicle charge indicator) without displaying the first instrument cluster element. Customizing the instrument cluster elements displayed enables the computer system to display content that is more relevant to the user, thereby reducing the number of inputs required to access the content. In some embodiments, displaying the first user interface includes displaying, via the first display generation component and based on the first set of contextual information, an instrument cluster element of a first type (e.g., a speedometer, a vehicle mileage, and/or a vehicle charge indicator) (e.g., without displaying an instrument cluster element of a second type). In some embodiments, the instrument cluster element that is displayed is selected based on the contextual information.

Note that details of the processes described above with respect to method 1100 (e.g., FIG. 11) are also applicable in an analogous manner to the methods described above/below (e.g., with respect to FIGS. 7, 9, 13). For example, the computer systems are the same computer systems. For another example, the vehicles are the same vehicles. For brevity, these details are not repeated below.

FIGS. 12A-12C illustrate exemplary techniques for displaying a composited user interface in accordance with some embodiments. The user interfaces in these figures are used to illustrate the processes described below, including the processes in FIG. 13.

At FIG. 12A, computer system 1200 is a part of a vehicle (e.g., is installed in the vehicle and/or integrated with the vehicle). Computer system 1200 is in communication with (e.g., wireless communication and or wired communication with) display 1202, which is part of the vehicle. In some embodiments, computer system 1200 is also in communication (e.g., wireless and/or wired communication) with an external device (e.g., a smart phone of the user) that is not a part of the vehicle or computer system.

In some embodiments, the vehicle also includes a vehicle renderer and an integration renderer. In some embodiments, the vehicle renderer is a hardware or software of the vehicle and generates or renders visual content (e.g., an image or a video) for display on display 1202. For example, vehicle renderer renders content (e.g., user interface elements) associated with a first set of vehicle instruments (e.g., turn signal indicators, and/or backup camera) and/or content that should be displayed at a fixed location and/or at a fixed size on the display when displayed (e.g., without personalization). In some embodiments, the integration renderer is a hardware or software of the vehicle used to generate or render visual content (e.g., an image or a video) for display on display 1202. For example, the integration renderer renders content associated with a second set of vehicle instruments (e.g., speedometer and/or vehicle status information), different from the first set of vehicle instruments. In some embodiments, integration renderer receives information from the external device that indicates visual characteristics of one or more vehicle instruments of the second set of vehicle instruments (e.g., color, style, size, and/or location). For example, the information from the external device enables the integration renderer to render the second set of vehicle instruments while personalizing the vehicle instruments to a user's preferences. In some embodiments, the external device renders content for display on display 1202, such as navigation information, weather information, or a recorded video.

In some embodiments, the integration renderer receives content (e.g., image or video) from the vehicle renderer and content (e.g., image or video) from the external device. In some embodiments, the integration renderer composites the various received contents with content the integration renderer has rendered such that the composited render is display on display 1202.

In some embodiments, the integration renderer receives content (e.g., image or video) from the external device (e.g., without receiving content (e.g., image or video) from the vehicle renderer) and the integration renderer composites the received content with content the integration renderer has rendered such that the composited render is displayed on display 1202. In some examples, the vehicle renderer separately provides rendered content to display 1202 for display, without the content being composited by the integration renderer.

Upon the vehicle starting and/or computer system 1200 powering up, computer system 1200 optionally displays, via display 1202, welcome user interface 1204, as illustrated in FIG. 12A. Welcome user interface 1204 is not a composited video and is being provided by a single source. For example, the integration renderer renders welcome user interface 1204 without using any content received from the vehicle renderer and/or the external device. Welcome user interface 1204 indicates to the user of the vehicle that the system has (or is) starting.

At FIG. 12B, subsequent to displaying welcome user interface 1204, computer system 1200 displays composited user interface 1206. As described above, composited user interface 1206 optionally includes content from various sources, such as the vehicle renderer, the external device, and/or the integration renderer. In some embodiments, the integration renderer receives content (e.g., images and/or videos) from the various sources and composites the content to create composited user interface 1206 for display on display 1202.

FIG. 12C illustrates the various contents that are composited into the displayed composited user interface 1206. For example, feed 1 is a video feed (or multiple video feeds, such as one for each vehicle instrument element) rendered by the integration renderer; feed 2 is a video feed (or multiple video feeds, such as one for each vehicle instrument cluster element) rendered by the external device; and feed 3 is a video feed rendered by the vehicle renderer.

In FIG. 12C, the hatched areas optionally indicate that no video is provided by the respective feed for display at the respective locations. In some embodiments, the various instrument cluster elements (e.g., of feed 1) are provided individually as separate video feeds, thereby enabling the integration compositor to place the various video feeds at respective locations during the compositing process.

In some embodiments and as illustrated in FIG. 12C, feed 1 includes speedometer 1208A, vehicle gas or charge level 1208B, vehicle fluid level 1208C, gear selector 1208D, indicator 1208E, and speed indicator 1208F, which are rendered by the integration renderer. In some embodiments, the integration renderer receives information from the external device that indicates visual characteristics of speedometer 1208A, vehicle gas or charge level 1208B, vehicle fluid level 1208C, gear selector 1208D, indicator 1208E, and speed indicator 1208F. For example, the information from the external device optionally specifies colors, styles, sizes, and/or locations of the various vehicle instrument cluster elements (and, optionally, whether particular one or more vehicle instrument elements should be displayed).

In some embodiments and as illustrated in FIG. 12C, feed 2 includes weather information 1210A, recorded video 12010B (e.g., a video or a received message), and navigation element 1210C. In some embodiments, the integration renderer receives the rendered content of feed 2 from the external device. For example, the external device provides (e.g., streams) three separate videos (e.g., each corresponding to one of weather information 1210A, recorded video 12010B, and navigation element 1210C) to the integration renderer. The external device also optionally provides information to the integration renderer about locations and/or sizes at which the various instrument cluster elements should be displayed.

In some embodiments and as illustrated in FIG. 12C, feed 3 includes camera video 1212A (e.g., a side camera or a front facing camera). In some embodiments, the integration renderer receives the rendered content of feed 3 from the vehicle renderer. For example, the vehicle renderer provides (e.g., streams) the video to the integration renderer. In some embodiments, the vehicle renderer does not provide the content of feed 3 to the integration renderer for compositing and, instead, causes display of the feed 3 content on display 1202 without use of the integration renderer.

As discussed above and illustrated in FIG. 12B, the various contents rendered by the integration renderer, the external device, and the vehicle renderer are concurrently displayed on display 1202 as a vehicle instrument cluster, enabling personalization of some of the vehicle instrument cluster elements, enabling external devices to render some of the vehicle instrument cluster elements, and also ensuring that certain content (e.g., camera 1212A) is displayed at appropriate locations of display 1202 independent of the external device.

In some embodiments, as illustrated with respect to speed indicator 1208F composited with navigation element 1210C, the displayed content optionally comprises one layer from one feed and another layer from another feed, such that it is not evident to a user which portions of the displayed content are from one feed and which portions are from another feed, thereby producing a unified user interface. In some embodiments, the portions combined to produce the composited user interface are not geometric shapes (e.g., 1208F of feed 1 is used in the composite user interface 1206, which has a shape that matches the text of the speed). For example, as the speed of the vehicle changes, the shape of 1208F being received as part of feed 1 changes (to match the text of the speed) and composited user interface 1206 accounts for the change. In some embodiments, the composited user interface displayed on display 1202 includes compositing a feed from a source (such as an external device and/or smartphone of the user) that includes navigation information (e.g., a map, text instructions, and/or directional arrows indicating upcoming turns) and which is displayed full screen or near-full screen and another feed from another source (e.g., from the integration renderer or the vehicle render) that includes a speed indication (e.g., similar to speed indicator 1208*f*). In some embodiments, the speed indication is displayed overlaid onto the navigation information. Accordingly, a user viewing the composited user interface cannot differentiate between which components of the composited user interface are provided from which source and/or are from which feed.

As described below, method 1300 provides an intuitive way for displaying a composited user interface. The method reduces the cognitive burden on a user for accessing content on a display, thereby creating a more efficient human-machine interface. For battery-operated computing devices, enabling a user to access content faster and more efficiently conserves power and increases the time between battery charges.

FIG. 13 is a flow diagram illustrating a method for displaying a composited user interface in accordance with some embodiments. Method 1300 is performed at a computer system (e.g., 100, 300, 500, 600, 800A, 800B, 800C, 1000, and/or 1200) of a vehicle (e.g., an automobile, a boat, or an airplane), wherein the computer system (e.g., 1200) is in communication with a display generation component (e.g., 12020) (e.g., a display generation component of the vehicle, a display set within a front console of the vehicle and/or a display positioned ahead of/in front of a driver's seat of the vehicle). Some operations in method 1300 are, optionally, combined, the orders of some operations are, optionally, changed, and some operations are, optionally, omitted.

The computer system (e.g., 1200) receives (1302), from a first source (e.g., that is part of the vehicle or that is external to the vehicle (e.g., a passenger/driver phone and/or an external electronic device); a first electronic circuit and/or a first processor), first video content (e.g., 1208A-1208E, 1210A-1210C, and/or 1212A) (e.g., a video content from a component of the vehicle, camera video content from the vehicle (e.g., backup camera and/or side cameras), and/or video content that provides measurements of parameters of the vehicle (e.g., speed, fuel level, charge level, and/or fluid levels)).

The computer system (e.g., 1200) receives (1304), from a second source (e.g., that is part of the vehicle or that is external to the vehicle (e.g., a passenger/driver phone and/or an external electronic device); a second circuit and/or a second processor) different from the first source, second video content (e.g., 1208A-1208E, 1210A-1210C, and/or 1212A) (e.g., a video content from a component of the vehicle, camera video content from the vehicle (e.g., backup camera and/or side cameras), and/or video content that provides measurements of parameters of the vehicle (e.g., speed, fuel level, charge level, and/or fluid levels)) that is different from the first video content.

The computer system composites (1306) the first video content and the second video content to produce a composited video content.

The computer system displays (1308), via the display generation component (e.g., 1202), the composited video. Compositing video content from different sources for display at a display of a vehicle enables the computer system to concurrently display content from different sources on a single display, thereby providing the user with improved visual feedback about the content.

In some embodiments, the first video content (e.g., 1208A) is of a first type and the second video content (e.g., 1210B) is of a second type that is different from the first type. Compositing different types of video content from different sources for display at a display of a vehicle enables the computer system to concurrently display content from different sources on a single display, thereby providing the user with improved visual feedback about the content.

In some embodiments, the first video content (e.g., 1208A) of the first type includes vehicle information (e.g., speed, fuel level, charge level, and/or fluid levels, door status (open/close), whether light bulbs are functioning). In some embodiments, the second vehicle content of the second type does not include vehicle information. Compositing different types of video content, including vehicle information, from different sources for display at a display of a vehicle enables the computer system to concurrently display content from different sources on a single display, thereby providing the user with improved visual feedback about the content.

In some embodiments, the first video content (e.g., 1208C) of the first type includes vehicle diagnostics information (e.g., information about a problem with an engine/motor, transmission, exhaust system, brakes, and/or other components of the vehicle). Compositing different types of video content, including vehicle diagnostic information, from different sources for display at a display of a vehicle enables the computer system to concurrently display content from different sources on a single display, thereby providing the user with improved visual feedback about the content.

In some embodiments, the first video content of the first type includes a vehicle instrument element (e.g., 1208A-1208D) (e.g., speedometer, tachometer, and/or fuel gauge). Compositing different types of video content, including vehicle instrument elements, from different sources for display at a display of a vehicle enables the computer system to concurrently display content from different sources on a single display, thereby providing the user with improved visual feedback about the content.

In some embodiments, the second video content (e.g., 1210B) of the second type includes multimedia (e.g., a movie and/or a tv show). In some embodiments, the first video content of the first type does not include multimedia. Compositing different types of video content, including multimedia, from different sources for display at a display of a vehicle enables the computer system to concurrently display content from different sources on a single display, thereby providing the user with improved visual feedback about the content.

In some embodiments, the second source is an external device (e.g., 1002A or 1002B) (e.g., a phone that is in wireless communication with the computer system of the vehicle and/or a wireless laptop that is in wireless communication with the computer system). Compositing video content from different sources, including an external device, for display at a display of a vehicle enables the computer system to concurrently display content from different sources on a single display, thereby providing the user with improved visual feedback about the content.

In some embodiments, prior to displaying, via the display generation component, the composited video content, the computer system (e.g., 1200) displays a non-composited video (e.g., 1204) (e.g., a video generated by the first source, a video generated by the second source, a splash screen, or a welcome screen). In some embodiments, the computer system transitions from displaying non-composited video content to displaying the composited video content that is based on the first video content and the second video content. Displaying composited video after displaying video that is not composited on a display of a vehicle enables the computer system to quickly display content from a single source to provide the user with feedback that the system is enabled, then display content from different sources on the display, thereby providing the user with improved visual feedback about the content.

In some embodiments, the first video content is received from the first source concurrently with receiving the second video content from the second source. Displaying composited video using first video content and second video content that are received concurrently enables the computer system to display content as they are received, thereby providing the user with improved visual feedback about the video being received.

In some embodiments, the computer system (e.g., 1200) receives, from the first source and/or the second source, metadata for synchronizing the first video content and the second video content, and wherein compositing the first video content and the second video content to produce the composited video content includes using the metadata to synchronize timing of the first video content and the second video content. Using metadata to synchronize content enables the computer system to concurrently display composited synchronized content, thereby providing the user with improved visual feedback.

In some embodiments, the composited video content includes all received video content from the first source (and, optionally, less than all received video content from the second source). In some embodiments, the composited video content includes some, but not all, received video content from the first source. Compositing content using all received video from the first source enables the computer system to present all content received from the first source, thereby providing the user with improved visual feedback.

In some embodiments, the composited video content includes all received video content from the second source (and, optionally, less than all received video content from the first source). In some embodiments, the composited content includes some, but not all, received video content from the second source. Compositing content using all received video from the second source enables the computer system to present all content received from the second source, thereby providing the user with improved visual feedback.

Note that details of the processes described above with respect to method 1300 (e.g., FIG. 13) are also applicable in an analogous manner to the methods described above/below (e.g., with respect to FIGS. 7, 9, 11). For example, the computer systems are the same computer systems. For another example, the vehicles are the same vehicles. For brevity, these details are not repeated below.

FIGS. 14A-14C illustrate exemplary techniques for displaying content in accordance with some embodiments. At FIGS. 14A-14C, external devices 1410 and 1412 (e.g., smartphones and/or tablets) are optionally in communication with computer system 1400. Computer system 1400 includes first display 1402 and second display 1404. In some embodiments, computer system 1400 is part of a vehicle (e.g., installed in the vehicle and/or integrated with the vehicle).

At FIG. 14A, computer system 1400 displays vehicle instrument cluster elements 1402A-1402C on first display 1402. For example, vehicle instrument cluster element 1402A is an indicator of a gear selection, vehicle instrument cluster element 1402B is a first navigation user interface of a navigation application, and vehicle instrument cluster element 1402C is a speedometer indicating a speed of the vehicle. Concurrently with display of vehicle instrument cluster elements 1402A-1402C on first display 1402, computer system 1400 displays user interface 1406 on second display 1404. User interface 1406 includes a plurality of icons corresponding to various applications. In some embodiments, external device 1410 renders vehicle instrument cluster element 1402B (the first navigation user interface of the navigation application) and transmits the video to computer system 1400 for display.

At FIG. 14A, computer system 1400 receives user input 1450A (e.g., tap on or tap-and-hold on) selecting icon 1406A of the navigation application. At FIG. 14B, in response to receiving user input 1450A selecting icon 1406A of the navigation application, computer system 1400 displays a second navigation user interface 1408 of the navigation application on second display 1404. In response to receiving user input 1450A selecting the navigation application icon, computer system 1400 also ceases to display vehicle instrument cluster element 1402B (the first navigation user interface of the navigation application) on first display 1402 and, instead, displays vehicle instrument cluster element 1402D (including vehicle information). In some embodiments, external device 1412 renders the second navigation user interface 1408 of the navigation application and transmits the video to computer system 1400 for display. In some embodiments, external device 1410 renders vehicle instrument cluster element 1402D and transmits the video to computer system 1400 for display. At FIG. 14B, computer system 1400 receives user input 1450B (e.g., tap on or tap-and-hold on) selecting icon 1406B of the vehicle information application.

At FIG. 14C, in response to receiving user input 1450B selecting icon 1406B of the vehicle information application, computer system 1400 displays vehicle information user interface 1414 on second display 1404. In response to receiving user input 1450B selecting the navigation application icon, computer system 1400 also ceases to display vehicle instrument cluster element 1402D (including vehicle information) on first display 1402 and, instead, displays vehicle instrument cluster element 1402B (the first navigation user interface of the navigation application). In some embodiments, external device 1410 renders the first navigation user interface and transmits the video to computer system 1400 for display. In some embodiments, external device 1412 renders vehicle information user interface 1414 and transmits the video to computer system 1400 for display.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to display content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to display content that is of greater interest to the user. Accordingly, use of such personal information data enables users to have calculated control of the content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of displaying personalized content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and displayed to users by inferring preferences based on non-personal information data or a bare minimum amount of personal information, such as the content being requested by the device associated with a user, other non-personal information available to the content services, or publicly available information.

What is claimed is:

1. A computer system of a first vehicle, wherein the computer system is configured to communicate with a display generation component, comprising:
one or more processors; and
memory storing one or more programs configured to be executed by the one or more processors, the one or more programs including instructions for:
receiving one or more communications, wherein the one or more communications include a first indication that an electronic device is positioned inside of a cabin of the first vehicle; and
in response to receiving the one or more communications, adjusting a configurable option of the first vehicle, wherein adjusting the configurable option of the first vehicle includes:
in accordance with a determination that the one or more communications include a second indication that the electronic device configured a user interface of a second vehicle to a first option, configuring a user interface of the first vehicle to the first option; and
in accordance with a determination that the one or more communications includes a third indication that the electronic device configured a vehicle setting of the second vehicle to a second option, configuring a vehicle setting of the first vehicle to the second option.

2. The computer system of claim 1, wherein the one or more programs further include instructions for:
receiving one or more second communication, wherein the one or more second communication include an indication that a second electronic device, different from the electronic device, is positioned inside the cabin of the first vehicle; and
in response to receiving the one or more second communication, adjusting a second configurable option of the first vehicle, wherein adjusting the second configurable option of the first vehicle includes:
in accordance with a determination that the one or more second communications include an indication that that the second electronic device configured a user interface of a third vehicle to a third option, configuring a user interface of the first vehicle to the third option; and
in accordance with a determination that the one or more second communications include an indication that the second electronic device configured a vehicle setting of the third vehicle to a fourth option, configuring a vehicle setting of the first vehicle to the fourth option.

3. The computer system of claim 1, wherein the computer system of the first vehicle is associated with a user account of a service and the electronic device is associated with the user account of the service.

4. The computer system of claim 3, wherein the second vehicle is associated with the user account of the service.

5. The computer system of claim 1, wherein configuring the user interface of the first vehicle to the first option or configuring the vehicle setting of the first vehicle to the second option includes configuring one or more applications to be displayed upon a startup of the first vehicle.

6. The computer system of claim 1, wherein configuring the user interface of the first vehicle to the first option includes:
in accordance with a determination that the first option, when configured in the second vehicle, included configuring a first dashboard element of the second vehicle to display at a first location of a user interface of the second vehicle, configuring a first dashboard element of the first vehicle to display at a first location of the user interface of the first vehicle that corresponds to the first location of the user interface of the second vehicle; and
in accordance with a determination that the first option, when configured in the second vehicle, included configuring the first dashboard element of the second vehicle to display at a second location of the user interface of the second vehicle that is different from the first location of the user interface of the second vehicle, configuring the first dashboard element of the first vehicle to display at a second location of the user interface of the first vehicle that corresponds to the second location of the user interface of the second vehicle and that is different from the first location of the user interface of the first vehicle.

7. The computer system of claim 1, wherein configuring the vehicle setting of the first vehicle to the second option includes configuring a seat to a specified seat position.

8. The computer system of claim 1, wherein configuring the vehicle setting of the first vehicle to the second option includes configuring a mirror to a specified mirror position.

9. The computer system of claim 1, wherein configuring the vehicle setting of the first vehicle to the second option includes configuring a steering wheel to a specified steering wheel position.

10. The computer system of claim 1, wherein configuring the vehicle setting of the first vehicle to the second option includes configuring a font of displayed content to a specified font or configuring a color of the displayed content to a specified color.

11. A non-transitory computer-readable storage medium storing one or more programs configured to be executed by one or more processors of a computer system of a first vehicle, wherein the computer system is in communication with a display generation component, the one or more programs including instructions for:
receiving one or more communications, wherein the one or more communications include a first indication that an electronic device is positioned inside of a cabin of the first vehicle; and
in response to receiving the one or more communications, adjusting a configurable option of the first vehicle, wherein adjusting the configurable option of the first vehicle includes:
in accordance with a determination that the one or more communications include a second indication that the electronic device configured a user interface of a second vehicle to a first option, configuring a user interface of the first vehicle to the first option; and
in accordance with a determination that the one or more communications includes a third indication that the electronic device configured a vehicle setting of the second vehicle to a second option, configuring a vehicle setting of the first vehicle to the second option.

12. The non-transitory computer-readable storage medium of claim 11, wherein the one or more programs further include instructions for:
receiving one or more second communication, wherein the one or more second communication include an indication that a second electronic device, different from the electronic device, is positioned inside the cabin of the first vehicle; and
in response to receiving the one or more second communication, adjusting a second configurable option of the first vehicle, wherein adjusting the second configurable option of the first vehicle includes:
in accordance with a determination that the one or more second communications include an indication that that the second electronic device configured a user interface of a third vehicle to a third option, configuring a user interface of the first vehicle to the third option; and
in accordance with a determination that the one or more second communications include an indication that the second electronic device configured a vehicle setting of the third vehicle to a fourth option, configuring a vehicle setting of the first vehicle to the fourth option.

13. The non-transitory computer-readable storage medium of claim 11, wherein the computer system of the first vehicle is associated with a user account of a service and the electronic device is associated with the user account of the service.

14. The non-transitory computer-readable storage medium of claim 13, wherein the second vehicle is associated with the user account of the service.

15. The non-transitory computer-readable storage medium of claim 11, wherein configuring the user interface of the first vehicle to the first option or configuring the vehicle setting of the first vehicle to the second option includes configuring one or more applications to be displayed upon a startup of the first vehicle.

16. The non-transitory computer-readable storage medium of claim 11, wherein configuring the user interface of the first vehicle to the first option includes:
in accordance with a determination that the first option, when configured in the second vehicle, included configuring a first dashboard element of the second vehicle to display at a first location of a user interface of the second vehicle, configuring a first dashboard element of the first vehicle to display at a first location of the user interface of the first vehicle that corresponds to the first location of the user interface of the second vehicle; and
in accordance with a determination that the first option, when configured in the second vehicle, included configuring the first dashboard element of the second vehicle to display at a second location of the user interface of the second vehicle that is different from the first location of the user interface of the second vehicle, configuring the first dashboard element of the first vehicle to display at a second location of the user interface of the first vehicle that corresponds to the second location of the user interface of the second vehicle and that is different from the first location of the user interface of the first vehicle.

17. The non-transitory computer-readable storage medium of claim 11, wherein configuring the vehicle setting of the first vehicle to the second option includes configuring a seat to a specified seat position.

18. The non-transitory computer-readable storage medium of claim 11, wherein configuring the vehicle setting of the first vehicle to the second option includes configuring a mirror to a specified mirror position.

19. The non-transitory computer-readable storage medium of claim 11, wherein configuring the vehicle setting of the first vehicle to the second option includes configuring a steering wheel to a specified steering wheel position.

20. The non-transitory computer-readable storage medium of claim 11, wherein configuring the vehicle setting of the first vehicle to the second option includes configuring a font of displayed content to a specified font or configuring a color of the displayed content to a specified color.

21. A method, comprising:
at a computer system of a first vehicle, wherein the computer system is in communication with a display generation component:
receiving one or more communications, wherein the one or more communications include a first indication that an electronic device is positioned inside of a cabin of the first vehicle; and
in response to receiving the one or more communications, adjusting a configurable option of the first vehicle, wherein adjusting the configurable option of the first vehicle includes:
in accordance with a determination that the one or more communications include a second indication that the electronic device configured a user interface of a second vehicle to a first option, configuring a user interface of the first vehicle to the first option; and
in accordance with a determination that the one or more communications includes a third indication that the electronic device configured a vehicle setting of the second vehicle to a second option, configuring a vehicle setting of the first vehicle to the second option.

22. The method of claim 21, further comprising:
receiving one or more second communication, wherein the one or more second communication include an indication that a second electronic device, different from the electronic device, is positioned inside the cabin of the first vehicle; and
in response to receiving the one or more second communication, adjusting a second configurable option of the first vehicle, wherein adjusting the second configurable option of the first vehicle includes:
in accordance with a determination that the one or more second communications include an indication that that the second electronic device configured a user interface of a third vehicle to a third option, configuring a user interface of the first vehicle to the third option; and
in accordance with a determination that the one or more second communications include an indication that the second electronic device configured a vehicle setting of the third vehicle to a fourth option, configuring a vehicle setting of the first vehicle to the fourth option.

23. The method of claim 21, wherein the computer system of the first vehicle is associated with a user account of a service and the electronic device is associated with the user account of the service.

24. The method of claim 23, wherein the second vehicle is associated with the user account of the service.

25. The method of claim 21, wherein configuring the user interface of the first vehicle to the first option or configuring the vehicle setting of the first vehicle to the second option includes configuring one or more applications to be displayed upon a startup of the first vehicle.

26. The method of claim 21, wherein configuring the user interface of the first vehicle to the first option includes:
- in accordance with a determination that the first option, when configured in the second vehicle, included configuring a first dashboard element of the second vehicle to display at a first location of a user interface of the second vehicle, configuring a first dashboard element of the first vehicle to display at a first location of the user interface of the first vehicle that corresponds to the first location of the user interface of the second vehicle; and
- in accordance with a determination that the first option, when configured in the second vehicle, included configuring the first dashboard element of the second vehicle to display at a second location of the user interface of the second vehicle that is different from the first location of the user interface of the second vehicle, configuring the first dashboard element of the first vehicle to display at a second location of the user interface of the first vehicle that corresponds to the second location of the user interface of the second vehicle and that is different from the first location of the user interface of the first vehicle.

27. The method of claim 21, wherein configuring the vehicle setting of the first vehicle to the second option includes configuring a seat to a specified seat position.

28. The method of claim 21, wherein configuring the vehicle setting of the first vehicle to the second option includes configuring a mirror to a specified mirror position.

29. The method of claim 21, wherein configuring the vehicle setting of the first vehicle to the second option includes configuring a steering wheel to a specified steering wheel position.

30. The method of claim 21, wherein configuring the vehicle setting of the first vehicle to the second option includes configuring a font of displayed content to a specified font or configuring a color of the displayed content to a specified color.

* * * * *